US012744050B1

(12) United States Patent
Takashima

(10) Patent No.: US 12,744,050 B1
(45) Date of Patent: Sep. 22, 2026

(54) INFORMATION PROCESSING DEVICE, INFORMATION PROCESSING METHOD, AND PROGRAM

(71) Applicant: Sony Group Corporation, Tokyo (JP)

(72) Inventor: Kouichiro Takashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 303 days.

(21) Appl. No.: 18/684,196

(22) PCT Filed: Mar. 23, 2022

(86) PCT No.: PCT/JP2022/013429
§ 371 (c)(1),
(2) Date: Jul. 30, 2024

(87) PCT Pub. No.: WO2023/026555
PCT Pub. Date: Mar. 2, 2023

(30) Foreign Application Priority Data

Aug. 25, 2021 (JP) ................................ 2021-136869

(51) Int. Cl.
*G10L 21/0364* (2013.01)
*G10L 13/033* (2013.01)
*G10L 21/034* (2013.01)

(52) U.S. Cl.
CPC ........ *G10L 21/0364* (2013.01); *G10L 13/033* (2013.01); *G10L 21/034* (2013.01)

(58) Field of Classification Search
CPC .. G10L 21/0364; G10L 13/033; G10L 21/034
See application file for complete search history.

(56) References Cited

U.S. PATENT DOCUMENTS 10,390,097 B1 * 8/2019 Lee .................... H04N 21/4756
10,466,959 B1 11/2019 Yang
(Continued)

FOREIGN PATENT DOCUMENTS

JP S48-26057 B1 8/1973
JP 2002-258842 A 9/2002
(Continued)

OTHER PUBLICATIONS

International Search Report and Written Opinion mailed on Jun. 28, 2022, received for PCT Application PCT/JP2022/013429, filed on Mar. 23, 2022, 13 pages including English Translation.
(Continued)

*Primary Examiner* — Michael Colucci
(74) *Attorney, Agent, or Firm* — XSENSUS LLP

(57) ABSTRACT

A device and method are provided that adjust voices of a plurality of sound sources included in distribution content from an information processing device and make it easier to hear sound of each sound source by a reception terminal that receives and reproduces distribution content. A first output voice adjustment unit executes adjustment processing on an output voice of each of the plurality of sound sources, and content including synthesized voice data obtained by synthesizing the output voices corresponding to the sound sources adjusted by the first output voice adjustment unit is output. The first output voice adjustment unit executes output voice adjustment processing for matching a maximum value of a volume level corresponding to a frequency of the output voice of each sound source to a target level. Moreover, a second output voice adjustment unit executes the output voice adjustment processing in accordance with a content type or scene.

19 Claims, 36 Drawing Sheets

(56) References Cited

U.S. PATENT DOCUMENTS

| | | | | |
|---|---|---|---|---|
| 10,917,061 | B2 * | 2/2021 | Wu | H03G 5/025 |
| 2002/0111204 | A1 * | 8/2002 | Lupo | A63F 3/00214<br>463/9 |
| 2003/0203746 | A1 * | 10/2003 | Iwase | H04M 1/605<br>455/575.9 |
| 2005/0117761 | A1 * | 6/2005 | Sato | H04S 1/00<br>381/310 |
| 2008/0028094 | A1 * | 1/2008 | Kang | G06F 16/68<br>709/231 |
| 2010/0111313 | A1 * | 5/2010 | Namba | H04R 3/005<br>381/119 |
| 2010/0280638 | A1 | 11/2010 | Matsuda | |
| 2013/0108056 | A1 * | 5/2013 | Noro | H04R 5/04<br>381/17 |
| 2014/0133681 | A1 * | 5/2014 | Mizuta | A63F 13/54<br>381/300 |
| 2014/0328487 | A1 * | 11/2014 | Hiroe | G10L 21/0272<br>381/56 |
| 2016/0098912 | A1 * | 4/2016 | Mori | B60K 35/26<br>340/459 |
| 2016/0371051 | A1 | 12/2016 | Rowe | |
| 2017/0151501 | A1 * | 6/2017 | Kitamura | A63F 13/50 |
| 2019/0082276 | A1 * | 3/2019 | Crow | H04R 25/505 |
| 2019/0118096 | A1 * | 4/2019 | Jeon | A63F 13/2145 |
| 2020/0225844 | A1 | 7/2020 | Lerner | |
| 2022/0193549 | A1 * | 6/2022 | Wakeland | A63F 13/79 |
| 2022/0286801 | A1 * | 9/2022 | Azizian | G16H 40/63 |

FOREIGN PATENT DOCUMENTS

| | | | | |
|---|---|---|---|---|
| JP | 2003-243952 | A | 8/2003 | |
| JP | 2008-228184 | A | 9/2008 | |
| JP | 2012-054863 | A | 3/2012 | |
| JP | 2019-180073 | A | 10/2019 | |
| WO | 2018/096954 | A1 | 5/2018 | |
| WO | WO-2020062922 | A1 * | 4/2020 | H04S 7/302 |

OTHER PUBLICATIONS

Enrique Perez-Gonzalez et al: "Automatic Gain and Fader Control for Live Mixing", IEEE Workshop on Applications of Signal Processing to Audio and Acoustics, Oct. 18, 2009 (Oct. 18, 2009), pp. 1-4, XP055555402.

* cited by examiner

INFORMATION PROCESSING DEVICE, INFORMATION PROCESSING METHOD, AND PROGRAM

CROSS-REFERENCE TO RELATED APPLICATIONS

The present application is based on PCT filing PCT/JP2022/013429, filed Mar. 23, 2022, which claims priority to Japanese Patent Application No. 2021-136869, filed Aug. 25, 2021, the entire contents of each are incorporated herein by reference.

TECHNICAL FIELD

The present disclosure relates to an information processing device, an information processing method, and a program. Specifically, for example, an information processing device, an information processing method, and a program that perform, for example, control for automatically adjusting a balance of output sound of each sound source or the like and transmitting the sound, with a configuration in which a transmission terminal generates synthesized sound of output sounds from a plurality of sound sources and transmits the sound and a reception terminal reproduces the synthesized sound.

BACKGROUND ART

In recent years, various types of content distribution processing such as moving image distribution using an information processing device such as a smartphone (smartphone), a PC, or a game terminal, game distribution accompanied by commentary of a game application (application), or music content distribution have been executed.

In most of such content distribution using a network, image data and voice data are distributed together. For example, in a case where a user distributes commentary data of the game application using the information processing device such as the smartphone (smartphone), the PC, or the game terminal, processing for synthesizing (mixing) and distributing an application voice such as a BGM of the game application and a voice of the user who is a game player is executed.

Moreover, there is a case where a viewing user who receives and views game commentary content that is distribution content executes processing for inputting a text of a support comment or the like regarding the game commentary with a viewing terminal and transmitting this text input data to a game distribution terminal via the network.

The text data input on a side of the viewing terminal is received by a game execution terminal via the network.

The game execution terminal executes processing for converting the received text into voice data, generating a comment voice, and synthesizing (mixing) and distributing the generated comment voice with a game application voice or a voice of a game execution user.

In this case, the viewing terminal side reproduces a synthesized voice of three types of voices including the application voice such as the BGM of the game application, the voice of the user who is the game player, and the comment voice.

In a case where such synthesized sound of the plurality of voices is reproduced, if a volume balance between the voices included in the synthesized voice is poor, there is a case where voice data of other sound sources cannot be heard due to a large voice from a single sound source.

Note that, related art that has disclosed about synthesis processing and reproduction processing of a plurality of sound sources is, for example, Patent Document 1 (WO 2018/096954 A1).

Patent Document 1 (WO 2018/096954 A1) discloses, for example, a configuration that generates reproduced sound in accordance with a position of each instrument in a configuration that reproduces performance data of a plurality of instruments such as an orchestra.

However, the related art realizes the generation of the reproduced sound reflecting the position of each sound source (instrument) and does not mention adjustment processing on a volume of each sound source.

As described above, in a case where the game application commentary is distributed, pieces of voice data of the plurality of different sound sources including the application voice such as the BGM of the game application, the voice of the game execution user, and the comment voice of the viewing user are synthesized and distributed. In a case where output sounds of the plurality of such sound sources are synthesized and distributed, if a volume balance of the output sounds of the respective sound sources is poor, there is a possibility that a situation occurs where a voice of other sound sources cannot be heard due to a large voice from a single sound source.

CITATION LIST

Patent Document

Patent Document 1: WO 2018/096954 A1

SUMMARY OF THE INVENTION

Problems to be Solved by the Invention

The present disclosure has been made, for example, in view of the above problems, and an object is, for example, to provide an information processing device, an information processing method, and a program that perform, for example, control for automatically adjusting a balance of output sounds of respective sound sources or the like and transmitting the sound, with a configuration in which a transmission terminal generates synthesized sound of output sounds from a plurality of sound sources and transmits the sound and a reception terminal reproduces the synthesized sound.

Solutions to Problems

A first aspect of the present disclosure is an information processing device including:

a first output voice adjustment unit that inputs an output voice of each of a plurality of sound sources and executes adjustment processing on the output voice of each sound source;

a voice synthesis unit that synthesizes the output voice corresponding to the sound source adjusted by the first output voice adjustment unit and generates synthesized voice data; and a communication unit that outputs content including the synthesized voice data generated by the voice synthesis unit, in which the first output voice adjustment unit analyzes a volume level corresponding to a frequency, regarding the output voice of each sound source and executes output voice adjustment processing for matching a maximum value of the volume level corresponding to the frequency of the output voice of each sound source to a target level.

Moreover, a second aspect of the present disclosure is an information processing device including:

a communication unit that receives content; and an output voice adjustment unit that inputs voice data of the received content by the communication unit and executes output voice adjustment processing, in which the output voice adjustment unit executes output voice adjustment processing based on at least any one of voice output device characteristics information included in a voice output unit or voice output environment information.

Moreover, a third aspect of the present disclosure is an information processing method executed by an information processing device, including:

a first output voice adjustment step for inputting an output voice of each of a plurality of sound sources and executing adjustment processing on the output voice of each sound source, by a first output voice adjustment unit;

a voice synthesis step for synthesizing the output voice corresponding to the sound source adjusted by the first output voice adjustment unit and generating synthesized voice data, by a voice synthesis unit; and a communication step for outputting content including the synthesized voice data generated by the voice synthesis unit, by a communication unit, in which in the first output voice adjustment step, a volume level corresponding to a frequency for the output voice of each sound source is analyzed, and output voice adjustment processing for matching a maximum value of the volume level corresponding to the frequency of the output voice of each sound source to a target level is executed.

Moreover, a fourth aspect of the present disclosure is an information processing method executed by an information processing device, including:

a communication step for receiving content via a network, by a communication unit; and an output voice adjustment step for inputting voice data of the received content by the communication unit and executing output voice adjustment processing, by an output voice adjustment unit, in which in the output voice adjustment step, output voice adjustment processing based on at least one of voice output device characteristics information included in a voice output unit or voice output environment information is executed.

Moreover, a fifth aspect of the present disclosure is a program for causing an information processing device to execute information processing including:

a first output voice adjustment step for causing a first output voice adjustment unit to input an output voice of each of a plurality of sound sources and execute adjustment processing on the output voice of each sound source;

a voice synthesis step for causing a voice synthesis unit to synthesize the output voice corresponding to the sound source adjusted by the first output voice adjustment unit and generate synthesized voice data; and a communication step for causing a communication unit to output content including the synthesized voice data generated by the voice synthesis unit, in which in the first output voice adjustment step, a volume level corresponding to a frequency for the output voice of each sound source is analyzed, and output voice adjustment processing for matching a maximum value of the volume level corresponding to the frequency of the output voice of each sound source to a target level is executed.

Moreover, a sixth aspect of the present disclosure is a program for causing an information processing device to execute information processing including:

a communication step for causing a communication unit to receive content via a network; and an output voice adjustment step for causing an output voice adjustment unit to input voice data of the received content by the communication unit and execute output voice adjustment processing, in which in the output voice adjustment step, output voice adjustment processing based on at least one of voice output device characteristics information included in a voice output unit or voice output environment information is executed.

Note that a program of the present disclosure is a program that can be provided by, for example, a storage medium or a communication medium provided in a computer-readable format to an information processing device or a computer system that can execute various program codes. By providing such a program in a computer-readable format, processing corresponding to the program is implemented on the information processing device or the computer system.

Other objects, features, and advantages of the present disclosure will become apparent from a more detailed description based on examples of the present disclosure described later and the accompanying drawings. Note that a system herein is a logical set configuration of a plurality of devices, and is not limited to one in which devices with respective configurations are in the same housing.

According to the configuration according to the embodiment of the present disclosure, a device and a method are realized that adjust voices of a plurality of sound sources included in distribution content from an information processing device and making it easier to hear the voice of each sound source by a reception terminal that receives and reproduces the distribution content.

Specifically, for example, a first output voice adjustment unit executes adjustment processing on the output voice of each of the plurality of sound sources, and content including synthesized voice data obtained by synthesizing the output voices corresponding to the sound sources adjusted by the first output voice adjustment unit is output. The first output voice adjustment unit executes output voice adjustment processing for matching a maximum value of a volume level corresponding to a frequency of the output voice of each sound source to a target level. Moreover, a second output voice adjustment unit executes the output voice adjustment processing in accordance with a type or a scene of the content.

With these types of processing, the device and the method are realized that adjust the voices of the plurality of sound sources included in the distribution content from the information processing device and make it easier to hear sound of each sound source by the reception terminal that receives and reproduces the distribution content.

Note that the effects described herein are only examples and are not restrictive, and additional effects may also be provided.

MODE FOR CARRYING OUT THE INVENTION

Figure 1:
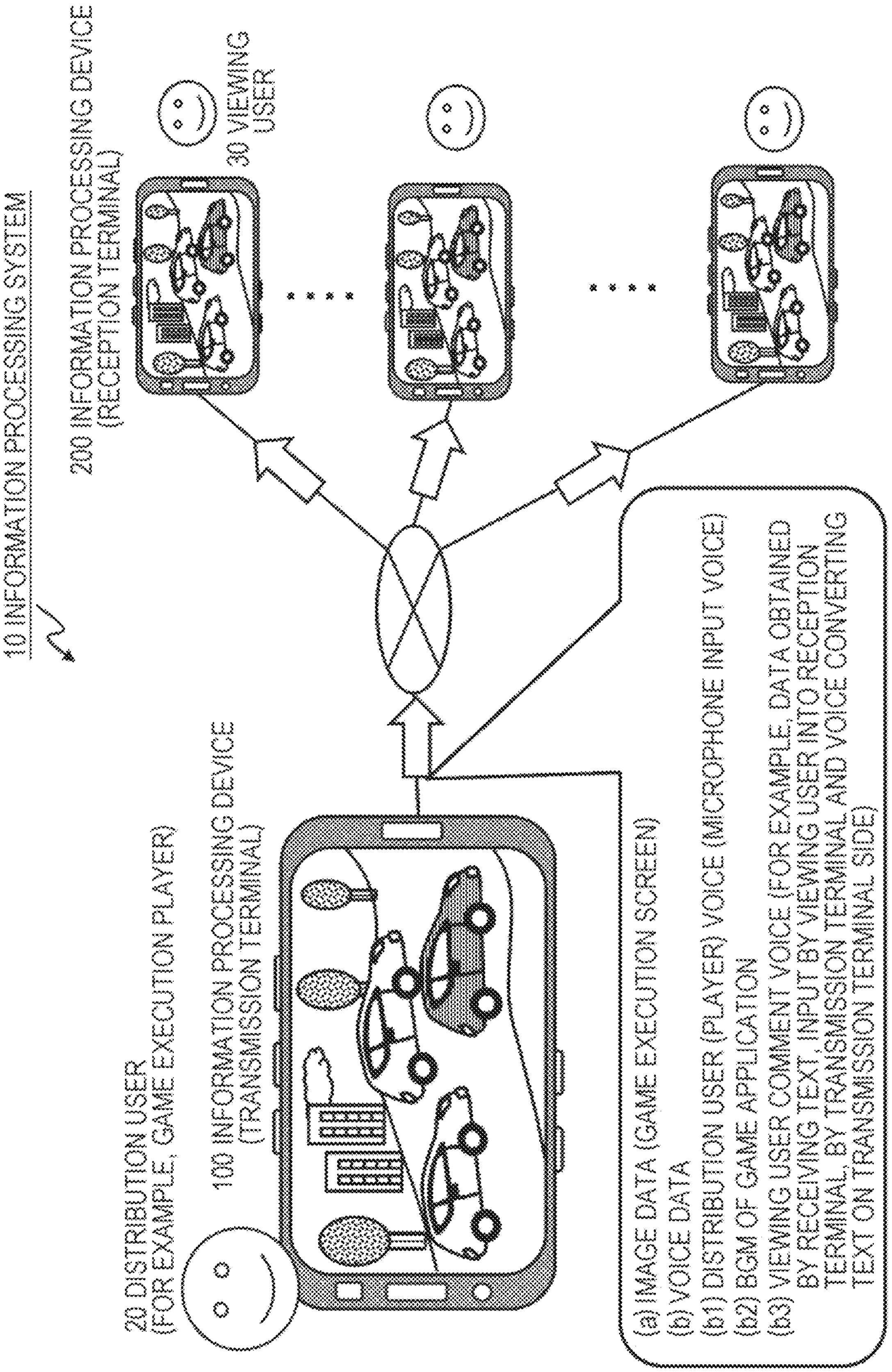
FIG. 1 is a diagram for explaining content distribution processing using an information processing device.

Hereinafter, an information processing device, an information processing method, and a program according to the present disclosure will be described in detail with reference to the drawings. Note that the description will be made according to the following items.

1. Example of Application Execution And Content Distribution Processing of Information Processing Device
2. (First Embodiment) About Configuration And Processing of Information Processing Device (Transmission Terminal) According to First Embodiment of The Present Disclosure
3. (Second Embodiment) About Configuration And Processing of Information Processing Device (Transmission Terminal) That Executes Voice Output Adjustment According to Type of Distribution Content 3-1. (Processing Example 1) Voice Output Adjustment Processing in a Case Where Distribution Content Is Game Content 3-2. (Processing Example 2) Voice Output Adjustment Processing in a Case Where Distribution Content Is Music Content 4. (Third Embodiment) About Configuration And Processing of Information Processing Device (Transmission Terminal) That Executes Voice Output Adjustment According to Distribution Scene of Distribution Content 4-1. (Processing Example 1) Specific Example of Scene Determination Processing of Scene 1=Scene Immediately Before Game Start And Voice Output Adjustment Processing According to Determined Scene 4-2. (Processing Example 2) Specific Example of Scene Determination Processing of Scene 2=Scene During Game Play And Voice Output Adjustment Processing According to Determined Scene 4-3. (Processing Example 3) Specific Example of Scene Determination Processing of Scene 3=Crash Occurrence Scene And Voice Output Adjustment Processing According to Determined Scene 4-4. (Processing Example 4) Specific Example of Scene Determination Processing of Scene 4=Game End Scene And Voice Output Adjustment Processing According to Determined Scene 4-5. (Processing Example 5) Specific Example of Scene Determination Processing of Scene 5=Distribution End Scene And Voice Output Adjustment Processing According to Determined Scene 5. (Fourth Embodiment) About Configuration And Processing of Information Processing Device (Transmission Terminal) Having Configuration That Can Execute All Processing in First to Third Embodiments
6. (Fifth Embodiment) About Configuration And Processing of Information Processing Device (Reception Terminal) in Fifth Embodiment of The Present Disclosure
7. About Hardware Configuration Example of Information Processing Device
8. Summary of Configuration of the Present Disclosure

1. Example of Application Execution and Content Distribution Processing of Information Processing Device First, an example of application execution and content distribution processing of an information processing device will be described.

Specifically, the information processing device according to the present disclosure is, for example, an information processing device such as a smartphone (smartphone), a PC, or a game terminal and is a device that can perform communication via a network such as the Internet.

The information processing device according to the present disclosure is, for example, a device that can distribute content such as game content or music content by moving image distribution via the network or execution of a game application (application).

FIG. 1 is a diagram illustrating a configuration example of an information processing system 10 using the information processing device according to the present disclosure.

In FIG. 1, an example using a smartphone (smartphone) as an example of the information processing device according to the present disclosure is illustrated.

An information processing device (transmission terminal) 100 is a terminal of a distribution user (for example, game execution player) 20.

The distribution user (for example, game execution player) 20 executes a game application (application) using the information processing device (transmission terminal) 100.

Content including a game application screen, a game application voice (application voice), or the like is distributed to an information processing device (reception terminal) 200 of a viewing user 30 via the network such as the Internet.

The application voice includes, for example, a BGM generated by an application and various voices generated in the game application. For example, the example illustrated in the drawing is an automobile race game application, and includes various types of sound such as engine sound of an automobile, a cheer of an audience, or collision sound at the time of crash.

Moreover, a user who executes the game using the information processing device (transmission terminal) 100, that is, the distribution user 20 has a live of the game being executed. That is, a voice of the distribution user 20 is input via a microphone of the information processing device (transmission terminal) 100, and a game, a situation, or the like is described.

The voice of the distribution user 20 is transmitted to the information processing device (reception terminal) 200 on the side of the viewing user 30, together with the application voice and is reproduced on the side of the information processing device (reception terminal) 200.

Moreover, the viewing user 30 can input a text of a comment such as a support message into the information processing device (reception terminal) 200, and this input comment is transmitted to the information processing device (transmission terminal) 100 on the side of the distribution user 20 via the network.

The information processing device (transmission terminal) 100 on the side of the distribution user 20 converts the reception comment from the information processing device (reception terminal) 200 into voice data, generates a comment voice, and synthesizes (mix) the generated comment voice with the application voice or a voice of a game execution user and distributes the synthesized voice.

Note that the viewing user 30 may directly voice-input a comment such as a support message via a microphone of the information processing device (reception terminal) 200. In this case, this input voice comment is transmitted to the information processing device (transmission terminal) 100 on the side of the distribution user 20, via the network.

The information processing device (transmission terminal) 100 on the side of the distribution user 20 synthesizes (mix) and distributes the voice comment received from the information processing device (reception terminal) 200 together with the application voice and the voice of the game execution user.

In this way, in a case where a pieces of voice data of the plurality of different sound sources such as the application voice such as the BGM of the game application, the voice of the game execution user, and the comment voice of the viewing user are synthesized and distributed, if a volume balance of output sounds of the respective sound sources is poor, there is a case where the viewing user 30 on the side of the information processing device (reception terminal) 200 cannot hear the voice of each sound source.

For example, in a case where the volume of the single sound source among the three sound sources is clearly larger than the volumes of the other two sound sources, the voice data of the other sound sources cannot be heard due to the large voice of the sound source.

A specific example will be described with reference to FIG. 2.

Figure 2:
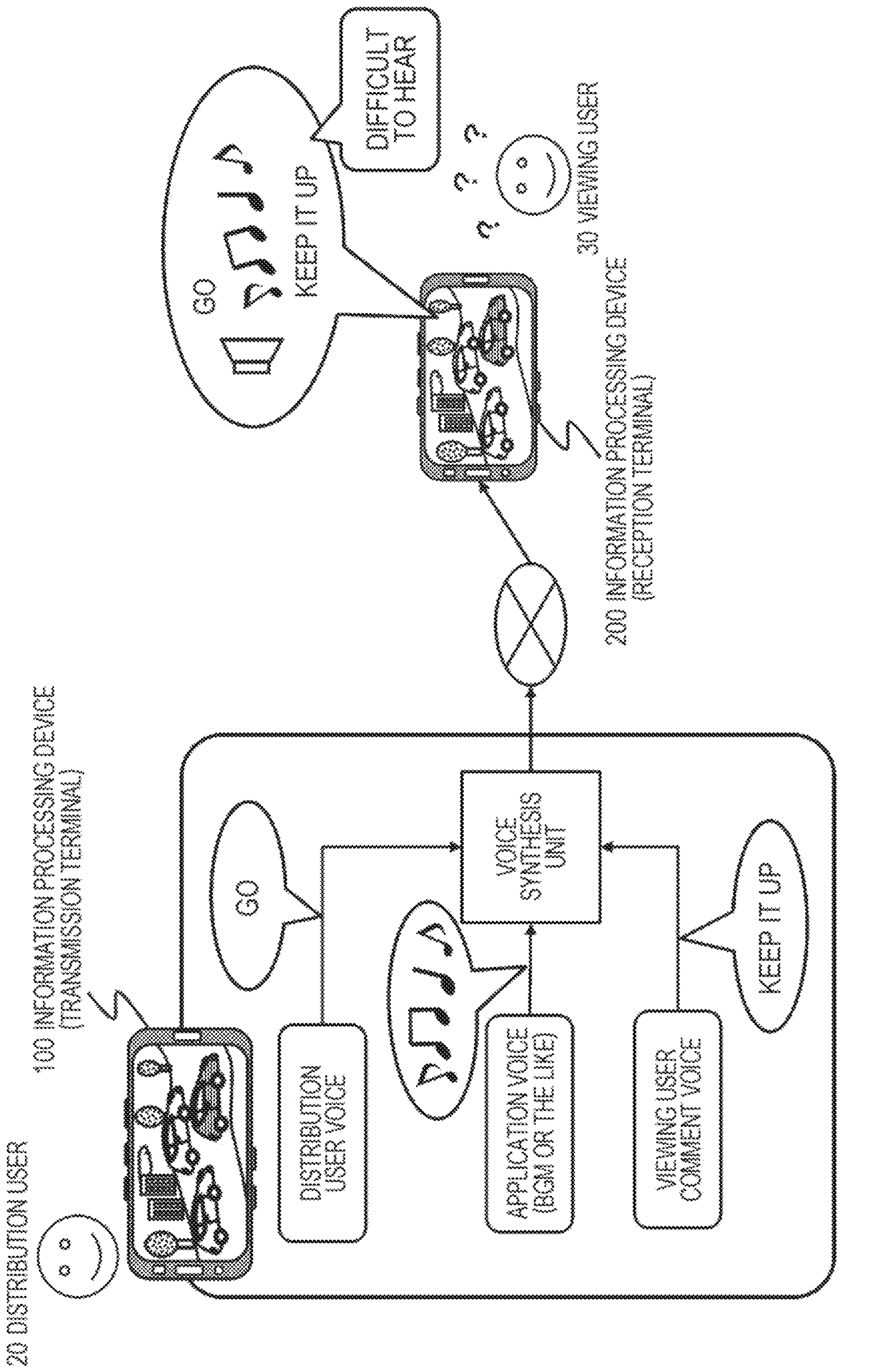
FIG. 2 is a diagram for explaining an example of synthesis, transmission, and reproduction processing of voice data in the content distribution processing using the information processing device.

In FIG. 2, in the information processing device (transmission terminal) 100 on the side of the distribution user 20, the voice synthesis unit generates the synthesized voice obtained by synthesizing the pieces of voice data of these three types of sound sources (a) distribution user voice (b) application voice (application BGM or the like)

(c) viewing user comment voice and transmits the synthesized voice to the information processing device (reception terminal) 200 on the side of the viewing user 30 via the network.

The information processing device (reception terminal) 200 on the side of the viewing user 30 outputs the synthesized voice received from the information processing device (transmission terminal) 100 on the side of the distribution user 20 via a speaker or an earphone.

Here, for example, in a case where a volume of (b) application voice (application BGM or the like) is clearly larger than the other two voices ((a) distribution user voice and (c) viewing user comment voice), the viewing user 30 cannot hear the voice data of the other sound source, that is, the distribution user voice and the viewing user comment, due to a large-volume BGM voice.

The present disclosure solves such a problem.

For example, with the configuration illustrated in FIG. 1, that is, the configuration in which the information processing device (transmission terminal) 100 generates and transmits synthesized data of output sounds of a plurality of sound sources and the information processing device (reception terminal) 200 reproduces a distributed voice, control is performed for automatically adjusting a balance of the output sounds of the respective sound sources and transmitting or reproducing the sound.

Note that, the information processing system 10 in FIG. 1 is a configuration example of the system that directly exchanges data between the information processing device (transmission terminal) 100 and the plurality of information processing devices (reception terminal) 200. However, for example, as illustrated in FIG. 3, a configuration may be used in which data is exchanged via a management server 50 on the network.

Figure 3:
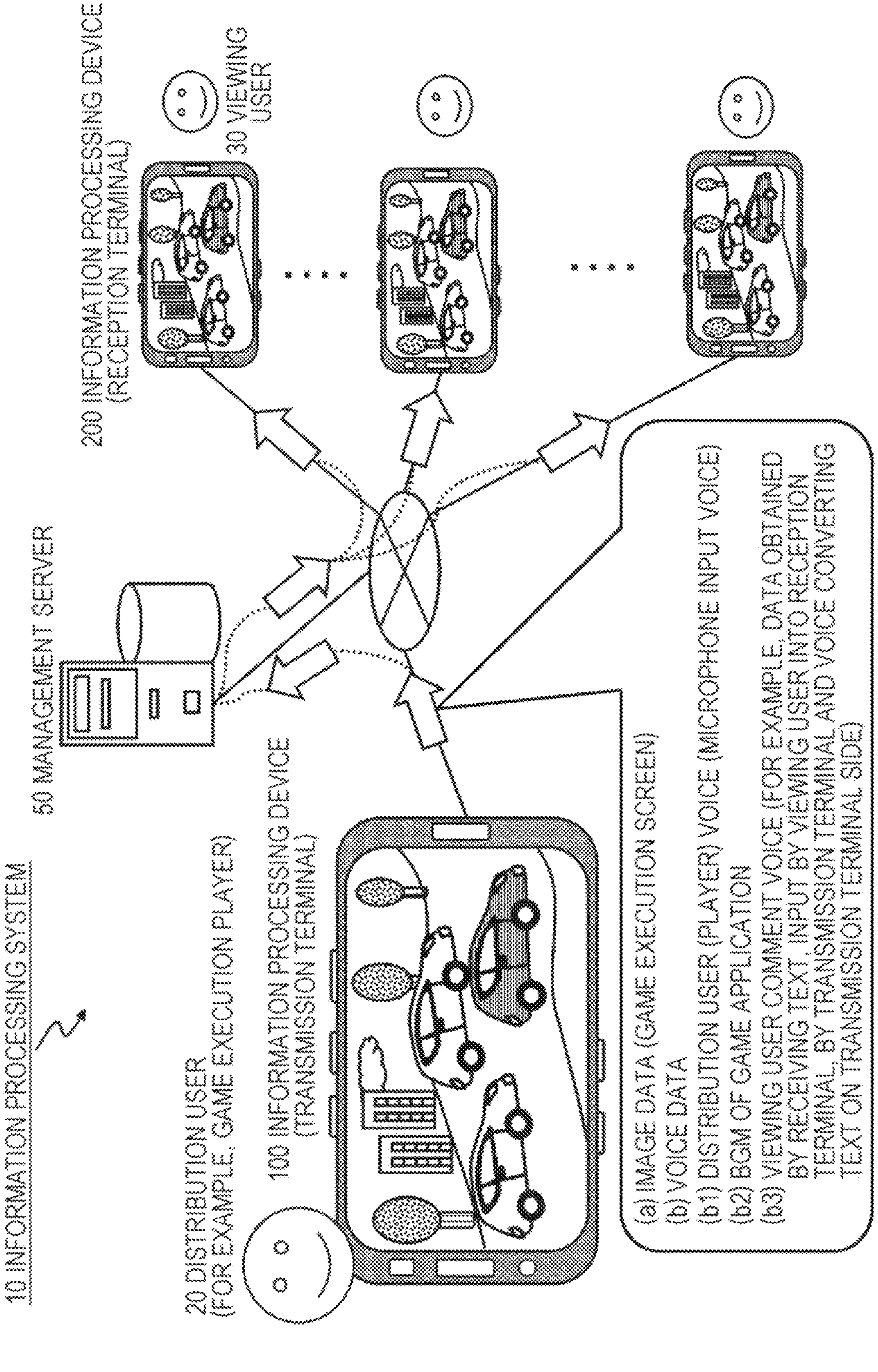
FIG. 3 is a diagram for explaining the content distribution processing using the information processing device and a server.

In the configuration illustrated in FIG. 3, the information processing device (transmission terminal) 100 on the side of the distribution user 20 transmits the data to the management server 50. The information processing device (reception terminal) 200 on the side of the viewing user 30 receives and views this data from the management server 50.

With such a system configuration, the information processing device (transmission terminal) 100 on the side of the distribution user 20 synthesizes execution screen data of the game application, the application voice such as the BGM of the game application, the voice of the game execution user, and the comment voice of the viewing user, and the voice data of the plurality of different sound sources and transmits the data to the management server 50. The information processing device (reception terminal) 200 on the side of the viewing user 30 receives and views this synthesized voice data from the management server 50, together with image data.

With such a configuration, in a case where the volume of the single sound source among the three sound sources is clearly larger than the volumes of the other two sound sources, there is a case where the voice data of the other sound sources cannot be heard due to the large voice of the sound source.

The present disclosure solves such a problem.

2. (First Embodiment) about Configuration and Processing of Information Processing Device (Transmission Terminal) According to First Embodiment of the Present Disclosure Next, a configuration and processing of an information processing device (transmission terminal) 100 according to a first embodiment of the present disclosure will be described.

Figure 4:
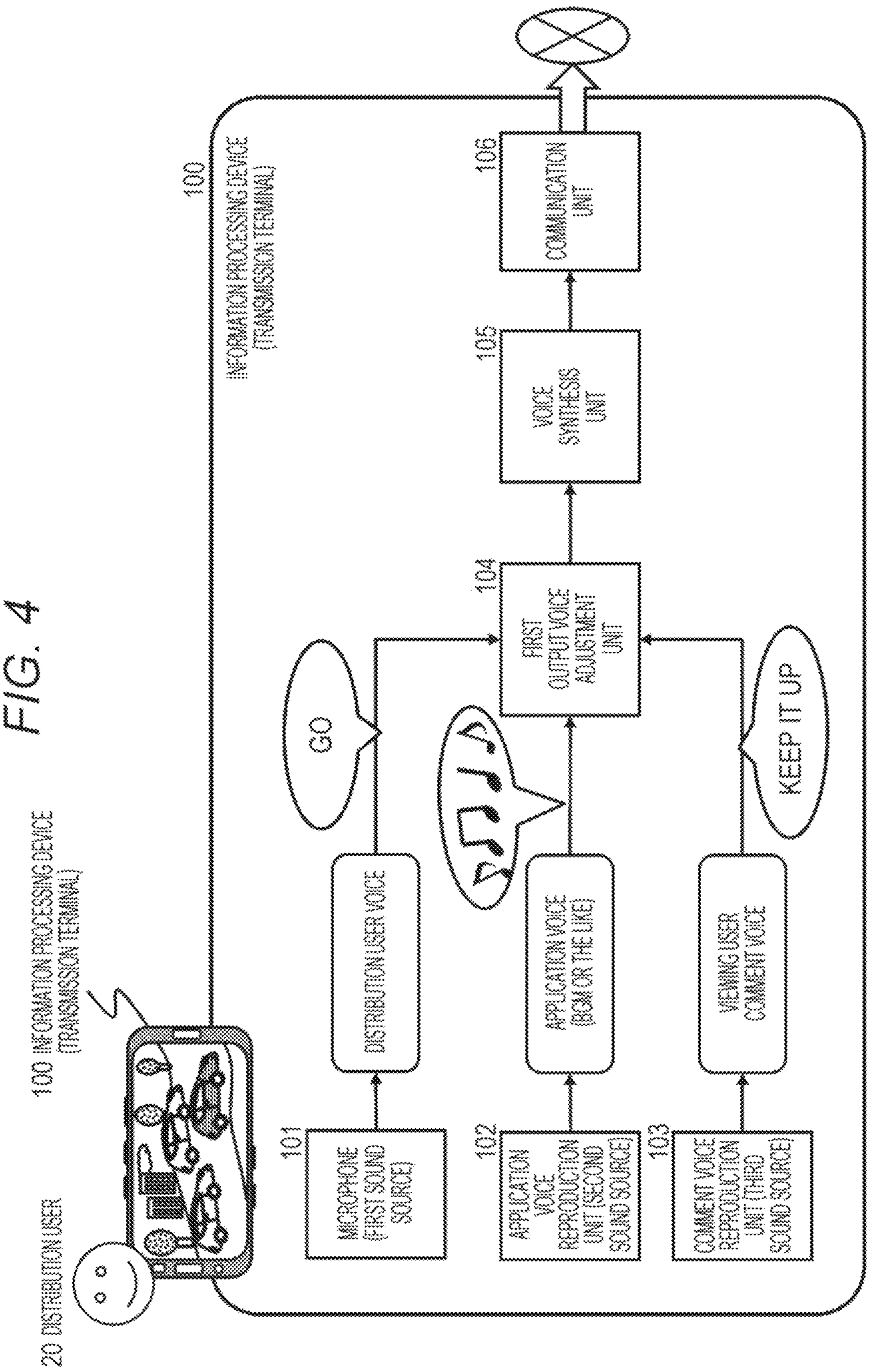
FIG. 4 is a diagram for explaining a configuration example (first embodiment) of the information processing device (transmission terminal).

FIG. 4 is a diagram illustrating a configuration example of the information processing device (transmission terminal) 100 according to the first embodiment of the present disclosure.

As illustrated in FIG. 4, the information processing device (transmission terminal) 100 includes a microphone (first sound source) 101, an application voice reproduction unit (second sound source) 102, a comment voice reproduction unit (third sound source) 103, a first output voice adjustment unit 104, a voice synthesis unit 105, and a communication unit 106.

Note that the configuration illustrated in FIG. 4 is a partial configuration of the information processing device (transmission terminal) 100 and is a block diagram mainly illustrating a configuration to be applied to voice output adjustment processing of the present disclosure. In addition to the components illustrated in the drawing, the information processing device (transmission terminal) 100 includes, for example, components similar to those of a general smartphone (smartphone), such as a display unit, an input unit, a control unit, or a storage unit.

The microphone (first sound source) 101 is a microphone included in the information processing device (transmission terminal) 100, and for example, inputs a voice of a distribution user 20 who is executing a game application using the information processing device (transmission terminal) 100 and inputs the voice into the first output voice adjustment unit 104.

Note that, here, as an example, it is assumed that the distribution user 20 execute an automobile race game application with the information processing device (transmission terminal) 100 and the distribution user 20 explain and have a live of this game application.

As illustrated in FIG. 4, a distribution user voice input into the microphone (first sound source) 101 is input into the first output voice adjustment unit 104.

The application voice reproduction unit (second sound source) 102 generates reproduced sound of an application executed by the information processing device (transmission terminal) 100 and an application voice illustrated in the drawing and outputs the generated sound and voice to the first output voice adjustment unit 104.

In this example, the distribution user 20 executes an automobile race game application with the information processing device (transmission terminal) 100, and the application voice reproduction unit (second sound source) 102 generates a BGM generated by the game application, various sounds generated in the game, for example, various sounds such as engine sound of an automobile, a cheer of an audio, or a collision sound at the time of crash, as reproduced sounds and outputs the sound to the first output voice adjustment unit 104.

The comment voice reproduction unit (third sound source) 103 reproduces an image and voice data transmitted from the information processing device (transmission terminal) 100 and reproduces a comment of the viewing user 30 who is viewing.

While receiving and reproducing the game application execution screen and the voice data transmitted from the information processing device (transmission terminal) 100 on the side of the distribution user 20 by the information processing device (reception terminal) 200 on the side of the viewing user 30, the viewing user 30 inputs a text of a comment such as a support message into the information processing device (reception terminal) 200.

This input comment is transmitted to the information processing device (transmission terminal) 100 on the side of the distribution user 20, via a network.

The comment voice reproduction unit 103 of the information processing device (transmission terminal) 100 on the side of the distribution user 20 converts the comment received from the information processing device (reception terminal) 200 into voice data, generates a comment voice, and outputs the generated comment voice (viewing user comment voice) to the first output voice adjustment unit 104.

Note that the viewing user 30 may directly voice-input a comment such as a support message via a microphone of the information processing device (reception terminal) 200. In this case, this input voice comment is transmitted to the information processing device (transmission terminal) 100 on the side of the distribution user 20, via the network.

In this case, the comment voice reproduction unit 103 of the information processing device (transmission terminal) 100 on the side of the distribution user 20 outputs the voice comment received from the information processing device (reception terminal) 200 to the first output voice adjustment unit 104.

Next, processing executed by the first output voice adjustment unit 104 will be described.

The first output voice adjustment unit 104 inputs the following three pieces of voice data.

(1) The distribution user voice from the microphone (first sound source) 101, (2) The application voice from the application voice reproduction unit (second sound source) 102, and (3) The viewing user comment voice from the comment voice reproduction unit (third sound source) 103, The first output voice adjustment unit 104 inputs the three pieces of voice data from these three sound sources and executes output adjustment processing on the voice data of each sound source.

A specific example of the output adjustment processing executed by the first output voice adjustment unit 104 will be described with reference to FIG. 5.

Figure 5:
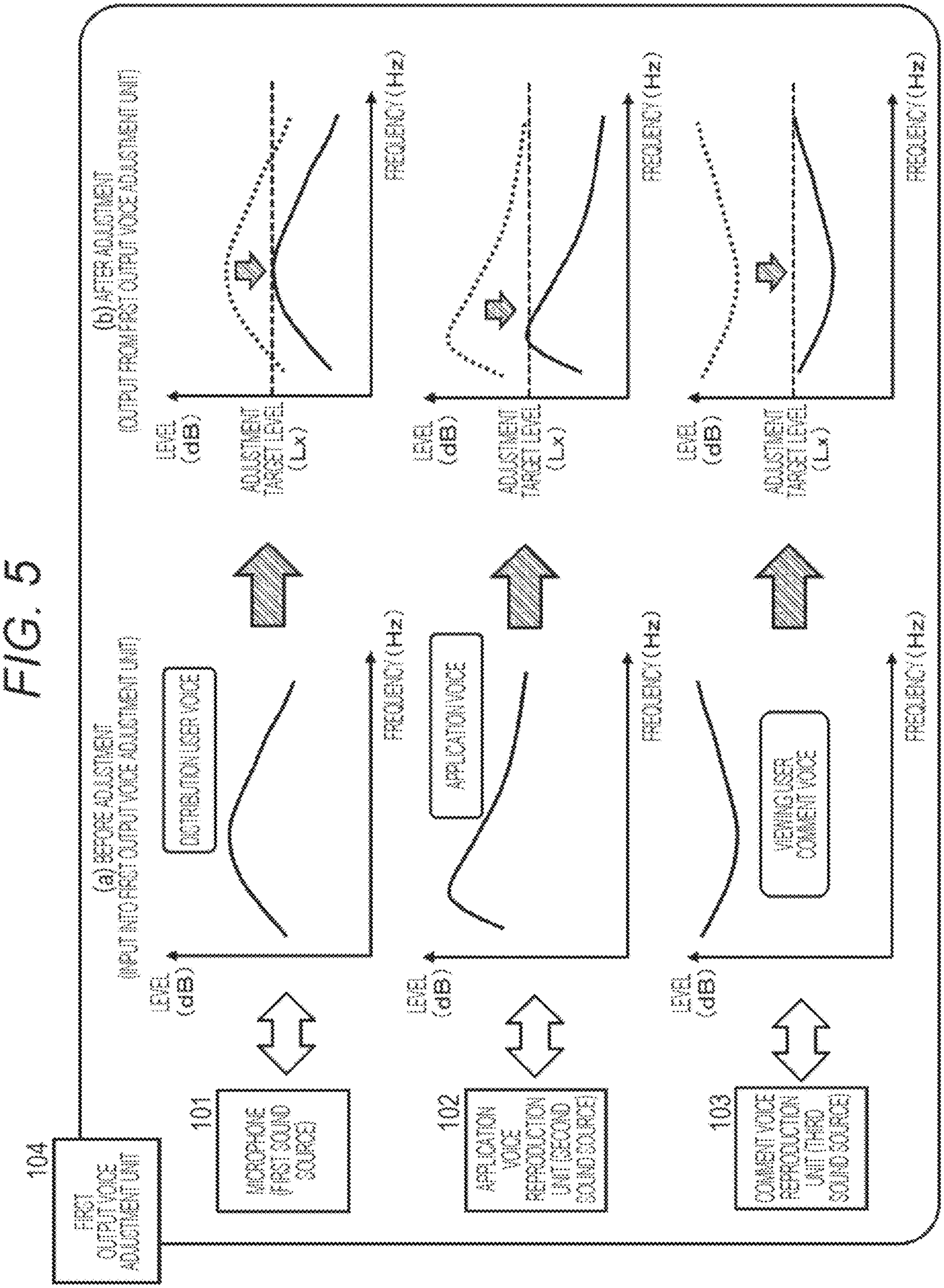
FIG. 5 is a diagram for explaining an example of voice adjustment processing executed by a first output voice adjustment unit of the information processing device (transmission terminal).

For each of the pieces of voice data of the three sound sources input by the first output voice adjustment unit 104, FIG. 5 illustrates these voice characteristics data before and after adjustment including (a) voice data characteristics before the adjustment and (b) voice data characteristics after the adjustment.

Each voice data characteristics is frequency-level corresponding data in which a frequency (Hz) is set on the horizontal axis, and an output level (dB) is set on the vertical axis.

From the top of FIG. 5, (1) (a) the voice data characteristics before the adjustment and (b) the voice data characteristics after the adjustment of the distribution user voice input from the microphone (first sound source) 101

(2) (a) the voice data characteristics before the adjustment and (b) the voice data characteristics after the adjustment of the application voice input from the application voice reproduction unit (second sound source) 102

(3) (a) the voice data characteristics before the adjustment and (b) the voice data characteristics after the adjustment of the viewing user comment voice input from the comment voice reproduction unit (third sound source) 103 the voice data characteristics before and after the adjustment of these three sound sources are illustrated.

The first output voice adjustment unit 104 executes adjustment processing for setting a maximum output of each voice to a predefined adjustment target level (Lx), as adjustment processing on the output voices of these three sound sources.

Note that, as illustrated in the drawing, when the voice of each sound source is adjusted, processing for uniformly decreasing or increasing an entire frequency region is executed. That is, while maintaining the frequency characteristics (=curved shape of graph) of each sound source, a maximum output value of each sound source is adjusted to be set to the predefined adjustment target level (Lx).

Through this adjustment processing, outputs (volume) from the three different sound sources are balanced, and a problem is reduced such that the volume of the one sound source is too larger than the others, only the voice of the single sound source can be heard, and the voices of the other sound sources cannot be heard.

That is, through this adjustment processing, in a case where synthesized sound of the three pieces of voice data is reproduced, it is possible to hear the voice data of each sound source with a good balance.

The first output voice adjustment unit 104 generates (b) three pieces of adjusted voice data having the adjusted voice data characteristics (output from first output voice adjustment unit) corresponding to the three sound sources illustrated in FIG. 5 and outputs the adjusted voice data to the voice synthesis unit 105.

The voice synthesis unit 105 synthesizes (mixes) the adjusted voice data of the three sound sources generated by the first output voice adjustment unit 104, that is, (1) the adjusted voice data of the distribution user voice input from the microphone (first sound source) 101, (2) the adjusted voice data of the application voice input from the application voice reproduction unit (second sound source) 102, and (3) the adjusted voice data of the viewing user comment voice input from the comment voice reproduction unit (third sound source) 103, these pieces of adjusted voice data of the three sound sources.

A specific example of voice synthesis processing (mixing processing) executed by the voice synthesis unit 105 will be described with reference to FIG. 6.

Figure 6:
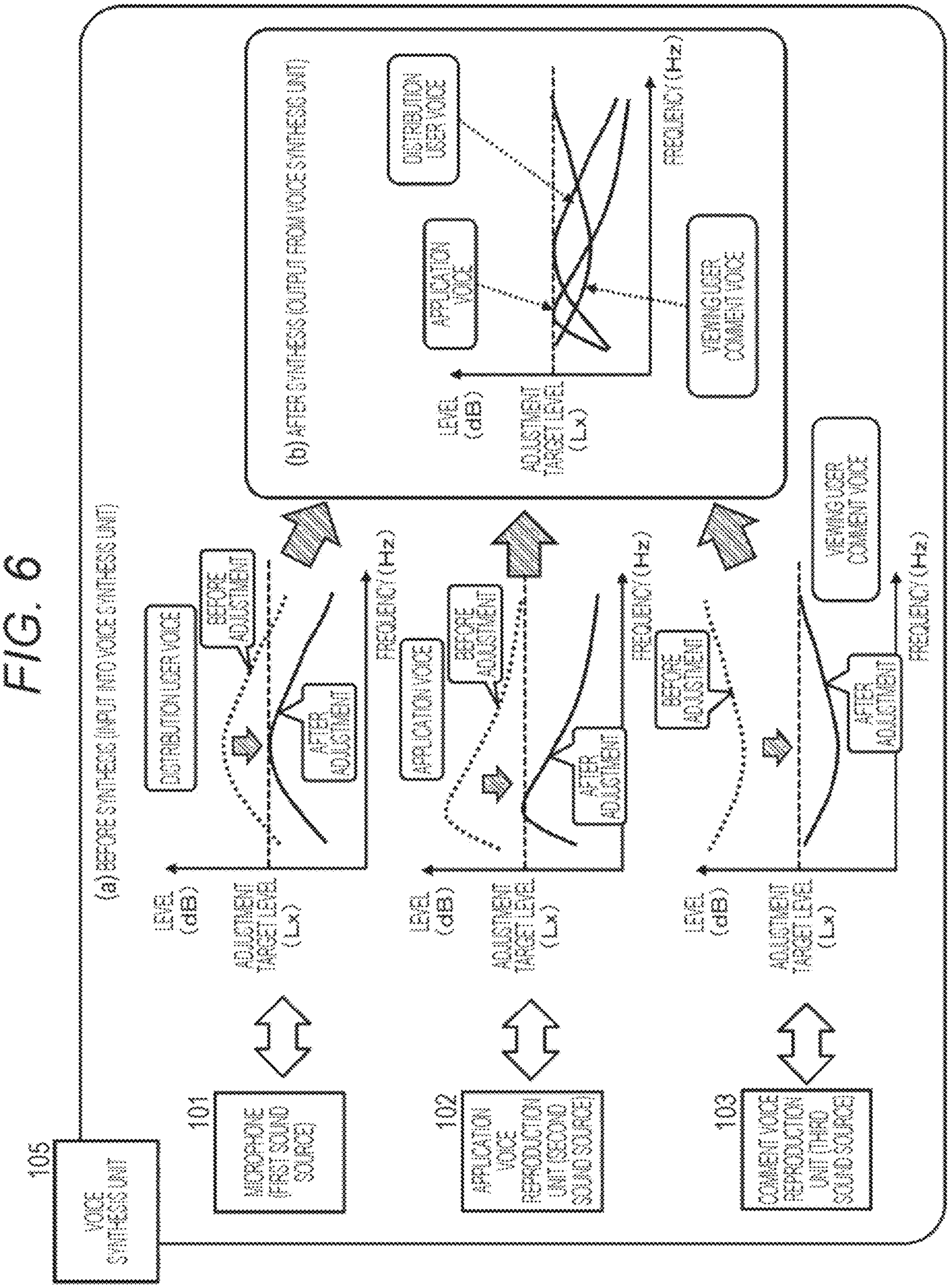
FIG. 6 is a diagram for explaining an example of voice synthesis processing executed by a voice synthesis unit of the information processing device (transmission terminal).

In FIG. 6, as input/output data of the voice synthesis unit 105, (a) before synthesis (input into voice synthesis unit 105)

(b) after synthesis (output from voice synthesis unit 105)

these pieces of data are illustrated.

Each voice data characteristics illustrated in each graph is frequency-level corresponding data in which a frequency (Hz) is set on the horizontal axis and an output level (dB) is set on the vertical axis.

(a) Data before the synthesis (input into voice synthesis unit 105) is adjusted voice characteristics data of the three sound sources input from the first output voice adjustment unit 104.

From the top of FIG. 6 (*a*), the following pieces of adjusted voice characteristics data of the three sound sources are illustrated in order.

(1) Adjusted voice characteristics data of the distribution user voice input from the microphone (first sound source) 101

(2) Adjusted voice characteristics data of the application voice input from the application voice reproduction unit (second sound source) 102

(3) Adjusted voice characteristics data of the viewing user comment voice input from the comment voice reproduction unit (third sound source) 103

These pieces of adjusted voice data characteristics of the three sound sources are illustrated.

Note that, in the voice characteristics data illustrated as (a) before synthesis (input into voice synthesis unit 105) in FIG. 6 (*a*), dotted line data is voice characteristics data before the adjustment by the first output voice adjustment unit 104, and solid line data is voice characteristics data after the adjustment processing by the first output voice adjustment unit 104.

The voice characteristics data after the adjustment processing by the first output voice adjustment unit 104 indicated by the solid line, that is, data of which a maximum output is adjusted to the adjustment target level (Lx) is input data to the voice synthesis unit 105.

The voice synthesis unit 105 synthesizes (mixes) each piece of the following voice data indicated as the solid line data in each graph in FIG. 6 (*a*), that is, (1) the adjusted voice characteristics data of the distribution user voice input from the microphone (first sound source) 101

(2) the adjusted voice characteristics data of the application voice input from the application voice reproduction unit (second sound source) 102

(3) the adjusted voice characteristics data of the viewing user comment voice input from the comment voice reproduction unit (third sound source) 103 these pieces of the adjusted voice data of the three sound sources and generates a single synthesized voice.

In FIG. 6 (*b*), a data characteristics component (frequency-level characteristics) of each piece of sound source data included in the single synthesized voice generated by synthesis (mixing) processing on the adjusted voice data of the three sound sources by the voice synthesis unit 105 is illustrated.

Three curves overlapped and illustrated in the graph illustrated in FIG. 6 (*b*) are respectively curves indicating the adjusted voice characteristics data indicated by the solid line in the graph in FIG. 6 (*a*).

As understood from the graph illustrated in FIG. 6 (*b*), all maximum output levels of the respective pieces of data of the three sound sources included in the synthesized voice are set to be the adjustment target level (Lx).

That is, the outputs of the three sound sources are averaged, and there is no sound source data having a protruding maximum value.

Therefore, in a case where this synthesized sound is reproduced, volume levels of the pieces of voice data of the three sound sources are substantially the same level, and a problem such that the voice data of the other sound source is difficult to be heard due to the voice data of one sound source is solved.

The synthesized voice data generated by the voice synthesis unit 105 is distributed via the communication unit 106 and is reproduced by the information processing device (reception terminal) 200 on the side of the viewing user 30.

The synthesized voice data reproduced by the information processing device (reception terminal) 200 on the side of the viewing user 30 is synthesized voice data including the pieces of adjusted voice characteristics data of the three sound sources indicated by the three curves in the graph illustrated in FIG. 6 (*b*).

That is, the data is (1) the adjusted voice characteristics data of the distribution user voice input from the microphone (first sound source) 101

(2) the adjusted voice characteristics data of the application voice input from the application voice reproduction unit (second sound source) 102

(3) the adjusted voice characteristics data of the viewing user comment voice input from the comment voice reproduction unit (third sound source) 103 the synthesized voice data including these pieces of the adjusted voice characteristics data of the three sound sources.

As described above, the maximum value of the output level of each of the three sound sources included in the synthesized voice is adjusted to be the adjustment target level (Lx), and is adjusted so that there is no sound source data having an enormous maximum value. Therefore, the maximum volume levels of the pieces of voice data of the three sound sources in the synthesized voice reproduced by the information processing device (reception terminal) 200 on the side of the viewing user are substantially the same level, a possibility that a problem occurs such that the voice data of the other sound sources is difficult to be heard due to the voice data of any one of the sound sources, and it is possible to uniformly hear the pieces of voice data of all the sound sources.

Note that, in the embodiment, a processing example is described in which the first output voice adjustment unit 104 performs adjustment for setting the maximum value of the output level of each of the three sound sources to one same adjustment target level (Lx). However, the first output voice adjustment unit 104 may have a configuration that executes other adjustment processing, without limiting to this adjustment example.

Another adjustment example executed by the first output voice adjustment unit 104 will be described with reference to FIGS. 7 and 8.

Figure 7:
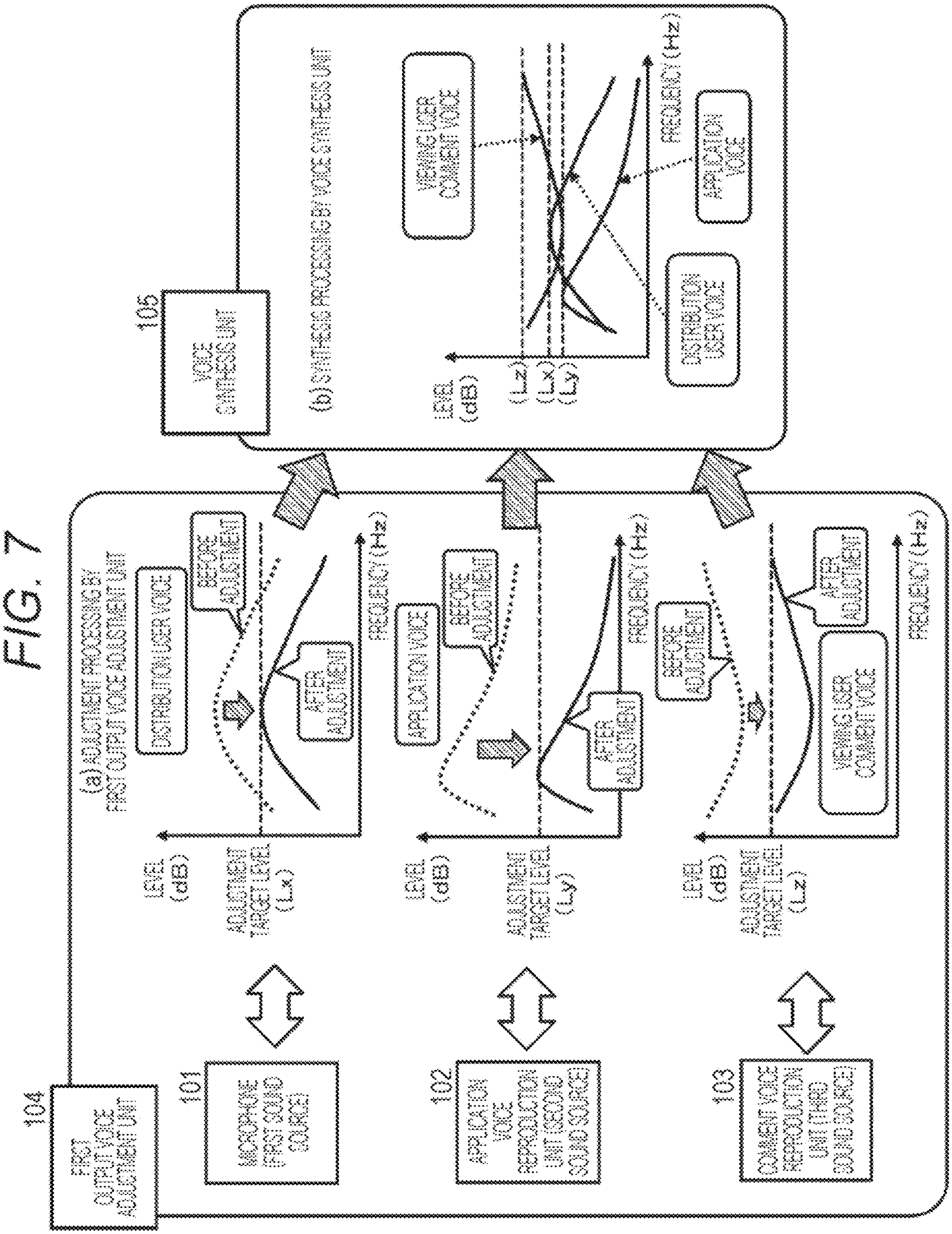
FIG. 7 is a diagram for explaining an example of the voice adjustment processing executed by the first output voice adjustment unit and an example of the voice synthesis processing executed by the voice synthesis unit, of the information processing device (transmission terminal).

FIG. 7 is a diagram collectively illustrating the adjustment processing executed by the first output voice adjustment unit 104 and the synthesis processing executed by the voice synthesis unit 105.

(a) The adjustment processing of the first output unit 104
(b) The synthesis processing of the voice synthesis unit 105

Each of these types of processing is illustrated.

In the adjustment processing of the first output unit 104 in FIG. 7 (*a*), from the top, (1) an adjustment processing example of the distribution user voice input from the microphone (first sound source) 101
(2) an adjustment processing example of the application voice input from the application voice reproduction unit (second sound source) 102
(3) an adjustment processing example of the viewing user comment voice input from the comment voice reproduction unit (third sound source) 103 these adjustment processing examples of the output voices from the three sound sources are illustrated.

Dotted line data on each graph is the voice characteristics data before the adjustment (frequency-level characteristics), and solid line data is the adjusted voice characteristics data (frequency-level characteristics).

As understood from the drawing, the first output voice adjustment unit 104 executes adjustment processing for setting a maximum output of each voice to a predefined adjustment target level (Lx, Ly, Lz) specific for a sound source in correspondence with each sound source, as the adjustment processing on the output voices of the three sound sources.

That is (1) On the distribution user voice input from the microphone (first sound source) 101, the adjustment processing for setting the maximum output to the predefined adjustment target level (Lx) specific for the distribution user voice is executed.
(2) On the application voice input from the application voice reproduction unit (second sound source) 102, the adjustment processing for setting the maximum output to the predefined adjustment target level (Ly) specific for the application voice is executed.
(3) On the viewing user comment voice input from the comment voice reproduction unit (third sound source) 103, the adjustment processing for setting the maximum output to the predefined adjustment target level (Lz) specific for the viewing user comment voice is executed.

In this way, the first output voice adjustment unit 104 executes the adjustment processing for setting a maximum output of each voice to each of the predefined specific adjustment target levels (Lx, Ly, Lz) in correspondence with each sound source, as the adjustment processing on the output voices of the three sound sources.

In FIG. 7 (*b*), a data characteristics component (frequency-level characteristics) of each piece of sound source data included in a single synthesized voice generated by the synthesis (mixing) processing on the adjusted voice data of the three sound sources by the voice synthesis unit 105 is illustrated.

Each of three curves overlapped and indicated in the graph illustrated in FIG. 7 (*b*) corresponds to the adjusted voice characteristics indicated by the solid line in FIG. 7 (*a*).

As understood from the graph illustrated in FIG. 7 (*b*), the maximum output level of the data of each of the three sound sources included in the synthesized voice is set to the specific adjustment target level (Lx, Ly, Lz) predefined in correspondence with each sound source.

In a case where this synthesized sound is reduced, since the maximum value of the volume levels of the pieces of voice data of the three sound sources is reduced than that before being adjusted, the problem in that the voice data of the other sound source is difficult to be heard due to the voice data of one sound source is reduced.

Figure 8:
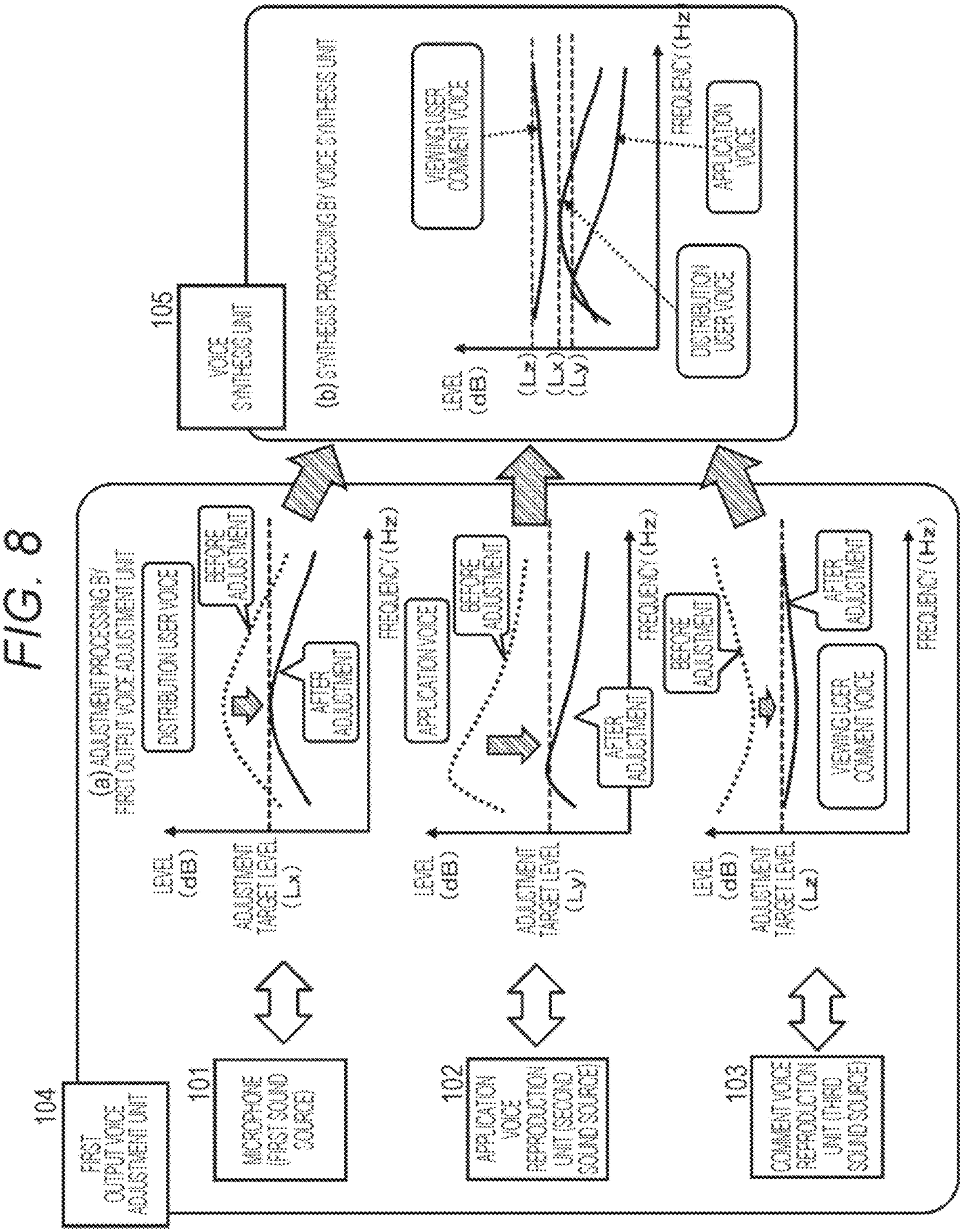
FIG. 8 is a diagram for explaining an example of the voice adjustment processing executed by the first output voice adjustment unit and an example of the voice synthesis processing executed by the voice synthesis unit, of the information processing device (transmission terminal).

FIG. 8 is a diagram for explaining another adjustment example executed by the first output voice adjustment unit 104.

As in FIG. 7, in FIG. 8, the adjustment processing executed by the first output voice adjustment unit 104 and the synthesis processing executed by the voice synthesis unit 105 are collectively illustrated.

(a) The adjustment processing of the first output unit 104
(b) The synthesis processing of the voice synthesis unit 105

Each of these types of processing is illustrated.

In the adjustment processing of the first output unit 104 in FIG. 8 (*a*), from the top, (1) an adjustment processing example of the distribution user voice input from the microphone (first sound source) 101
(2) an adjustment processing example of the application voice input from the application voice reproduction unit (second sound source) 102
(3) an adjustment processing example of the viewing user comment voice input from the comment voice reproduction unit (third sound source) 103 these adjustment processing examples of the output voices from the three sound sources are illustrated.

Dotted line data on each graph is the voice characteristics data before the adjustment (frequency-level characteristics), and solid line data is the adjusted voice characteristics data (frequency-level characteristics).

The example illustrated in FIG. 8 is an adjustment example in which the first output voice adjustment unit 104 executes the adjustment processing for setting the maximum output of each voice to the adjustment target level (Lx, Ly, Lz) specific for each sound source, as in the adjustment processing described with reference to FIG. 7 in advance, and executes adjustment processing for reducing a difference in the output level in accordance with a frequency change, as the adjustment processing on the output voices of the three sound sources.

That is, the example illustrated in FIG. 8 is an example in which the following adjustment processing is executed, in addition to the adjustment processing described with reference to FIG. 7.

Regarding the voice characteristics data (frequency-level characteristics) before being adjusted indicated by the dotted line of each sound source, the adjustment processing for reducing the difference in the output level in accordance with the frequency change is executed, and a curved line is adjusted to a direction to be uniform (flat), and the voice characteristics data (frequency-level characteristics) after being adjusted indicated by the solid line is generated.

By performing such adjustment for reducing the output difference in accordance with the frequency, it is possible to suppress a large volume of a specific frequency.

In this way, in the example illustrated in FIG. 8, the first output voice adjustment unit 104 executes the adjustment processing for setting the maximum output of each voice to the specific adjustment target level (Lx, Ly, Lz) predefined in accordance with each sound source and reducing the output difference in accordance with the frequency, as the adjustment processing on the output voices of the three sound sources.

In FIG. 8 (*b*), a data characteristics component (frequency-level characteristics) of each piece of sound source data included in a single synthesized voice generated by the synthesis (mixing) processing on the adjusted voice data of the three sound sources by the voice synthesis unit 105 is illustrated.

Each of three curves overlapped and indicated in the graph illustrated in FIG. 8 (*b*) corresponds to the adjusted voice characteristics indicated by the solid line in FIG. 8 (*a*).

As understood from the graph illustrated in FIG. 8 (*b*), regarding each of the pieces of data of the three sound sources included in the synthesized voice, the maximum output level is set to the specific adjustment target level (Lx, Ly, Lz) corresponding to each sound source, and in addition, the difference in the output level in accordance with the frequency is reduced.

In a case where this synthesized sound is reproduced, the maximum value of the volume levels of the pieces of the voice data of the three sound sources is further reduced than that before being adjusted, and reproduced sound that is flat over the entire frequency region is output.

Note that, in the above embodiment, an example has been described in which the voice data to be synthesized includes following pieces of voice data of three sound sources.

(1) An input voice of the microphone (first sound source) 101

(2) A reproduction voice of the application voice reproduction unit (second sound source) 102

(3) A reproduction voice of the comment voice reproduction unit (third sound source) 103, The voice data synthesized and distributed by the information processing device (transmission terminal) 100 on the side of the distribution user 20 is not limited to the pieces of voice data of the three sound sources. For example, the synthesis processing and the distribution processing on the voice data of only two of the three sound sources may be executed.

Moreover, voice data of a sound source other than the above three sound sources can be set as voice data to be synthesized and distributed.

3. (Second Embodiment) about Configuration and Processing of Information Processing Device (Transmission Terminal) that Executes Voice Output Adjustment in Accordance with Type of Distribution Content Next, a configuration and processing on the information processing device (transmission terminal) that executes voice output adjustment in accordance with a type of distribution content will be described as a second embodiment of the present disclosure.

A distribution user 20 can distribute various types of content using the information processing device (transmission terminal).

For example, it is possible to execute and distribute various types of content compatible applications such as game content, music content, or educational content.

The second embodiment described below is an embodiment of an information processing device (transmission terminal) that executes different voice output adjustment processing in accordance with the type of the distribution content.

Figure 9:
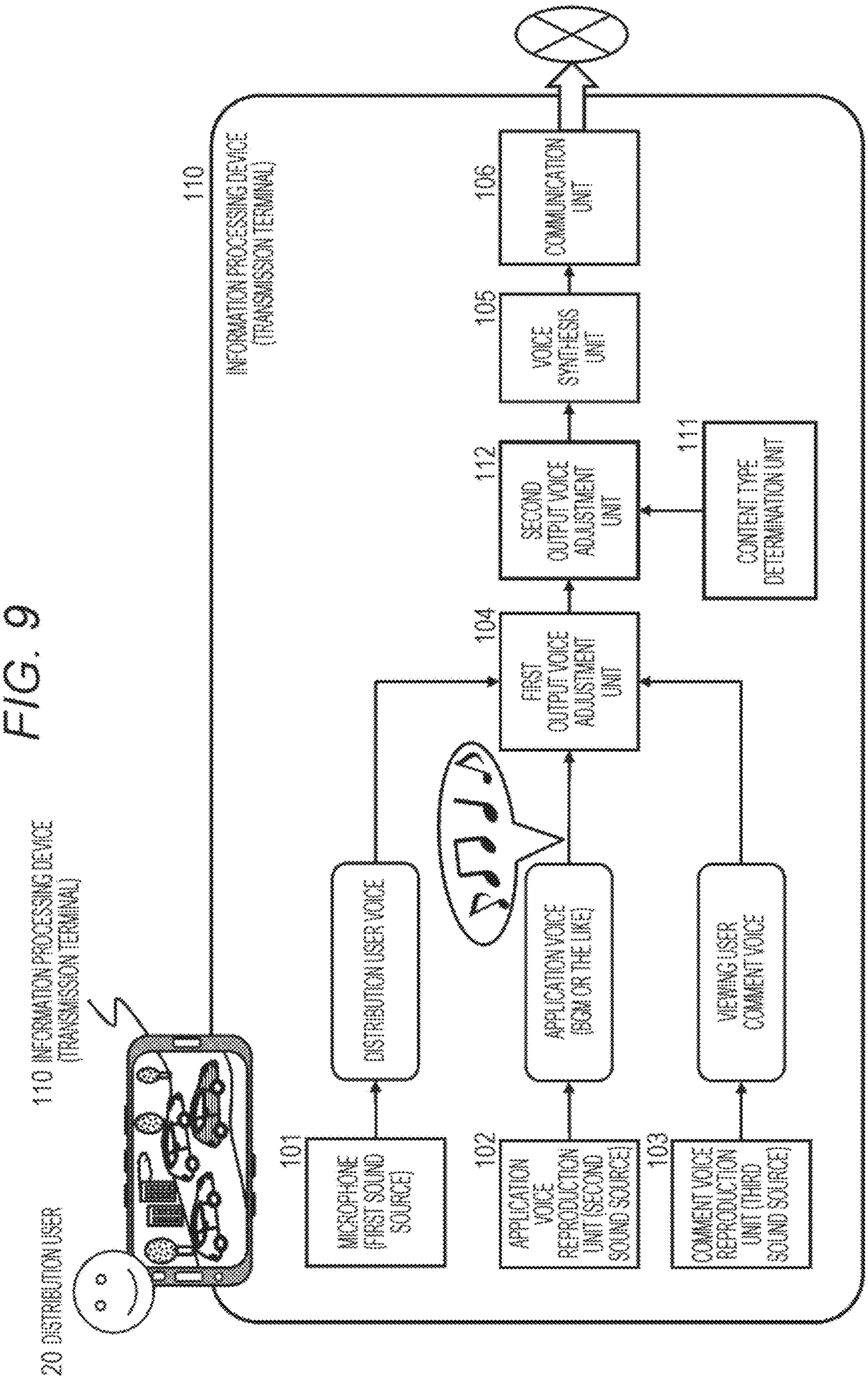
FIG. 9 is a diagram for explaining a configuration example (second embodiment) of the information processing device (transmission terminal).

FIG. 9 is a diagram illustrating a configuration example of an information processing device (transmission terminal) 110 according to the second embodiment of the present disclosure.

As illustrated in FIG. 9, the information processing device (transmission terminal) 110 includes a microphone (first sound source) 101, an application voice reproduction unit (second sound source) 102, a comment voice reproduction unit (third sound source) 103, a first output voice adjustment unit 104, a voice synthesis unit 105, a communication unit 106, and in addition, a content type determination unit 111 and a second output voice adjustment unit 112.

Note that the configuration illustrated in FIG. 9 is a partial configuration of the information processing device (transmission terminal) 110 and is a block diagram mainly illustrating a configuration to be applied to the voice output adjustment processing of the present disclosure. In addition to the components illustrated in the drawing, the information processing device (transmission terminal) 110 includes, for example, components similar to those of a general smartphone (smartphone), such as a display unit, an input unit, a control unit, or a storage unit.

A configuration of the information processing device (transmission terminal) 110 according to the second embodiment is a configuration in which the content type determination unit 111 and the second output voice adjustment unit 112 are added to the configuration of the information processing device (transmission terminal) 100 according to the first embodiment described above with reference to FIG. 4.

The microphone (first sound source) 101 is a microphone included in the information processing device (transmission terminal) 110, and for example, inputs a voice of the distribution user 20 who is executing a game application using the information processing device (transmission terminal) 110 and inputs the voice into the first output voice adjustment unit 104.

As illustrated in FIG. 9, a distribution user voice input into the microphone (first sound source) 101 is input into the first output voice adjustment unit 104.

The application voice reproduction unit (second sound source) 102 generates reproduced sound of an application executed by the information processing device (transmission terminal) 110 and an application voice illustrated in the drawing and outputs the generated sound and voice to the first output voice adjustment unit 104.

For example, in a case where the distribution user 20 executes an automobile race game application with the information processing device (transmission terminal) 110, the application voice reproduction unit (second sound source) 102 generates a BGM generated by the game application, various sounds generated in the game, for example, various sounds such as engine sound of an automobile, a cheer of an audio, or a collision sound at the time of crash, as reproduced sounds and outputs the sound to the first output voice adjustment unit 104.

The comment voice reproduction unit (third sound source) 103 reproduces an image and voice data transmitted from the information processing device (transmission terminal) 110 and reproduces a comment of a viewing user 30 who is viewing.

While receiving and reproducing an application execution screen and the voice data transmitted from the information processing device (transmission terminal) 110 on a side of the distribution user 20 by the information processing device (reception terminal) 200 on the side of the viewing user 30, the viewing user 30 inputs a text of a comment such as a support message into the information processing device (reception terminal) 200.

This input comment is transmitted to the information processing device (transmission terminal) 110 on the side of the distribution user 20, via a network.

The comment voice reproduction unit 103 of the information processing device (transmission terminal) 110 on the side of the distribution user 20 converts the comment received from the information processing device (reception terminal) 200 into voice data, generates a comment voice, and outputs the generated comment voice (viewing user comment voice) to the first output voice adjustment unit 104.

Note that the viewing user 30 may directly voice-input a comment such as a support message via a microphone of the information processing device (reception terminal) 200. In this case, this input voice comment is transmitted to the information processing device (transmission terminal) 100 on the side of the distribution user 20, via the network.

In this case, the comment voice reproduction unit 103 of the information processing device (transmission terminal) 110 on the side of the distribution user 20 outputs the voice comment received from the information processing device (reception terminal) 200 to the first output voice adjustment unit 104.

Next, the first output voice adjustment unit 104 executes adjustment processing on an output voice of each sound source, as in the first embodiment described above.

That is, the first output voice adjustment unit 104 inputs the following three pieces of voice data.

(1) The distribution user voice from the microphone (first sound source) 101, (2) The application voice from the application voice reproduction unit (second sound source) 102, and (3) The viewing user comment voice from the comment voice reproduction unit (third sound source) 103, The first output voice adjustment unit 104 inputs the three pieces of voice data from these three sound sources and executes output adjustment processing on the voice data of each sound source.

The first output voice adjustment unit 104 executes, for example, the adjustment processing described above with reference to FIG. 5.

That is, the first output voice adjustment unit 104 executes adjustment processing for setting a maximum output of output voices of the three sound sources to a predefined adjustment target level (Lx).

Note that, as described above with reference to FIG. 5, when the voice of each sound source is adjusted, processing for uniformly decreasing or increasing an entire frequency region is executed. That is, while maintaining the frequency characteristics (=curved shape of graph) of each sound source, a maximum output value of each sound source is adjusted to be set to the predefined adjustment target level (Lx).

Through this adjustment processing, outputs (volumes) from the three different sound sources are balanced, and a problem such that the volume of one sound source is too large as compared with the others is reduced.

The first output voice adjustment unit 104 generates (b) three pieces of adjusted voice data having the adjusted voice data characteristics (output from first output voice adjustment unit) corresponding to the three sound sources illustrated in FIG. 5 and outputs the adjusted voice data to the second output voice adjustment unit 112.

The second output voice adjustment unit 112 is a voice output adjustment unit that is not included in the first embodiment described above.

The second output voice adjustment unit 112 executes the voice output adjustment processing in accordance with a type of content executed and distributed with the information processing device (transmission terminal) 110 by the distribution user 20, for example, various different types of content such as game content, music content, or educational content.

The second output voice adjustment unit 112 inputs information regarding the type of the content executed and distributed with the information processing device (transmission terminal) 110 by the distribution user 20 from the content type determination unit 111 and executes the output voice adjustment processing in accordance with the input content type.

The type of the content is, for example, a type in accordance with content of the content such as the game content, the music content, or the educational content. The game content may be further classified into battle-type content, race-type content, or the like in accordance with game content.

The content type determination unit 111 reads, for example, attribute information such as a title or a category of the content activated and executed by the information processing device (transmission terminal) 110 from a memory in the information processing device (transmission terminal) 110, determines the content type, and notifies the second output voice adjustment unit 112 of the content type.

Note that, in a case where it is not possible to acquire the attribute information such as the title or the category of the content from the memory in the information processing device (transmission terminal) 110, the content type determination unit 111 may execute processing for acquiring attribute information (hash tag information or the like) of the distribution user 20 who is using the information processing device (transmission terminal) 110 from the memory in the information processing device (transmission terminal) 110, determining the type of the content that is preferably executed by the distribution user 20, and notifying the second output voice adjustment unit 112 of the type of the content.

Alternatively, processing for reading distribution history data recorded in the memory in the information processing device (transmission terminal) 110, determining a type of content estimated from the distribution history data, and notifying the second output voice adjustment unit 112 of the type of the content may be executed.

The second output voice adjustment unit 112 further executes the output adjustment processing on the output voice from each sound source in accordance with the content type input from the content type determination unit 111, specifically, the output voice adjusted by the first output voice adjustment unit 104, for each of adjusted voices of the three sound sources adjusted by the first output voice adjustment unit 104.

Figure 10:
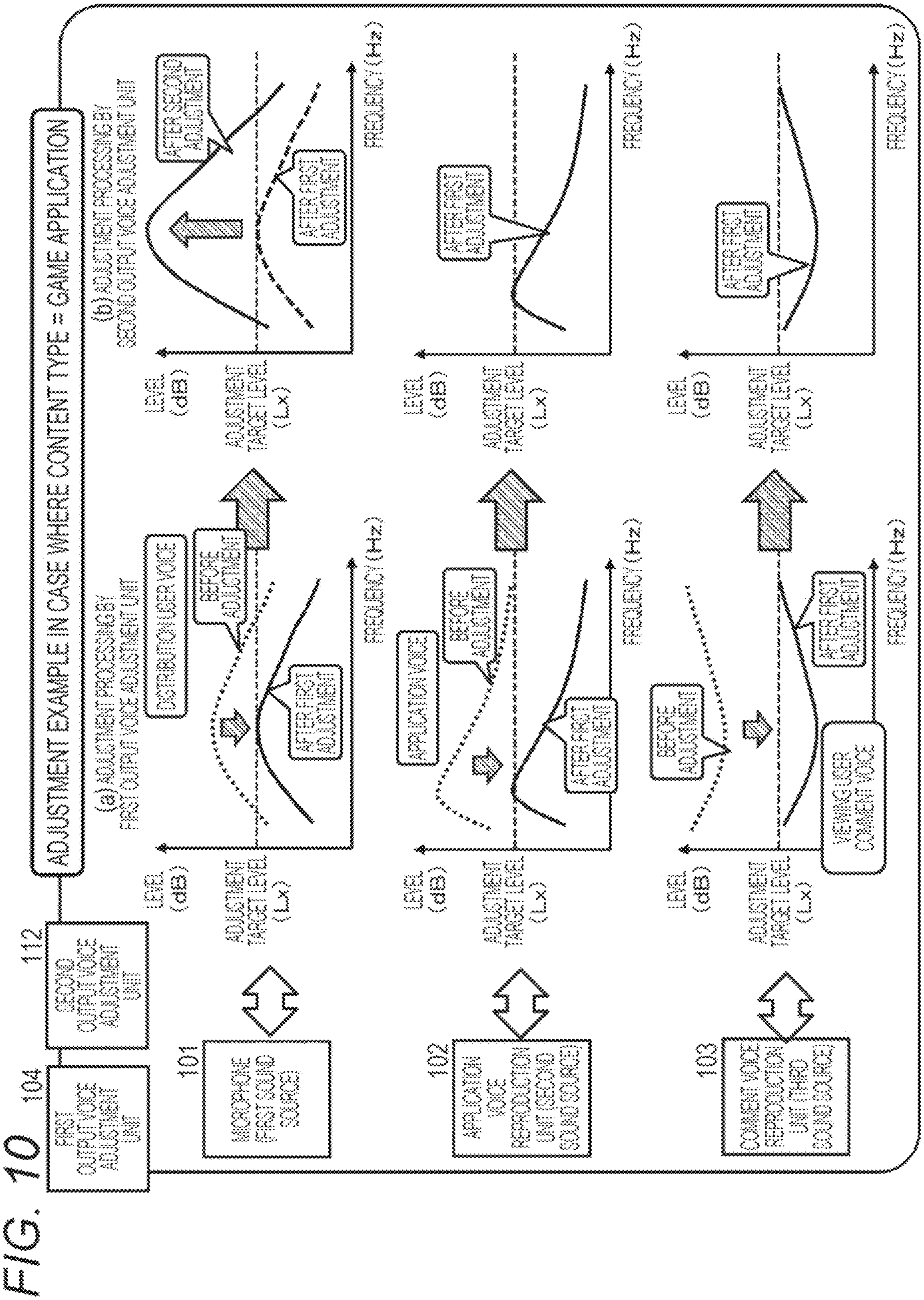
FIG. 10 is a diagram for explaining an example of voice adjustment processing executed by the first output voice adjustment unit and a second output voice adjustment unit of the information processing device (transmission terminal).

With reference to FIG. 10 and subsequent drawings, a specific example of the output adjustment processing in accordance with the content type executed by the second output voice adjustment unit 112 and the voice synthesis processing executed by the voice synthesis unit 105 will be described.

The following two processing examples will be sequentially described.

(Processing Example 1) A processing example in a case where content executed and distributed by the distribution user 20 using the information processing device (transmission terminal) 110 is the game content (Processing Example 2) A processing example in a case where content executed and distributed by the distribution user 20 using the information processing device (transmission terminal) 110 is the music content

3-1. (Processing Example 1) Voice Output Adjustment Processing in a Case where Distribution Content is Game Content First, with reference to FIGS. 10 and 11, a specific example of the output adjustment processing in accordance with the content type executed by the second output voice adjustment unit 112 and the voice synthesis processing executed by the voice synthesis unit 105 in a case where the content executed and distributed by the distribution user 20 using the information processing device (transmission terminal) 110 is the game content will be described.

First, with reference to FIG. 10, a specific example of the output adjustment processing corresponding to each sound source executed by the first output voice adjustment unit 104 and the second output voice adjustment unit 112 executed in a case where the distribution content is the game content will be described.

In FIG. 10, from the top, (1) An adjustment processing example on the distribution user voice input from the microphone (first sound source) 101

(2) An adjustment processing example on the application voice input from the application voice reproduction unit (second sound source) 102

(3) An adjustment processing example on the viewing user comment voice input from the comment voice reproduction unit (third sound source) 103

In FIG. 10, a specific example of the output voice adjustment processing by the following two output adjustment units on each of the pieces of voice data of these three sound sources is illustrated.

(a) Adjustment processing by the first output voice adjustment unit 104

(b) Adjustment processing by the second output voice adjustment unit 112

Each of the graphs illustrated in FIGS. 10(*a*) and 10(*b*) illustrates voice characteristics data of output sound of each sound source. It is frequency-level corresponding data in which a frequency (Hz) is set on the horizontal axis, and an output level (dB) is set on the vertical axis.

The adjustment processing by the first output voice adjustment unit 104 illustrated in FIG. 10 (*a*) is processing similar to the processing described above with reference to FIG. 5, and the adjustment processing for setting the maximum output of each voice to the predefined adjustment target level (Lx) is executed as the adjustment processing on the output voices of the three sound sources.

Dotted line data illustrated in each graph in FIG. 10(*a*) is voice characteristics data before being adjusted by the first output voice adjustment unit 104, that is, voice characteristics data of a voice output from each sound source, and solid line data is voice characteristics data after first adjustment by the first output voice adjustment unit 104.

Note that, hereinafter, the voice output adjustment by the first output voice adjustment unit 104 is defined and described as "first adjustment", and the voice output adjustment by the second output voice adjustment unit 112 is defined and described as "second adjustment".

The voice data after the first adjustment by the first output voice adjustment unit 104 is input into the second output voice adjustment unit 112. That is, first-adjusted data corresponding to the three sound sources having the voice characteristics indicated as the first-adjusted data (solid line data) in each graph in FIG. 10(*a*) is input into the second output voice adjustment unit 112, and second adjustment processing in accordance with the content type is executed.

The example illustrated in FIG. 10 is an adjustment processing example in a case where the distribution content type=the game content.

FIG. 10(*b*) is a specific example of adjustment processing on the output voices (distribution user voice, application voice, and viewing user comment voice) from the three sound sources executed by the second output voice adjustment unit 112 in a case where the distribution content type=the game content.

As illustrated in FIG. 10(*b*), in a case where the distribution content type=the game content, the second output voice adjustment unit 112 executes the following second adjustment processing on the output voices (distribution user voice, application voice, and viewing user comment voice) from the three sound sources.

(1) As the second adjustment processing on the distribution user voice input from the microphone (first sound source) 101, output adjustment for entirely increasing an output level and further emphasizing frequency characteristics (=curve shape of graph) is performed. That is, the adjustment processing for increasing a difference in the output level in accordance with the frequency is executed.

(2) The second adjustment processing on the application voice input from the application voice reproduction unit (second sound source) 102 is not executed.

(3) The second adjustment processing on the viewing user comment voice input from the comment voice reproduction unit (third sound source) 103 is not executed.

In this way, in a case where the distribution content type=the game content, the second output voice adjustment unit 112 executes only the second adjustment processing on the distribution user voice input from the microphone (first sound source) 101, does not execute the second adjustment processing on the application voice and the viewing user comment voice, and outputs the first-adjusted data.

That is, in a case where the content type=the game content, the second output voice adjustment unit 112 executes output level-up processing and specific frequency component emphasis processing only on the distribution user voice input from the microphone (first sound source) 101 and outputs the voice to the next voice synthesis unit 105.

Note that the voice output adjustment example corresponding to each sound source by the second output voice adjustment unit 112 illustrated in FIG. 10 (*b*) is an example, and a configuration may be used in which adjustment is performed in another adjustment mode.

Next, a specific example of processing of the voice synthesis unit 105 will be described with reference to FIG. 11.

The voice synthesis unit 105 executes synthesis processing (mixing processing) on adjusted voice data obtained by adjusting the output voices (distribution user voice, application voice, and viewing user comment voice) of the three sound sources by the first output voice adjustment unit 104 and the second output voice adjustment unit 112.

Figure 11:
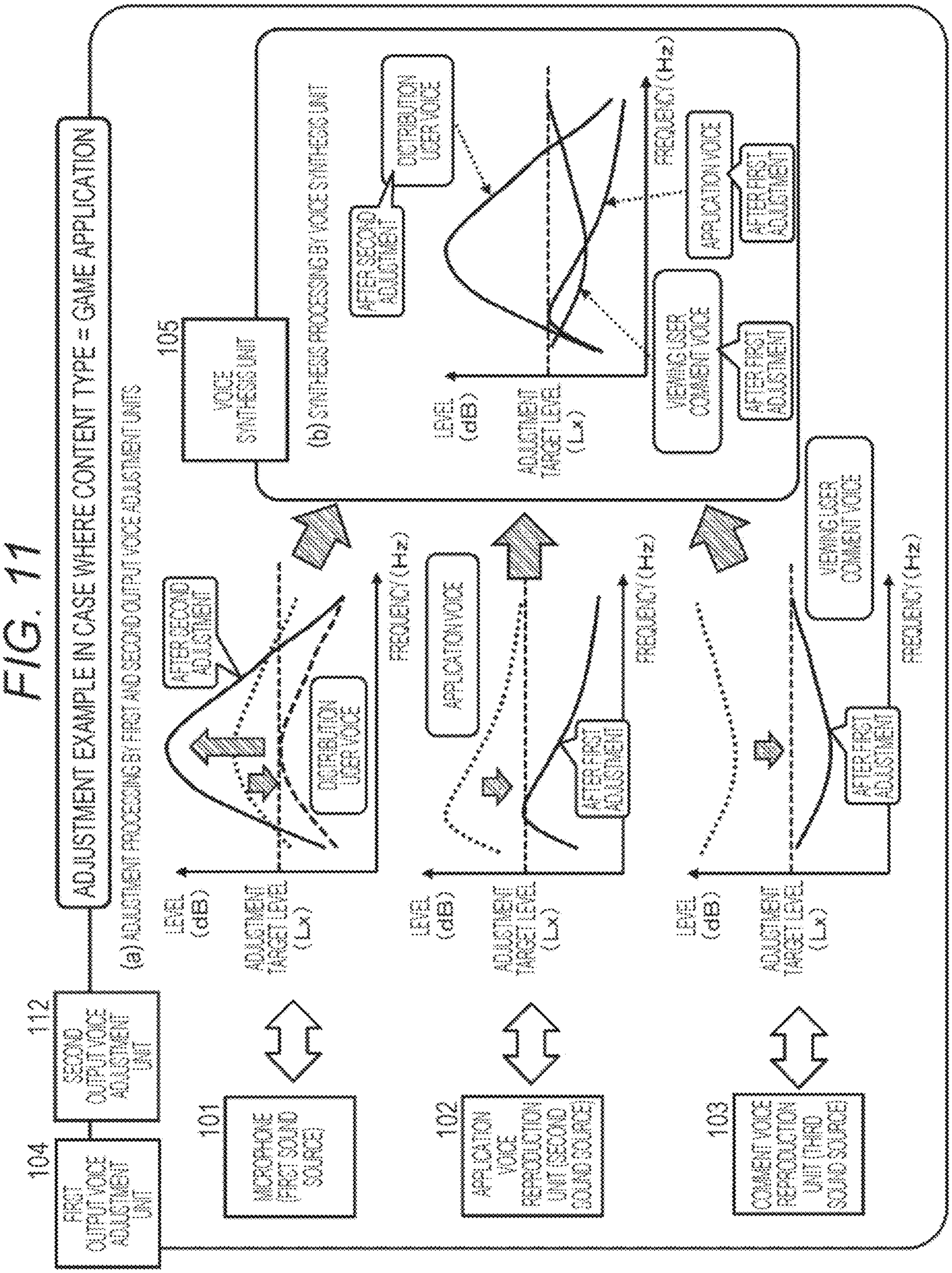
FIG. 11 is a diagram for explaining an example of the voice adjustment processing executed by the first output voice adjustment unit and the second output voice adjustment unit and an example of the voice synthesis processing executed by the voice synthesis unit, of the information processing device (transmission terminal).

In FIG. 11, each following processing example is illustrated.

(a) An adjustment processing example by the first output voice adjustment unit 104 and the second output voice adjustment unit 112

(b) A synthesis processing example of the voice synthesis unit

In FIG. 11 (*a*), from the top, (1) An adjustment processing example by the first output voice adjustment unit 104 and the second output voice adjustment unit 112 on the distribution user voice input from the microphone (first sound source) 101

(2) An adjustment processing example by the first output voice adjustment unit 104 and the second output voice adjustment unit 112 on the application voice input from the application voice reproduction unit (second sound source) 102

(3) An adjustment processing example by the first output voice adjustment unit 104 and the second output voice adjustment unit 112 on the viewing user comment voice input from the comment voice reproduction unit (third sound source) 103 are illustrated.

Note that, as described above with reference to FIG. 10, in a case where the distribution content type=the game content, the second output voice adjustment unit 112 executes the output level-up processing or the specific frequency component emphasis processing on only the distribution user voice input from the microphone (first sound source) 101.

In the graph of the distribution user voice illustrated in the uppermost stage in FIG. 11 (*a*), the following three pieces of voice characteristics (frequency-level characteristics) data are illustrated.

(p) Pre-adjustment data of the distribution user voice input from the microphone (first sound source) 101 (fine dotted line data)

(q) First-adjusted data by the first output voice adjustment unit 104 for the distribution user voice input from the microphone (first sound source) 101 (rough dotted line data)

(r) Second-adjusted data obtained by performing two adjustments by the first output voice adjustment unit 104 and the second output voice adjustment unit 112 on the distribution user voice input from the microphone (first sound source) 101 (solid line data)

The data of (r), that is, the voice data having the voice characteristics indicated by the solid line in the graph is input into the voice synthesis unit 105.

That is, the second-adjusted data (solid line data) obtained by executing the two types of adjustment processing by the first output voice adjustment unit 104 and the second output voice adjustment unit 112 on the distribution user voice input from the microphone (first sound source) 101 is input.

On the application voice input from the application voice reproduction unit (second sound source) 102 and the viewing user comment voice input from the comment voice reproduction unit (third sound source) 103 illustrated in the middle stage and the lower stage in FIG. 11 (*a*), the adjustment processing only by the first output voice adjustment unit 104 is executed, and the adjustment processing by the second output voice adjustment unit 112 is not executed.

Therefore, the voice data having the voice characteristics indicated by the solid line as the first-adjusted data in each graph in the middle stage or the lower stage in FIG. 11 (*a*) is input into the voice synthesis unit 105.

In FIG. 11 (*b*), a specific example of the voice synthesis processing (mixing processing) executed by the voice synthesis unit 105 is illustrated.

In the graph illustrated in FIG. 11 (*b*), a data characteristics component (frequency-level characteristics) of each piece of sound source data included in a single synthesized voice generated by synthesis (mixing) processing on the adjusted voice data of the three sound sources by the voice synthesis unit 105 is illustrated.

Each of three curves overlapped and indicated in the graph illustrated in FIG. 11 (*b*) corresponds to the adjusted voice characteristics indicated by the solid line in the graph in FIG. 11 (*a*).

That is, (1) the second-adjusted data obtained by executing the two types of adjustment processing by the first output voice adjustment unit 104 and the second output voice adjustment unit 112 on the distribution user voice input from the microphone (first sound source) 101

(2) first-adjusted data obtained by executing the single type of adjustment processing by only the first output voice adjustment unit 104 on the application voice input from the application voice reproduction unit (second sound source) 102

(3) first-adjusted data obtained by executing the single type of adjustment processing by only the first output voice adjustment unit 104 on the viewing user comment voice input from the comment voice reproduction unit (third sound source) 103 are illustrated.

The voice synthesis unit 105 generates such voice synthesized data having voice component data of each sound source and distributes the data via the communication unit 106.

The information processing device (reception terminal) 200 on the side of the viewing user 30 reproduces synthesized sound having a voice component corresponding to each sound source illustrated in FIG. 11(*b*).

In this case, as compared with the other voices, the voice of the distribution user is output as a voice that is easier to be heard.

Note that, the processing examples described with reference to FIGS. 10 and 11, that is, an output adjustment example of each sound source voice of the second output voice adjustment unit 112 in a case where the distribution content type=the game content is an example, and a configuration may be used in which adjustment is performed in a mode other than the above adjustment examples in a case where the distribution content type=the game content.

Furthermore, regarding the output adjustment processing of the voice corresponding to each sound source by the first output voice adjustment unit 104, in the processing examples described with reference to FIGS. 10 and 11, an example has been described in which the adjustment is performed for setting the maximum value of the output level of each of the three sound sources to the same single adjustment target level (Lx). However, without limiting to this adjustment example, the first output voice adjustment unit 104 may have a configuration for executing the adjustment processing described above with reference to FIGS. 7 and 8 and other adjustment processing.

3-2. (Processing Example 2) Voice Output Adjustment Processing in a Case where Distribution Content is Music Content Next, with reference to FIG. 12 and the subsequent drawings, a voice output adjustment processing example in a case where content executed and distributed by the distribution user 20 using the information processing device (transmission terminal) 110 is music content will be described.

Figure 12:
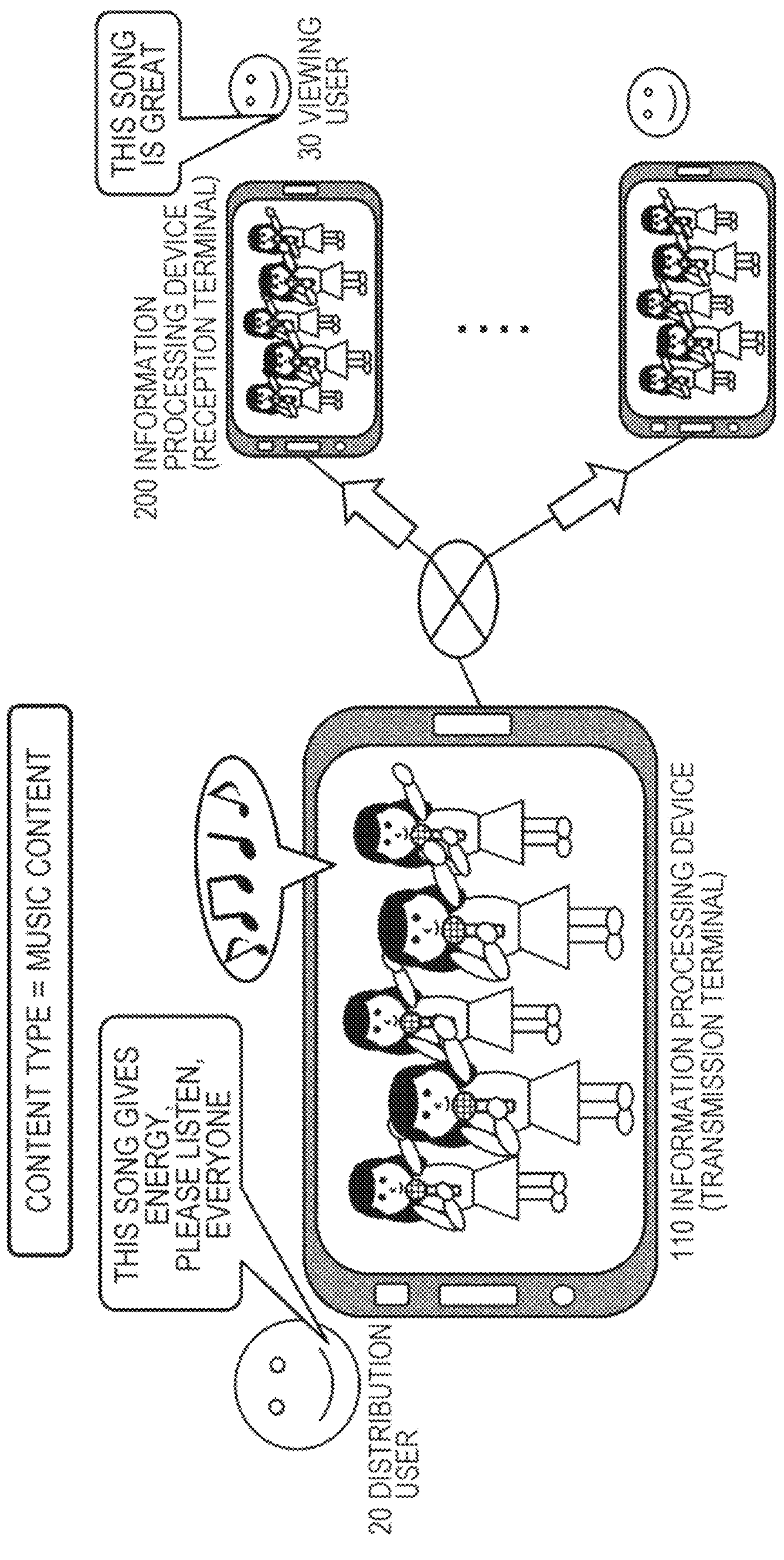
FIG. 12 is a diagram for explaining an example of distribution processing in a case where content distributed by the information processing device (transmission terminal) is music content.

FIG. 12 illustrates an example in which the distribution user 20 executes a music content reproduction application using the information processing device (transmission terminal) 110 and distributes the music content.

A performance image of a musician, a singer, or the like who plays or sings various songs is reproduced by the information processing device (transmission terminal) 110. Voice data of the music content is reproduced together with this image.

The image and the voice of the music content are reproduced by the information processing device (reception terminal) 200 on the side of the viewing user 30 via the network.

The voice of the music content is an application voice reproduced by the application voice reproduction unit (second sound source) 102 of the information processing device (transmission terminal) 110 on the side of the distribution user 20.

The voice data distributed via the network is not limited to this application voice and includes the distribution user voice input from the microphone (first sound source) 101 and the viewing user comment voice input from the comment voice reproduction unit (third sound source) 103.

For example, an utterance "this song gives energy, please listen, everyone" of the distribution user 20 illustrated in FIG. 12 is input via the microphone of the information processing device (transmission terminal) 110 and is distributed together with the application voice.

Moreover, "This song is great" illustrated as a comment of the viewing user 30 illustrated in FIG. 12 is a comment to be text-input into the information processing device (reception terminal) 200 by the viewing user 30. The information processing device (transmission terminal) 110 receives the input text via the network, and the received text is converted into voice data so as to generate a comment voice. Processing is executed for synthesizing (mixing) the generated comment voice with the application voice and the voice of the game execution user and distributing the voice.

In a case where the distribution content is the music content, the second output voice adjustment unit 112 of the information processing device (transmission terminal) 110 illustrated in FIG. 9 executes the output adjustment processing on the voice data (distribution user voice, application voice, and viewing user comment voice) corresponding to the three sound sources, in accordance with this distribution content type.

Figure 13:
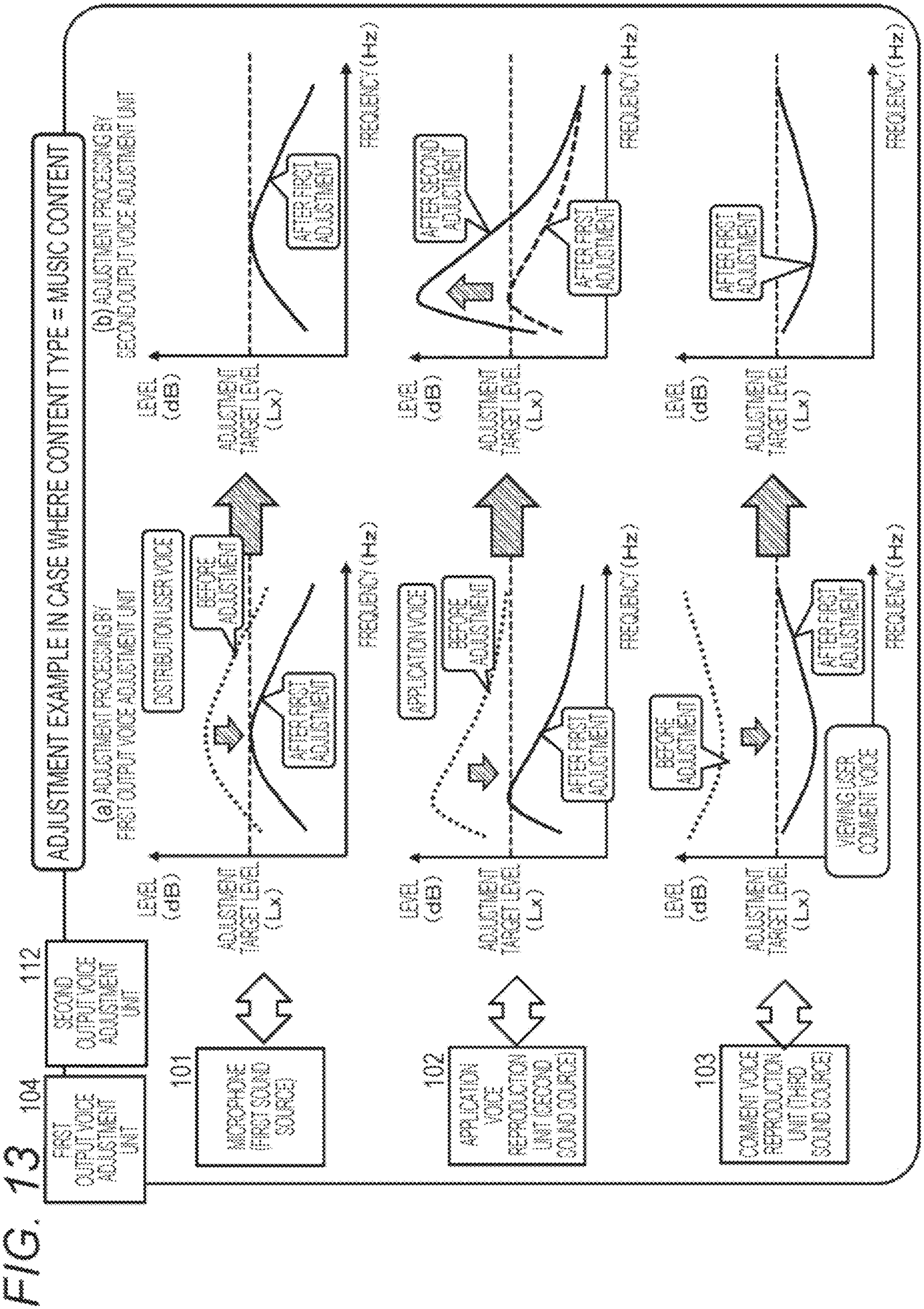
FIG. 13 is a diagram for explaining an example of the voice adjustment processing executed by the first output voice adjustment unit and the second output voice adjustment unit of the information processing device (transmission terminal).
Figure 14:
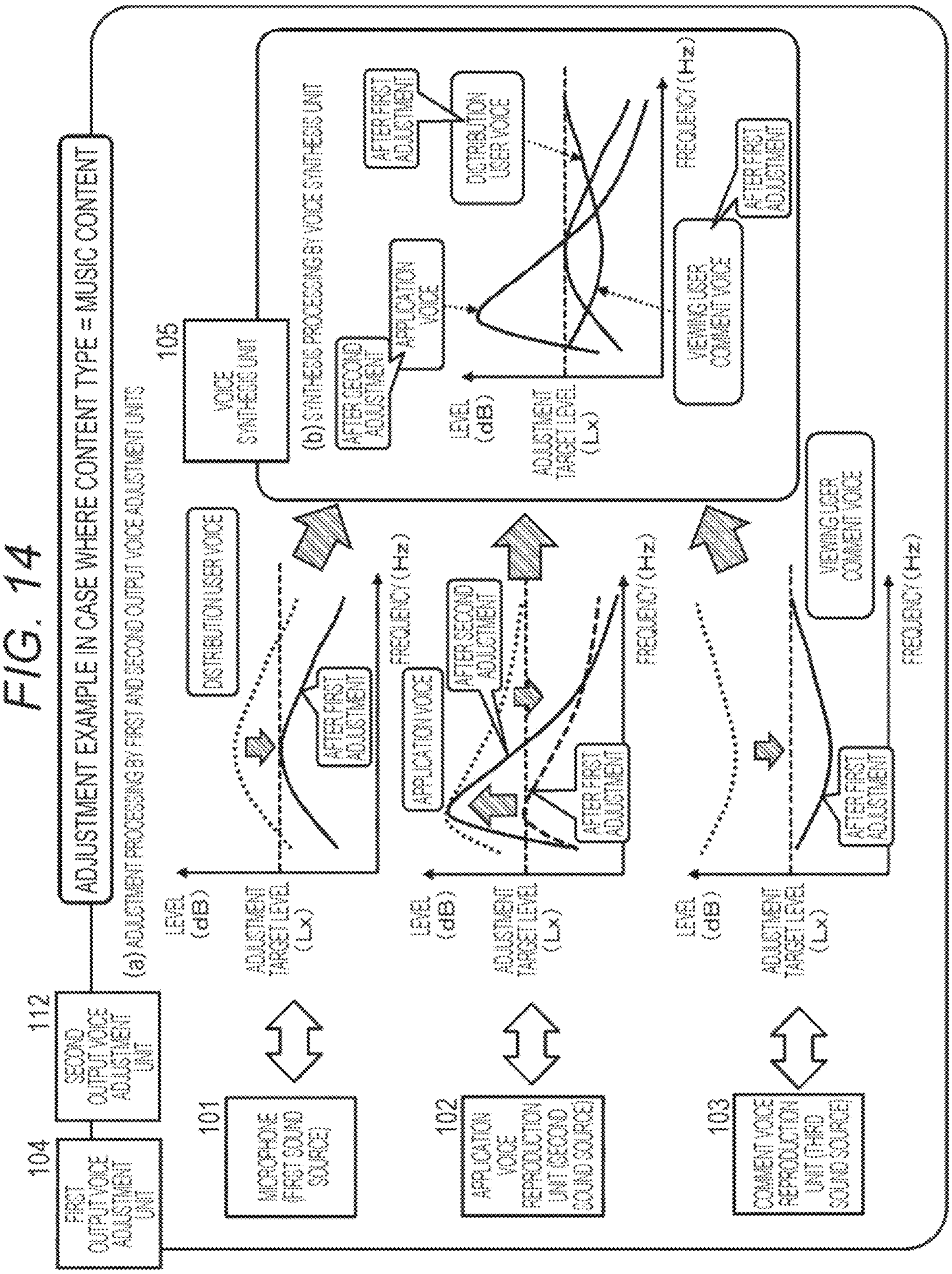
FIG. 14 is a diagram for explaining an example of the voice adjustment processing executed by the first output voice adjustment unit and the second output voice adjustment unit and an example of the voice synthesis processing executed by the voice synthesis unit, of the information processing device (transmission terminal).

With reference to FIGS. 13 and 14, a specific example of the output adjustment processing in accordance with the content type executed by the second output voice adjustment unit 112 and the voice synthesis processing executed by the voice synthesis unit 105 in a case where the content executed and distributed by the distribution user 20 using the information processing device (transmission terminal) 110 is the music content will be described.

First, with reference to FIG. 13, a specific example of the output adjustment processing corresponding to each sound source executed by the first output voice adjustment unit 104 and the second output voice adjustment unit 112 executed in a case where the distribution content is the music content will be described.

In FIG. 13, from the top, (1) An adjustment processing example on the distribution user voice input from the microphone (first sound source) 101

(2) An adjustment processing example on the application voice input from the application voice reproduction unit (second sound source) 102

(3) An adjustment processing example on the viewing user comment voice input from the comment voice reproduction unit (third sound source) 103

In FIG. 13, a specific example of the output voice adjustment processing by the following two output adjustment units on each of the pieces of voice data of these three sound sources is illustrated.

(a) Adjustment processing by the first output voice adjustment unit 104

(b) Adjustment processing by the second output voice adjustment unit 112

Each of the graphs illustrated in FIGS. 13(*a*) and 13(*b*) illustrates voice characteristics data of output sound of each sound source. It is frequency-level corresponding data in which a frequency (Hz) is set on the horizontal axis, and an output level (dB) is set on the vertical axis.

The adjustment processing by the first output voice adjustment unit 104 illustrated in FIG. 13(*a*) is processing similar to the processing described above with reference to FIG. 5, and the adjustment processing for setting the maximum output of each voice to the predefined adjustment target level (Lx) is executed as the adjustment processing on the output voices of the three sound sources.

Dotted line data illustrated in each graph in FIG. 13 (*a*) is voice characteristics data before being adjusted by the first output voice adjustment unit 104, that is, the voice characteristics data of the voice output from each sound source, and solid line data is voice characteristics data after the first adjustment by the first output voice adjustment unit 104.

The voice data after the first adjustment by the first output voice adjustment unit 104 is input into the second output voice adjustment unit 112. That is, first-adjusted data corresponding to the three sound sources having the voice characteristics indicated as the first-adjusted data (solid line data) in each graph in FIG. 13(*a*) is input into the second output voice adjustment unit 112, and the second adjustment processing in accordance with the content type is executed.

The example illustrated in FIG. 13 is an adjustment processing example in a case where the distribution content type=the music content.

FIG. 13 (*b*) is a specific example of adjustment processing on the output voices (distribution user voice, application voice, and viewing user comment voice) from the three sound sources executed by the second output voice adjustment unit 112 in a case where the distribution content type=the music content.

As illustrated in FIG. 13(*b*), in a case where the distribution content type=the music content, the second output voice adjustment unit 112 executes the following second adjustment processing on the output voices (distribution user voice, application voice, and viewing user comment voice) from the three sound sources.

(1) The second adjustment processing on the distribution user voice input from the microphone (first sound source) 101 is not executed.

(2) As the second adjustment processing on the application voice input from the application voice reproduction unit (second sound source) 102, output adjustment for entirely increasing the output level and further emphasizing the frequency characteristics (=curve shape of graph) is performed. That is, the adjustment processing for increasing a difference in the output level in accordance with the frequency is executed.

(3) The second adjustment processing on the viewing user comment voice input from the comment voice reproduction unit (third sound source) 103 is not executed.

In this way, in a case where the distribution content type=the music content, the second output voice adjustment unit 112 executes only the second adjustment processing on the application voice input from the application voice reproduction unit (second sound source) 102, does not execute the second adjustment processing on the distribution user voice and the viewing user comment voice, and outputs the first-adjusted data.

That is, in a case where the content type=the music content, the second output voice adjustment unit 112 executes the output level-up processing and the specific frequency component emphasis processing on only the application voice input from the application voice reproduction unit (second sound source) 102, and outputs the voice to the next voice synthesis unit 105.

Note that the voice output adjustment example corresponding to each sound source by the second output voice adjustment unit 112 illustrated in FIG. 13(*b*) is an example, and a configuration may be used in which adjustment is performed in another adjustment mode.

Next, a specific example of processing of the voice synthesis unit 105 will be described with reference to FIG. 14.

The voice synthesis unit 105 executes synthesis processing (mixing processing) on adjusted voice data obtained by adjusting the output voices (distribution user voice, application voice, and viewing user comment voice) of the three sound sources by the first output voice adjustment unit 104 and the second output voice adjustment unit 112.

In FIG. 14, each following processing example is illustrated.

(a) An adjustment processing example by the first output voice adjustment unit 104 and the second output voice adjustment unit 112

(b) A synthesis processing example of the voice synthesis unit

In FIG. 14 (*a*), from the top, (1) An adjustment processing example by the first output voice adjustment unit 104 and the second output voice adjustment unit 112 on the distribution user voice input from the microphone (first sound source) 101

(2) An adjustment processing example by the first output voice adjustment unit 104 and the second output voice adjustment unit 112 on the application voice input from the application voice reproduction unit (second sound source) 102

(3) An adjustment processing example by the first output voice adjustment unit 104 and the second output voice adjustment unit 112 on the viewing user comment voice input from the comment voice reproduction unit (third sound source) 103 are illustrated.

Note that, as described above with reference to FIG. 13, in a case where the distribution content type=the music content, the second output voice adjustment unit 112 executes the output level-up processing and the specific frequency component emphasis processing only on the application voice output from the application voice reproduction unit (second sound source) 102.

In the graph of the application voice illustrated in the middle stage in FIG. 14 (*a*), the following three pieces of voice characteristics (frequency-level characteristics) data are illustrated.

(p) The pre-adjustment data of the application voice input from the application voice reproduction unit (second sound source) 102 (fine dotted line data)

(q) The first-adjusted data by the first output voice adjustment unit 104 for the application voice input from the application voice reproduction unit (second sound source) 102 (rough dotted line data)

(r) The second-adjusted data obtained by performing two adjustments by the first output voice adjustment unit 104 and the second output voice adjustment unit 112 on the application voice input from the application voice reproduction unit (second sound source) 102 (solid line data)

The data of (r), that is, the voice data having the voice characteristics indicated by the solid line in the graph is input into the voice synthesis unit 105.

That is, the second-adjusted data (solid line data) obtained by executing the two types of adjustment processing by the first output voice adjustment unit 104 and the second output voice adjustment unit 112 on the application voice input from the application voice reproduction unit (second sound source) 102 is input.

On the distribution user voice input from the microphone (first sound source) 101 and the viewing user comment voice input from the comment voice reproduction unit (third sound source) 103 illustrated in the upper stage and the lower stage in FIG. 14 (*a*), the adjustment processing is executed only by the first output voice adjustment unit 104, and the adjustment processing is not executed by the second output voice adjustment unit 112.

Therefore, the voice data having the voice characteristics indicated by the solid line as the first-adjusted data in each graph in the upper stage or the lower stage in FIG. 14 (*a*) is input into the voice synthesis unit 105.

In FIG. 14 (*b*), a specific example of the voice synthesis processing (mixing processing) executed by the voice synthesis unit 105 is illustrated.

In the graph illustrated in FIG. 14 (*b*), the data characteristics component (frequency-level characteristics) of each piece of sound source data included in the single synthesized voice generated by the synthesis (mixing) processing on the adjusted voice data of the three sound sources by the voice synthesis unit 105 is illustrated.

Each of three curves overlapped and indicated in the graph illustrated in FIG. 14 (*b*) corresponds to the adjusted voice characteristics indicated by the solid line in FIG. 14 (*a*).

That is, (1) the first-adjusted data obtained by executing the single adjustment processing by only the first output voice adjustment unit 104 on the distribution user voice input from the microphone (first sound source) 101

(2) the second-adjusted data obtained by executing the two types of adjustment processing by the first output voice adjustment unit 104 and the second output voice adjustment unit 112 on the application voice input from the application voice reproduction unit (second sound source) 102

(3) the first-adjusted data obtained by executing the single adjustment only by the first output voice adjustment unit 104 on the viewing user comment voice input from the comment voice reproduction unit (third sound source) 103 are illustrated.

The voice synthesis unit 105 generates such voice synthesized data having voice component data of each sound source and distributes the data via the communication unit 106.

The information processing device (reception terminal) 200 on the side of the viewing user 30 reproduces synthesized sound having a voice component corresponding to each sound source illustrated in FIG. 14(*b*).

In this case, as compared with the other voices, the voice of the distribution user is output as a voice that is easier to be heard.

Note that, the processing examples described with reference to FIGS. 13 and 14, that is, an output adjustment example of each sound source voice of the second output voice adjustment unit 112 in a case where the distribution content type=the music content is an example, and a configuration may be used in which adjustment may be performed in a mode other than the above adjustment examples in a case where the distribution content type=the music content.

Furthermore, regarding the output adjustment processing of the voice corresponding to each sound source by the first output voice adjustment unit 104, in the processing examples described with reference to FIGS. 13 and 14, an example has been described in which the adjustment is performed for setting the maximum value of the output level of each of the three sound sources to the same single adjustment target level (Lx). However, without limiting to this adjustment example, the first output voice adjustment unit 104 may have a configuration for executing the adjustment processing described above with reference to FIGS. 7 and 8 and other adjustment processing.

4. (Third Embodiment) about Configuration and Processing of Information Processing Device (Transmission Terminal) that Executes Voice Output Adjustment According to Distribution Scene of Distribution Content Next, a configuration and processing of an information processing device (transmission terminal) that executes voice output adjustment in accordance with a distribution scene of distribution content will be described as a third embodiment of the present disclosure.

A distribution user 20 executes and distributes content in accordance with various applications described above, using the information processing device (transmission terminal). Moreover, during the execution of the single application, various scenes occur.

For example, in a case of automobile race game content that is an example of a game application described above as the first embodiment, various different scenes occur before and after start of the game, after end of the game, or the like.

During execution of an automobile race as the game, various scenes occur such as a scene of an accident such as a crash or an overtaking scene.

The third embodiment described below is an embodiment of an information processing device (transmission terminal) that executes different voice output adjustment processing in accordance with the scene.

Figure 15:
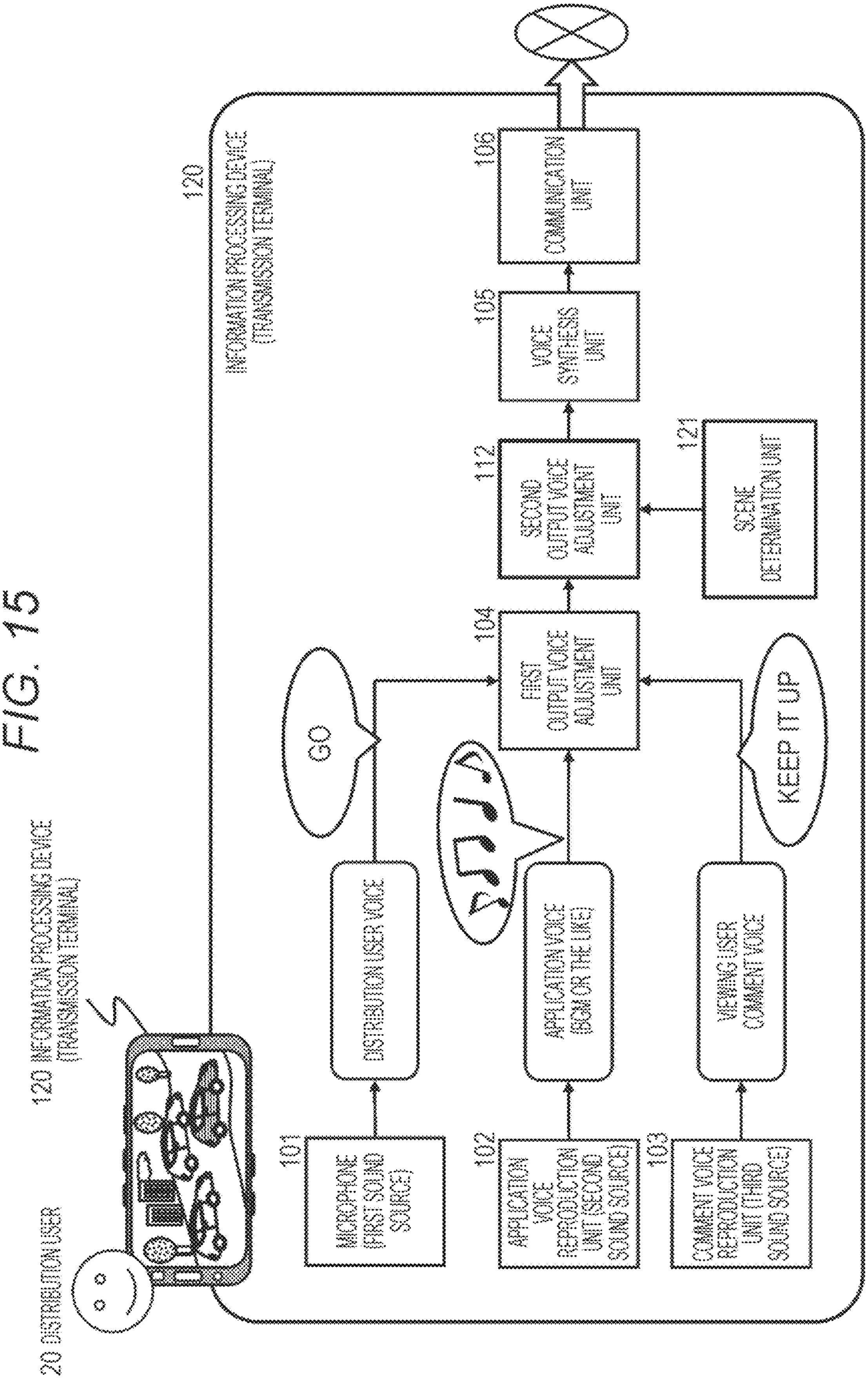
FIG. 15 is a diagram for explaining a configuration example (third embodiment) of the information processing device (transmission terminal).

FIG. 15 is a diagram illustrating a configuration example of an information processing device (transmission terminal) 120 according to the third embodiment of the present disclosure.

As illustrated in FIG. 15, the information processing device (transmission terminal) 120 includes a microphone (first sound source) 101, an application voice reproduction unit (second sound source) 102, a comment voice reproduction unit (third sound source) 103, a first output voice adjustment unit 104, a voice synthesis unit 105, a communication unit 106, and in addition, a scene determination unit 121 and a second output voice adjustment unit 112.

Note that the configuration illustrated in FIG. 15 is a partial configuration of the information processing device (transmission terminal) 120 and is a block diagram mainly illustrating a configuration to be applied to the voice output adjustment processing of the present disclosure. In addition to the components illustrated in the drawing, the information processing device (transmission terminal) 120 includes, for example, components similar to those of a general smartphone (smartphone), such as a display unit, an input unit, a control unit, or a storage unit.

A configuration of the information processing device (transmission terminal) 120 according to the third embodiment is a configuration in which the scene determination unit 121 and the second output voice adjustment unit 112 are added to the configuration of the information processing device (transmission terminal) 100 according to the first embodiment described above with reference to FIG. 4.

The microphone (first sound source) 101 is a microphone included in the information processing device (transmission terminal) 120, and for example, inputs a voice of the distribution user 20 who is executing the game application using the information processing device (transmission terminal) 120 and inputs the voice into the first output voice adjustment unit 104.

As illustrated in FIG. 15, a distribution user voice input into the microphone (first sound source) 101 is input into the first output voice adjustment unit 104.

The application voice reproduction unit (second sound source) 102 generates reproduced sound of an application executed by the information processing device (transmission terminal) 120 and an application voice illustrated in the drawing and outputs the generated sound and voice to the first output voice adjustment unit 104.

For example, in a case where the distribution user 20 executes an automobile race game application with the information processing device (transmission terminal) 120, the application voice reproduction unit (second sound source) 102 generates a BGM generated by the game application, various sounds generated in the game, for example, various sounds such as engine sound of an automobile, a cheer of an audio, or a collision sound at the time of crash, as reproduced sounds and outputs the sound to the first output voice adjustment unit 104.

The comment voice reproduction unit (third sound source) 103 reproduces an image and voice data transmitted from the information processing device (transmission terminal) 120 and reproduces a comment of a viewing user 30 who is viewing.

While receiving and reproducing an application execution screen and the voice data transmitted from the information processing device (transmission terminal) 120 on the side of the distribution user 20 by the information processing device (reception terminal) 200 on the side of the viewing user 30, the viewing user 30 inputs a text of a comment such as a support message into the information processing device (reception terminal) 200.

This input comment is transmitted to the information processing device (transmission terminal) 120 on the side of the distribution user 20, via the network.

The comment voice reproduction unit 103 of the information processing device (transmission terminal) 120 on the side of the distribution user 20 converts the comment received from the information processing device (reception terminal) 200 into voice data, generates a comment voice, and outputs the generated comment voice (viewing user comment voice) to the first output voice adjustment unit 104.

Note that the viewing user 30 may directly voice-input a comment such as a support message via a microphone of the information processing device (reception terminal) 200. In this case, this input voice comment is transmitted to the information processing device (transmission terminal) 100 on the side of the distribution user 20, via the network.

In this case, the comment voice reproduction unit 103 of the information processing device (transmission terminal) 120 on the side of the distribution user 20 outputs the voice comment received from the information processing device (reception terminal) 200 to the first output voice adjustment unit 104.

Next, the first output voice adjustment unit 104 executes adjustment processing on an output voice of each sound source, as in the first embodiment described above.

That is, the first output voice adjustment unit 104 inputs the following three pieces of voice data.

(1) The distribution user voice from the microphone (first sound source) 101, (2) The application voice from the application voice reproduction unit (second sound source) 102, and (3) The viewing user comment voice from the comment voice reproduction unit (third sound source) 103, The first output voice adjustment unit 104 inputs the three pieces of voice data from these three sound sources and executes output adjustment processing on the voice data of each sound source.

The first output voice adjustment unit 104 executes, for example, the adjustment processing described above with reference to FIG. 5.

That is, the first output voice adjustment unit 104 executes adjustment processing for setting a maximum output of output voices of the three sound sources to a predefined adjustment target level (Lx).

Note that, as described above with reference to FIG. 5, when the voice of each sound source is adjusted, processing for uniformly decreasing or increasing an entire frequency region is executed. That is, while maintaining the frequency characteristics (=curved shape of graph) of each sound source, a maximum output value of each sound source is adjusted to be set to the predefined adjustment target level (Lx).

Through this adjustment processing, outputs (volumes) from the three different sound sources are balanced, and a problem such that the volume of one sound source is too large as compared with the others is reduced.

The first output voice adjustment unit 104 generates (b) three pieces of adjusted voice data having the adjusted voice data characteristics (output from first output voice adjustment unit) corresponding to the three sound sources illustrated in FIG. 5 and outputs the adjusted voice data to the second output voice adjustment unit 112.

The second output voice adjustment unit 112 is a voice output adjustment unit that is not included in the first embodiment described above.

The second output voice adjustment unit 112 executes voice output adjustment processing in accordance with a scene of content executed and distributed by the distribution user 20 with the information processing device (transmission terminal) 120.

For example, in a case where the automobile race game application is executed and distributed, the voice output adjustment processing is executed that is in accordance with various scenes such as a start scene of an application such as a game, various scenes during execution of the application, for example, an accident scene such as a crash or an overtaking scene, or an end scene of the application such as the game.

The second output voice adjustment unit 112 inputs information regarding the scene executed and distributed by the distribution user 20 with the information processing device (transmission terminal) 120, from the scene determination unit 121 and executes the output voice adjustment processing in accordance with the input scene information.

As described above, the scene determined by the scene determination unit 121 is, for example, the start scene of the application such as the game, various scenes during the execution of the application, for example, the scene of the accident such as the crash, the overtaking scene, and in addition, the end scene of the application such as the game.

The scene determination unit 121 determines the scene of the application activated and executed by the information processing device (transmission terminal) 120, generates scene determination information, and inputs the information into the second output voice adjustment unit 112.

For example, the scene determination unit 121 reads attribute information of an application executed by the information processing device (transmission terminal) 120 from a memory in the information processing device (transmission terminal) 120, determines a scene of the application currently executed by the information processing device (transmission terminal) 120 on the basis of the read attribute information, generates the scene determination information, and outputs the information to the second output voice adjustment unit 112.

Alternatively, for example, the scene determination unit 121 may have a configuration that analyzes an image displayed on a display unit of the information processing device (transmission terminal) 120, determines a scene on the basis of an analysis result of the image, generates the scene determination information, and outputs the information to the second output voice adjustment unit 112.

Moreover, for example, the scene determination unit 121 may have a configuration that analyzes utterance content of the distribution user 20 input via the microphone of the information processing device (transmission terminal) 120, determines a scene, generates the scene determination information, and outputs the information to the second output voice adjustment unit 112.

For example, in a case where the distribution user 20 makes an utterance such as "Starting the game now" and "Everyone, cheer for me"

the scene determination unit 121 can analyze the utterance content of the distribution user 20 and can determine that this scene is a game application start scene.

Furthermore, in a case where the distribution user 20 makes an utterance such as "Now, I will overtake and stand at the forefront", the scene determination unit 121 can analyzes the utterance content of the distribution user 20, and determine that this is an overtaking scene in the automobile race game application.

Furthermore, in a case where the distribution user 20 make an utterance such as "Yes, I won the first prize. Thank you for your support", the scene determination unit 121 can analyze the utterance content of the distribution user 20 and determine that this is an end scene of the automobile race game application.

In this way, the scene determination unit 121 may have a configuration that analyzes the user utterance content, determines the scene, and outputs the scene determination information as the result to the second output voice adjustment unit 112.

Moreover, for example, the scene determination unit 121 may have a configuration that analyzes comment content of the viewing user 30 input via a communication unit of the information processing device (transmission terminal) 120, determines the scene, generates the scene determination information, and outputs the information to the second output voice adjustment unit 112.

For example, in a case where a comment such as

"Cheer up, do your best"

is received from the viewing user 30, the scene determination unit 121 can analyze the comment content of the viewing user 30 and determine that this is a start scene of the game application.

Furthermore, for example, in a case where a comment such as

"You won the first prize"

is received from the viewing user 30, the scene determination unit 121 can analyze the comment content of the viewing user 30 and determine that this is an end scene of the game.

The second output voice adjustment unit 112 further executes the output adjustment processing on an output voice from each sound source in accordance with the scene determination information input from the scene determination unit 121, specifically, an output voice adjusted by the first output voice adjustment unit 104, for each of adjusted voices of the three sound sources adjusted by the first output voice adjustment unit 104.

Figure 16:
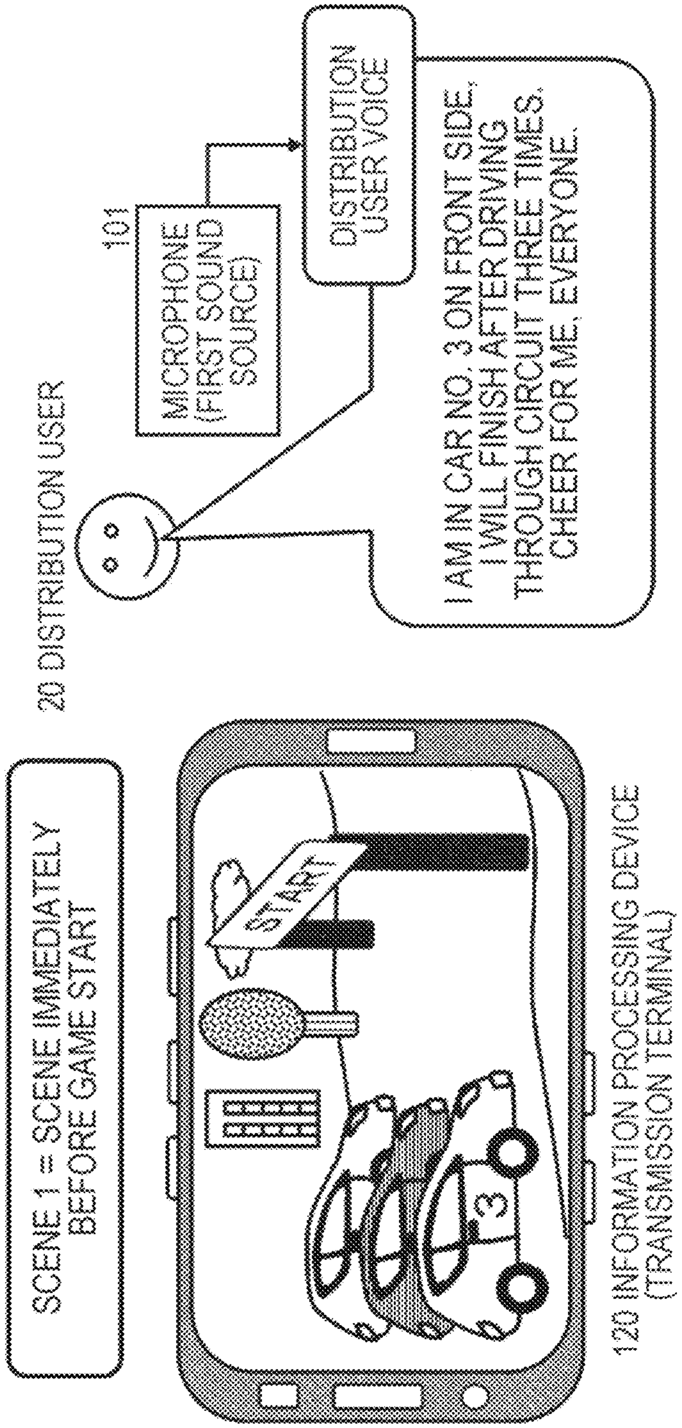
FIG. 16 is a diagram for explaining an example of scene determination processing executed by a scene determination unit of the information processing device (transmission terminal).

With reference to FIG. 16 and the subsequent drawings, a specific processing example of the third embodiment, that is, a specific example of scene determination processing and voice output adjustment processing in accordance with the determined scene will be described.

Note that, hereinafter, processing in accordance with various scenes in a case where the information processing device (transmission terminal) 120 on the side of the distribution user 20 executes and distributes the automobile race game application will be described.

Hereinafter, a specific example of the plurality of types of scene determination processing and the voice output adjustment processing in accordance with the determined scene will be sequentially described.

(1) Scene 1=scene immediately before game start (2) Scene 2=scene during game (3) Scene 3=crash occurrence scene (4) Scene 4=game end scene (5) Scene 5=distribution end scene

4-1. (Processing Example 1) Specific Example of Scene Determination Processing of Scene 1=Scene Immediately Before Game Start and Voice Output Adjustment Processing According to Determined Scene First, as a processing example 1, a specific example of the scene determination processing of the scene immediately before the game start and the voice output adjustment processing in accordance with the determined scene will be described.

FIG. 16 is a diagram for explaining the specific example of the scene determination processing of the game start scene.

As described above, the scene determination unit 121 reads, for example, the attribute information of the application executed by the information processing device (transmission terminal) 120 from the memory in the information processing device (transmission terminal) 120, determines the scene of the application currently executed by the information processing device (transmission terminal) 120 on the basis of the read attribute information.

Alternatively, the image displayed on the display unit of the information processing device (transmission terminal) 120 is analyzed, and the scene is determined on the basis of an analysis result of the image. Alternatively, the utterance content of the distribution user 20 input via the microphone of the information processing device (transmission terminal) 120 is analyzed, and the scene is determined. Alternatively, the comment content of the viewing user 30 input via the communication unit of the information processing device (transmission terminal) 120 is analyzed, and the scene is determined.

For example, the scene determination processing is executed through various types of processing, the scene determination information is generated and is output to the second output voice adjustment unit 112.

In the example illustrated in FIG. 16, for example, the scene determination unit 121 analyzes the image displayed on the display unit of the information processing device (transmission terminal) 120. As illustrated in FIG. 16, the display unit of the information processing device (transmission terminal) 120 displays an image in which a plurality of automobiles is arranged at a position where characters of [START] are displayed.

The scene determination unit 121 determines that this is the application start scene of the automobile race game, for example, on the basis of the display of such an image.

Furthermore, it is possible to analyze the utterance of the distribution user 20 input via the microphone of the information processing device (transmission terminal) 120 and determine the scene.

In the example illustrated in FIG. 16, the distribution user 20 makes an utterance such as "I am in the third car on the front side, I will finish after driving through the circuit three time. Cheer for me, everyone".

The scene determination unit 121 can analyze this utterance content of the distribution user 20 and determine that this is the start scene of the automobile race game application.

In this way, the scene determination unit 121 reads the attribute information of the application executed by the information processing device (transmission terminal) 120 from the memory in the information processing device (transmission terminal) 120. Alternatively, the image displayed on the display unit of the information processing device (transmission terminal) 120 is analyzed, and the scene is determined on the basis of an analysis result of the image. Alternatively, the utterance content of the distribution user 20 input via the microphone of the information processing device (transmission terminal) 120 is analyzed, and the scene is determined. Alternatively, the comment content of the viewing user 30 input via the communication unit of the information processing device (transmission terminal) 120 is analyzed, and the scene is determined.

At least any one of these types of processing is executed, and the scene of the application currently executed by the information processing device (transmission terminal) 120 is determined.

The scene determination unit 121 outputs the scene determination information that is a result of the scene determination processing to the second output voice adjustment unit 112. The second output voice adjustment unit 112 further executes the output adjustment processing on an output voice from each sound source in accordance with the scene determination information input from the scene determination unit 121, specifically, an output voice adjusted by the first output voice adjustment unit 104, for each of adjusted voices of the three sound sources adjusted by the first output voice adjustment unit 104.

Hereinafter, with reference to FIGS. 17 and 18, a specific example of processing executed by the first output voice adjustment unit 104, the second output voice adjustment unit 112, and the voice synthesis unit 105 in a case where the scene determination unit 121 determines, as a result of the scene determination processing, that the scene=the scene immediately before the game start will be described.

Figure 17:
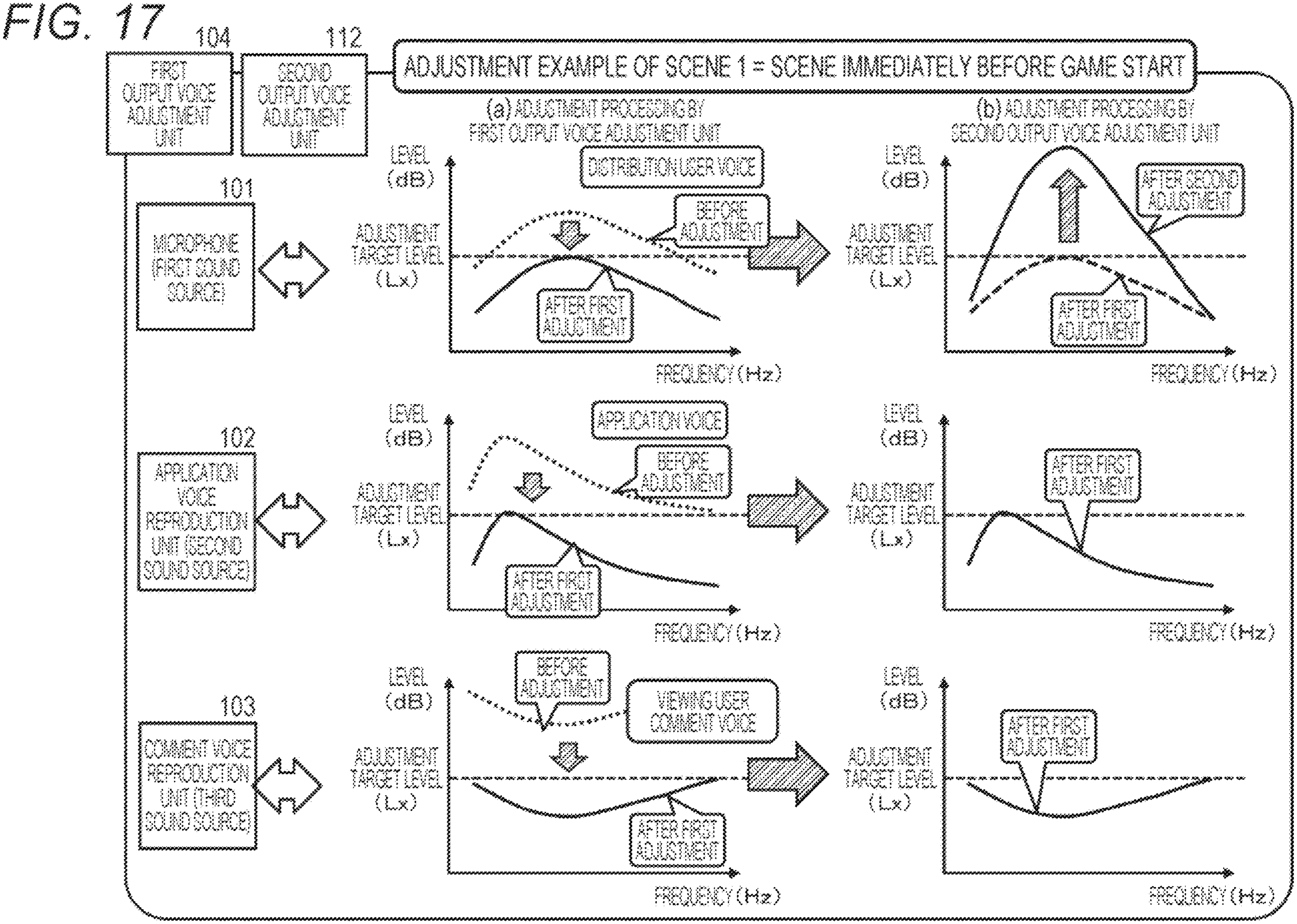
FIG. 17 is a diagram for explaining an example of the voice adjustment processing executed by the first output voice adjustment unit and the second output voice adjustment unit of the information processing device (transmission terminal).

In FIG. 17, a specific example of the output adjustment processing corresponding to each sound source executed by the first output voice adjustment unit 104 and the second output voice adjustment unit 112 in a case where the scene determination unit 121 determines, as the result of the scene determination processing, that the scene=the scene immediately before the game start will be described.

In FIG. 17, from the top, (1) An adjustment processing example on the distribution user voice input from the microphone (first sound source) 101

(2) An adjustment processing example on the application voice input from the application voice reproduction unit (second sound source) 102

(3) An adjustment processing example on the viewing user comment voice input from the comment voice reproduction unit (third sound source) 103

In FIG. 17, a specific example of the output voice adjustment processing by the following two output adjustment units on each of the pieces of voice data of these three sound sources is illustrated.

(a) Adjustment processing by the first output voice adjustment unit 104

(b) Adjustment processing by the second output voice adjustment unit 112

Each of the graphs illustrated in FIGS. 17(*a*) and 17(*b*) illustrates voice characteristics data of output sound of each sound source. It is frequency-level corresponding data in which a frequency (Hz) is set on the horizontal axis, and an output level (dB) is set on the vertical axis.

The adjustment processing by the first output voice adjustment unit 104 illustrated in FIG. 17(*a*) is processing similar to the processing described above with reference to FIG. 5, and the adjustment processing for setting the maximum output of each voice to the predefined adjustment target level (Lx) is executed as the adjustment processing on the output voices of the three sound sources.

Dotted line data illustrated in each graph in FIG. 17(*a*) is voice characteristics data before being adjusted by the first output voice adjustment unit 104, that is, the voice characteristics data of the voice output from each sound source, and solid line data is voice characteristics data after the first adjustment by the first output voice adjustment unit 104.

Note that, as described above, the voice output adjustment by the first output voice adjustment unit 104 is defined and described as "first adjustment", and the voice output adjustment by the second output voice adjustment unit 112 is defined and described as "second adjustment".

The voice data after the first adjustment by the first output voice adjustment unit 104 is input into the second output voice adjustment unit 112. That is, first-adjusted data corresponding to the three sound sources having the voice characteristics indicated as the first-adjusted data (solid line data) in each graph in FIG. 17(*a*) is input into the second output voice adjustment unit 112, and second adjustment processing in accordance with the scene is executed.

The example illustrated in FIG. 17 is an adjustment processing example in a case where the scene determination unit 121 determines, as the result of the scene determination processing, that the scene=the scene immediately before the game start.

FIG. 17(*b*) is a specific example of adjustment processing on the output voices (distribution user voice, application voice, and viewing user comment voice) from the three sound sources executed by the second output voice adjustment unit 112 in a case where the scene=the scene immediately before the game start.

As illustrated in FIG. 17(*b*), in a case where the scene=the scene immediately before the game start, the second output voice adjustment unit 112 executes the following second adjustment processing on the output voices (distribution user voice, application voice, and viewing user comment voice) from the three sound sources.

(1) As the second adjustment processing on the distribution user voice input from the microphone (first sound source) 101, output adjustment for entirely increasing an output level and further emphasizing frequency characteristics (=curve shape of graph) is performed. That is, the adjustment processing for increasing a difference in the output level in accordance with the frequency is executed.

(2) The second adjustment processing on the application voice input from the application voice reproduction unit (second sound source) 102 is not executed.

(3) The second adjustment processing on the viewing user comment voice input from the comment voice reproduction unit (third sound source) 103 is not executed.

In this way, in a case where the scene=the scene immediately before the game start, the second output voice adjustment unit 112 executes only the second adjustment processing on the distribution user voice input from the microphone (first sound source) 101, does not execute the second adjustment processing on the application voice and the viewing user comment voice, and outputs the first-adjusted data.

That is, in a case where the scene=the scene immediately before the game start, the second output voice adjustment unit 112 executes output level-up processing and specific frequency component emphasis processing only on the distribution user voice input from the microphone (first sound source) 101 and outputs the voice to the next voice synthesis unit 105.

Note that the voice output adjustment example corresponding to each sound source by the second output voice adjustment unit 112 illustrated in FIG. 17(*b*) is an example, and a configuration may be used in which adjustment is performed in another adjustment mode.

Next, a specific example of processing of the voice synthesis unit 105 will be described with reference to FIG. 18.

The voice synthesis unit 105 executes synthesis processing (mixing processing) on adjusted voice data obtained by adjusting the output voices (distribution user voice, application voice, and viewing user comment voice) of the three sound sources by the first output voice adjustment unit 104 and the second output voice adjustment unit 112.

Figure 18:
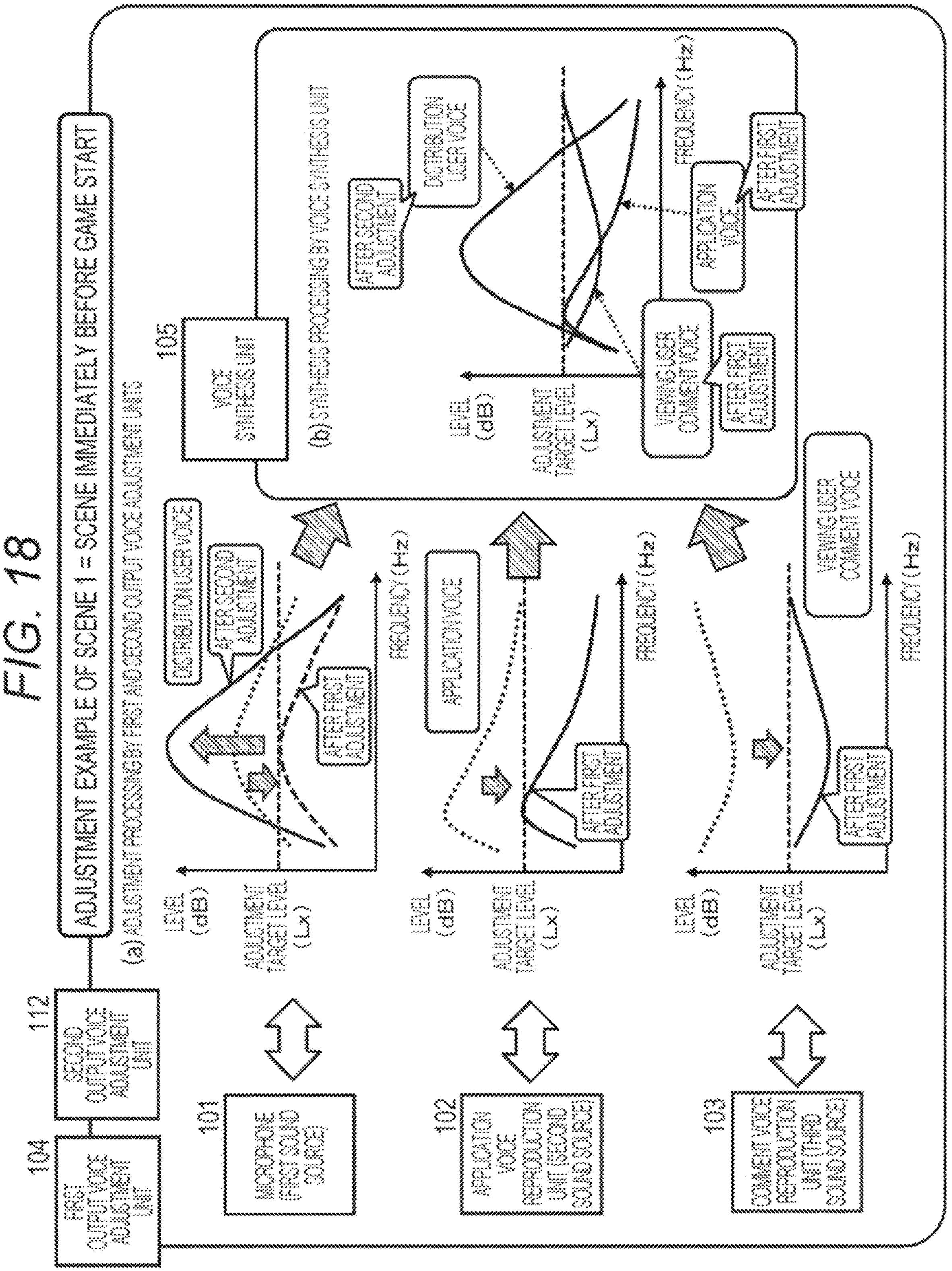
FIG. 18 is a diagram for explaining an example of the voice adjustment processing executed by the first output voice adjustment unit and the second output voice adjustment unit and an example of the voice synthesis processing executed by the voice synthesis unit, of the information processing device (transmission terminal).

In FIG. 18, each following processing example is illustrated.

(a) An adjustment processing example by the first output voice adjustment unit 104 and the second output voice adjustment unit 112

(b) A synthesis processing example of the voice synthesis unit

In FIG. 18(*a*), from the top, (1) An adjustment processing example by the first output voice adjustment unit 104 and the second output voice adjustment unit 112 on the distribution user voice input from the microphone (first sound source) 101

(2) An adjustment processing example by the first output voice adjustment unit 104 and the second output voice adjustment unit 112 on the application voice input from the application voice reproduction unit (second sound source) 102

(3) An adjustment processing example by the first output voice adjustment unit 104 and the second output voice adjustment unit 112 on the viewing user comment voice input from the comment voice reproduction unit (third sound source) 103 are illustrated.

Note that, as described above with reference to FIG. 17, in a case where the scene=the scene immediately before the game start, the second output voice adjustment unit 112 executes the output level-up processing or the specific frequency component emphasis processing on only the distribution user voice input from the microphone (first sound source) 101.

In the graph of the distribution user voice illustrated in the uppermost stage in FIG. 18(*a*), the following three pieces of voice characteristics (frequency-level characteristics) data are illustrated.

(p) Pre-adjustment data of the distribution user voice input from the microphone (first sound source) 101 (fine dotted line data)

(q) First-adjusted data by the first output voice adjustment unit 104 for the distribution user voice input from the microphone (first sound source) 101 (rough dotted line data)

(r) Second-adjusted data obtained by performing two adjustments by the first output voice adjustment unit 104 and the second output voice adjustment unit 112 on the distribution user voice input from the microphone (first sound source) 101 (solid line data)

The data of (r), that is, the voice data having the voice characteristics indicated by the solid line in the graph is input into the voice synthesis unit 105.

That is, the second-adjusted data (solid line data) obtained by executing the two types of adjustment processing by the first output voice adjustment unit 104 and the second output voice adjustment unit 112 on the distribution user voice input from the microphone (first sound source) 101 is input.

On the application voice input from the application voice reproduction unit (second sound source) 102 and the viewing user comment voice input from the comment voice reproduction unit (third sound source) 103 illustrated in the middle stage and the lower stage in FIG. 18(*a*), the adjustment processing is executed only by the first output voice adjustment unit 104, and the adjustment processing is not executed by the second output voice adjustment unit 112.

Therefore, the voice data having the voice characteristics indicated by the solid line as the first-adjusted data in each graph in the middle stage or the lower stage in FIG. 18(*a*) is input into the voice synthesis unit 105.

In FIG. 18(*b*), a specific example of the voice synthesis processing (mixing processing) executed by the voice synthesis unit 105 is illustrated.

In the graph illustrated in FIG. 18(*b*), the data characteristics component (frequency-level characteristics) of each piece of sound source data included in a single synthesized voice generated by synthesis (mixing) processing on the adjusted voice data of the three sound sources by the voice synthesis unit 105 is illustrated.

Each of three curves overlapped and indicated in the graph illustrated in FIG. 18(*b*) corresponds to the adjusted voice characteristics indicated by the solid line in FIG. 18(*a*).

That is, (1) the second-adjusted data obtained by executing the two types of adjustment processing by the first output voice adjustment unit 104 and the second output voice adjustment unit 112 on the distribution user voice input from the microphone (first sound source) 101

(2) first-adjusted data obtained by executing the single type of adjustment processing by only the first output voice adjustment unit 104 on the application voice input from the application voice reproduction unit (second sound source) 102

(3) first-adjusted data obtained by executing the single type of adjustment processing by only the first output voice adjustment unit 104 on the viewing user comment voice input from the comment voice reproduction unit (third sound source) 103 are illustrated.

The voice synthesis unit 105 generates such voice synthesized data having voice component data of each sound source and distributes the data via the communication unit 106.

The information processing device (reception terminal) 200 on the side of the viewing user 30 reproduces synthesized sound having a voice component corresponding to each sound source illustrated in FIG. 18(*b*).

In this case, as compared with the other voices, the voice of the distribution user is output as a voice that is easier to be heard.

Note that, the processing examples described with reference to FIGS. 17 and 18, that is, an output adjustment example of each sound source voice of the second output voice adjustment unit 112 in the scene of the scene=the scene immediately before the game start is an example, and a configuration may be used in which adjustment is performed in a mode other than the adjustment examples described above, in the scene immediately before the game start.

Furthermore, regarding the output adjustment processing of the voice corresponding to each sound source by the first output voice adjustment unit 104, in the processing examples described with reference to FIGS. 17 and 18, an example has been described in which the adjustment is performed for setting the maximum value of the output level of each of the three sound sources to the same single adjustment target level (Lx). However, without limiting to this adjustment example, the first output voice adjustment unit 104 may have a configuration for executing the adjustment processing described above with reference to FIGS. 7 and 8 and other adjustment processing.

4-2. (Processing Example 2) Specific Example of Scene Determination Processing of Scene 2=Scene During Game Play and Voice Output Adjustment Processing According to Determined Scene Next, as a processing example 2, a specific example of scene determination processing of the scene during the game execution and voice output adjustment processing in accordance with the determined scene will be described.

Figure 19:
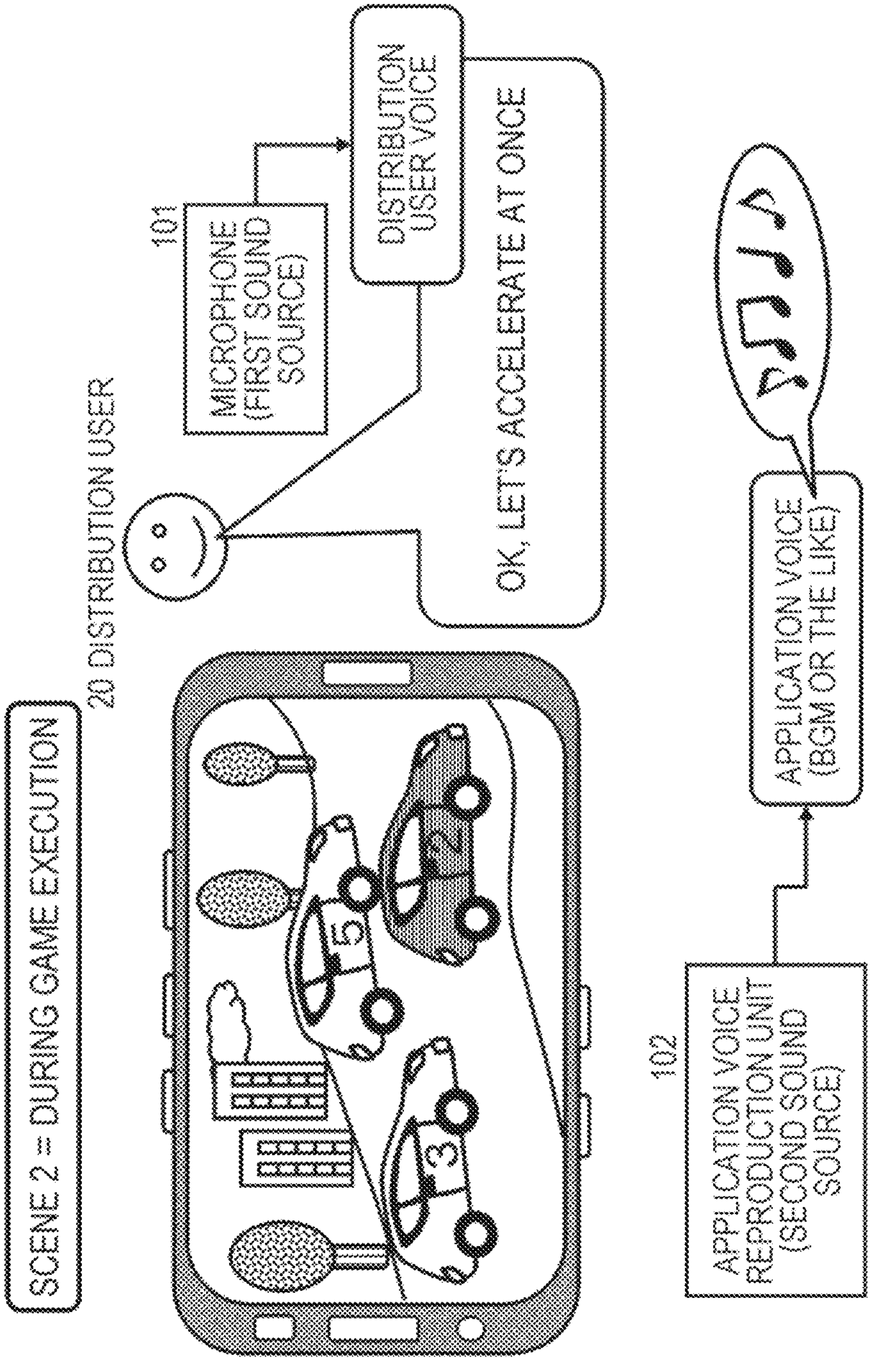
FIG. 19 is a diagram for explaining an example of the scene determination processing executed by the scene determination unit of the information processing device (transmission terminal).

FIG. 19 is a diagram for explaining a specific example of the scene determination processing of the scene during the game execution.

As described above, for example, the scene determination unit 121 analyzes the attribute information of the application executed by the information processing device (transmission terminal) 120, the image displayed on the display unit, the utterance content of the distribution user 20 input via the microphone, or the comment content of the viewing user 30 input via the communication unit and determines a scene.

For example, the scene determination processing is executed through various types of processing, the scene determination information is generated and is output to the second output voice adjustment unit 112.

In the example illustrated in FIG. 19, for example, the scene determination unit 121 analyzes the image displayed on the display unit of the information processing device (transmission terminal) 120. As illustrated FIG. 19, an image in which a plurality of automobiles is traveling is displayed on the display unit of the information processing device (transmission terminal) 120.

The scene determination unit 121 determines that this is a scene executed by the application of the automobile race game, for example, on the basis of the display of such an image.

Furthermore, it is possible to analyze the utterance of the distribution user 20 input via the microphone of the information processing device (transmission terminal) 120 and determine the scene.

In the example illustrated in FIG. 19, the distribution user 20 makes an utterance such as "OK, let's accelerate at once".

The scene determination unit 121 can analyze this utterance content of the distribution user 20 and determine that the automobile race game application is executed and this is a scene of acceleration or overtake.

In this way, the scene determination unit 121 determines the scene of the application currently executed by the information processing device (transmission terminal) 120.

The scene determination unit 121 outputs the scene determination information that is a result of the scene determination processing to the second output voice adjustment unit 112. The second output voice adjustment unit 112 further executes the output adjustment processing on an output voice from each sound source in accordance with the scene determination information input from the scene determination unit 121, specifically, an output voice adjusted by the first output voice adjustment unit 104, for each of adjusted voices of the three sound sources adjusted by the first output voice adjustment unit 104.

Hereinafter, with reference to FIGS. 20 and 21, a specific example of processing executed by the first output voice adjustment unit 104, the second output voice adjustment unit 112, and the voice synthesis unit 105 in a case where the scene determination unit 121 determines, as the result of the scene determination processing, that the scene=the scene during the game execution will be described.

Figure 20:
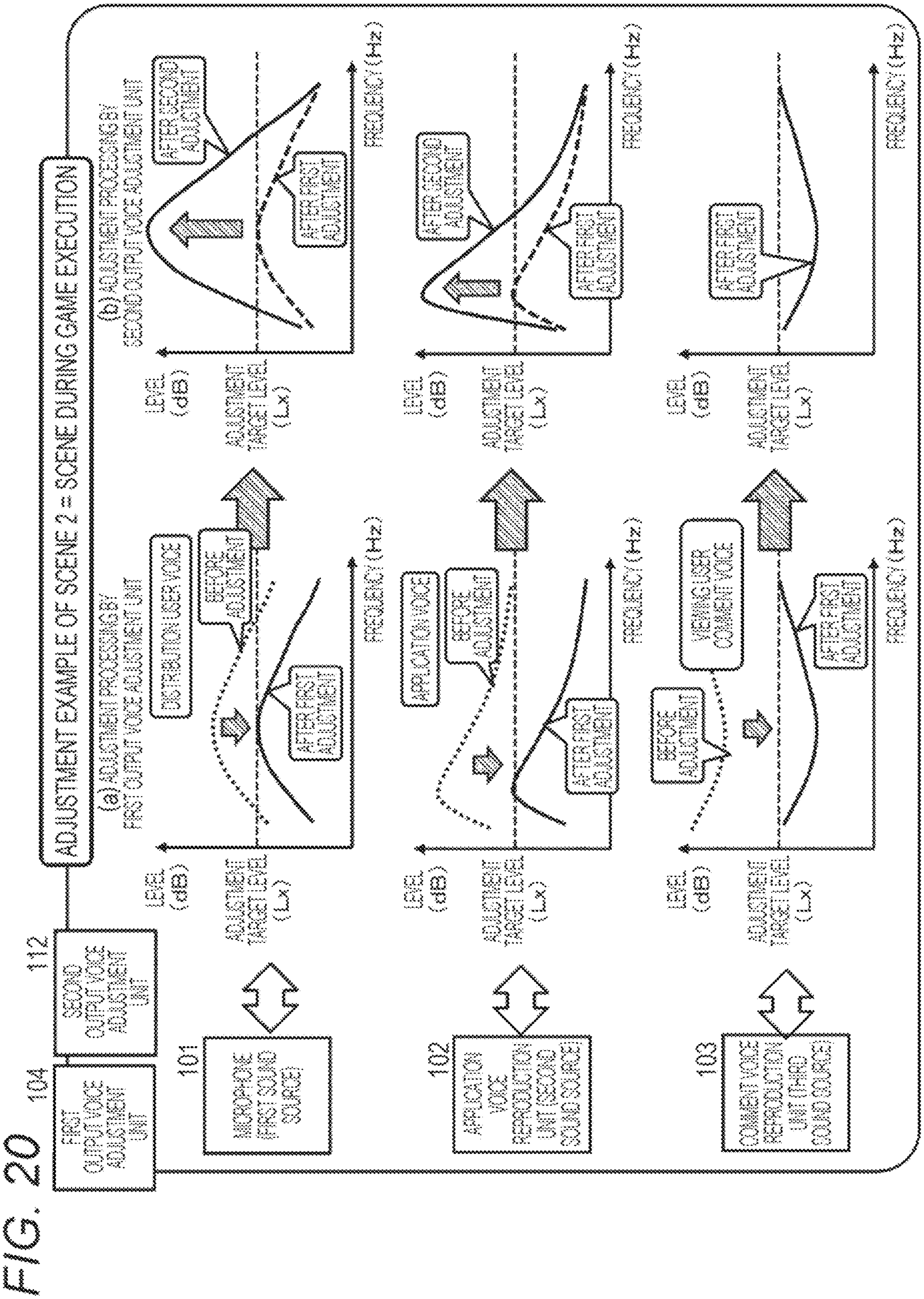
FIG. 20 is a diagram for explaining an example of the voice adjustment processing executed by the first output voice adjustment unit and the second output voice adjustment unit of the information processing device (transmission terminal).

In FIG. 20, a specific example of the output adjustment processing corresponding to each sound source executed by the first output voice adjustment unit 104 and the second output voice adjustment unit 112 in a case where the scene determination unit 121 determines, as the result of the scene determination processing, that the scene=the scene during the game execution will be described.

In FIG. 20, from the top, (1) An adjustment processing example on the distribution user voice input from the microphone (first sound source) 101

(2) An adjustment processing example on the application voice input from the application voice reproduction unit (second sound source) 102

(3) An adjustment processing example on the viewing user comment voice input from the comment voice reproduction unit (third sound source) 103

In FIG. 20, a specific example of the output voice adjustment processing by the following two output adjustment units on each of the pieces of voice data of these three sound sources is illustrated.

(a) Adjustment processing by the first output voice adjustment unit 104

(b) Adjustment processing by the second output voice adjustment unit 112

Each of the graphs illustrated in FIGS. 20(*a*) and 20(*b*) illustrates voice characteristics data of output sound of each sound source. It is frequency-level corresponding data in which a frequency (Hz) is set on the horizontal axis, and an output level (dB) is set on the vertical axis.

The adjustment processing by the first output voice adjustment unit 104 illustrated in FIG. 20(*a*) is processing similar to the processing described above with reference to FIG. 5, and the adjustment processing for setting the maximum output of each voice to the predefined adjustment target level (Lx) is executed as the adjustment processing on the output voices of the three sound sources.

Dotted line data illustrated in each graph in FIG. 20(*a*) is voice characteristics data before being adjusted by the first output voice adjustment unit 104, that is, the voice characteristics data of the voice output from each sound source, and solid line data is voice characteristics data after the first adjustment by the first output voice adjustment unit 104.

The voice data after the first adjustment by the first output voice adjustment unit 104 is input into the second output voice adjustment unit 112. That is, first-adjusted data corresponding to the three sound sources having the voice characteristics indicated as the first-adjusted data (solid line data) in each graph in FIG. 20(*a*) is input into the second output voice adjustment unit 112, and the second adjustment processing in accordance with the scene is executed.

The example illustrated in FIG. 20 is an adjustment processing example in a case where the scene determination unit 121 determines, as the result of the scene determination processing, that the scene=the scene during the game execution.

FIG. 20(*b*) is a specific example of adjustment processing on the output voices (distribution user voice, application voice, and viewing user comment voice) from the three sound sources executed by the second output voice adjustment unit 112 in a case where the scene=the scene during the game execution.

As illustrated in FIG. 20(*b*), in a case where the scene=the scene during the game execution, the second output voice adjustment unit 112 executes the following second adjustment processing on the output voices (distribution user voice, application voice, and viewing user comment voice) from the three sound sources.

(1) As the second adjustment processing on the distribution user voice input from the microphone (first sound source) 101, output adjustment for entirely increasing an output level and further emphasizing frequency characteristics (=curve shape of graph) is performed. That is, the adjustment processing for increasing a difference in the output level in accordance with the frequency is executed.

(2) As the second adjustment processing on the application voice input from the application voice reproduction unit (second sound source) 102, output adjustment for entirely increasing the output level and further emphasizing the frequency characteristics (=curve shape of graph) is performed. That is, the adjustment processing for increasing a difference in the output level in accordance with the frequency is executed.

(3) The second adjustment processing on the viewing user comment voice input from the comment voice reproduction unit (third sound source) 103 is not executed.

In this way, in a case where the scene=the scene during the game execution, the second output voice adjustment unit 112 executes the second adjustment processing on the distribution user voice input from the microphone (first sound source) 101 and the second adjustment processing on the application voice input from the application voice reproduction unit (second sound source) 102, does not execute the second adjustment processing on the viewing user comment voice, and outputs the first-adjusted data as it is.

That is, in a case where the scene=the scene during the game execution, the second output voice adjustment unit 112 executes the output level-up processing and the specific frequency component emphasis processing on the distribution user voice input from the microphone (first sound source) 101 and the application voice input from the application voice reproduction unit (second sound source) 102 and outputs the voice to the next voice synthesis unit 105.

Note that the voice output adjustment example corresponding to each sound source by the second output voice adjustment unit 112 illustrated in FIG. 20(*b*) is an example, and a configuration may be used in which adjustment is performed in another adjustment mode.

Next, a specific example of processing of the voice synthesis unit 105 will be described with reference to FIG. 21.

The voice synthesis unit 105 executes synthesis processing (mixing processing) on adjusted voice data obtained by adjusting the output voices (distribution user voice, application voice, and viewing user comment voice) of the three sound sources by the first output voice adjustment unit 104 and the second output voice adjustment unit 112.

Figure 21:
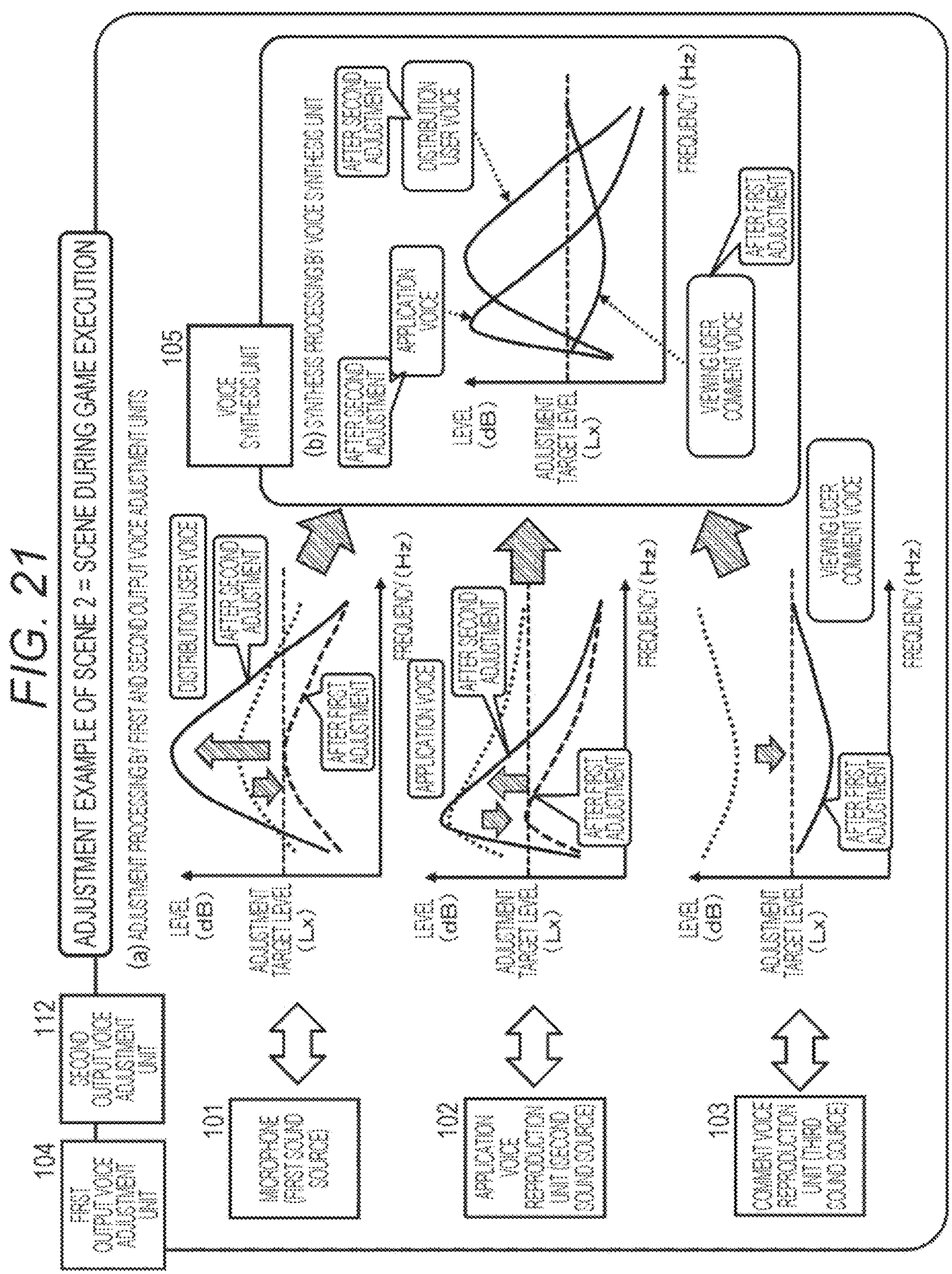
FIG. 21 is a diagram for explaining an example of the voice adjustment processing executed by the first output voice adjustment unit and the second output voice adjustment unit and an example of the voice synthesis processing executed by the voice synthesis unit, of the information processing device (transmission terminal).

In FIG. 21, each following processing example is illustrated.

(a) An adjustment processing example by the first output voice adjustment unit 104 and the second output voice adjustment unit 112

(b) A synthesis processing example of the voice synthesis unit

In FIG. 21(*a*), from the top, (1) An adjustment processing example by the first output voice adjustment unit 104 and the second output voice adjustment unit 112 on the distribution user voice input from the microphone (first sound source) 101

(2) An adjustment processing example by the first output voice adjustment unit 104 and the second output voice adjustment unit 112 on the application voice input from the application voice reproduction unit (second sound source) 102

(3) An adjustment processing example by the first output voice adjustment unit 104 and the second output voice adjustment unit 112 on the viewing user comment voice input from the comment voice reproduction unit (third sound source) 103 are illustrated.

Note that, as described above with reference to FIG. 20, in a case where the scene=the scene during the game execution, the second output voice adjustment unit 112 executes the output level-up processing and the specific frequency component emphasis processing on the distribution user voice input from the microphone (first sound source) 101 and the application voice input from the application voice reproduction unit (second sound source) 102.

In the graph of the distribution user voice illustrated in the uppermost stage in FIG. 21(*a*), the following three pieces of voice characteristics (frequency-level characteristics) data are illustrated.

(p) Pre-adjustment data of the distribution user voice input from the microphone (first sound source) 101 (fine dotted line data)

(q) First-adjusted data by the first output voice adjustment unit 104 for the distribution user voice input from the microphone (first sound source) 101 (rough dotted line data)

(r) Second-adjusted data obtained by performing two adjustments by the first output voice adjustment unit 104 and the second output voice adjustment unit 112 on the distribution user voice input from the microphone (first sound source) 101 (solid line data)

The data of (r), that is, the voice data having the voice characteristics indicated by the solid line in the graph is input into the voice synthesis unit 105.

That is, the second-adjusted data (solid line data) obtained by executing the two types of adjustment processing by the first output voice adjustment unit 104 and the second output voice adjustment unit 112 on the distribution user voice input from the microphone (first sound source) 101 is input.

In the graph of the application voice illustrated in the middle stage in FIG. 21(*a*), the following three pieces of voice characteristics (frequency-level characteristics) data are illustrated.

(p) The pre-adjustment data of the application voice input from the application voice reproduction unit (second sound source) 102 (fine dotted line data)

(q) The first-adjusted data by the first output voice adjustment unit 104 for the application voice input from the application voice reproduction unit (second sound source) 102 (rough dotted line data)

(r) The second-adjusted data obtained by performing two adjustments by the first output voice adjustment unit 104 and the second output voice adjustment unit 112 on the application voice input from the application voice reproduction unit (second sound source) 102 (solid line data)

The data of (r), that is, the voice data having the voice characteristics indicated by the solid line in the graph is input into the voice synthesis unit 105.

That is, the second-adjusted data (solid line data) obtained by executing the two types of adjustment processing by the first output voice adjustment unit 104 and the second output voice adjustment unit 112 on the application voice input from the application voice reproduction unit (second sound source) 102 is input.

On the viewing user comment voice input from the comment voice reproduction unit (third sound source) 103 illustrated in the lower stage in FIG. 21(*a*), the adjustment processing is executed only by the first output voice adjustment unit 104, and the second output voice adjustment unit 112 does not execute the adjustment processing.

Therefore, the voice data having the voice characteristics indicated by the solid line as the first-adjusted data in each graph in the lower stage in FIG. 21(*a*) is input into the voice synthesis unit 105.

In FIG. 21(*b*), a specific example of the voice synthesis processing (mixing processing) executed by the voice synthesis unit 105 is illustrated.

In the graph illustrated in FIG. 21(*b*), the data characteristics component (frequency-level characteristics) of each piece of sound source data included in the single synthesized voice generated by the synthesis (mixing) processing on the adjusted voice data of the three sound sources by the voice synthesis unit 105 is illustrated.

Each of three curves overlapped and indicated in the graph illustrated in FIG. 21(*b*) corresponds to the adjusted voice characteristics indicated by the solid line in the graph in FIG. 21(*a*).

That is, (1) the second-adjusted data obtained by executing the two types of adjustment processing by the first output voice adjustment unit 104 and the second output voice adjustment unit 112 on the distribution user voice input from the microphone (first sound source) 101

(2) second-adjusted data obtained by executing the two types of adjustment processing by the first output voice adjustment unit 104 and the second output voice adjustment unit 112 on the application voice input from the application voice reproduction unit (second sound source) 102

(3) first-adjusted data obtained by executing the single adjustment by only the first output voice adjustment unit 104 on the viewing user comment voice input from the comment voice reproduction unit (third sound source) 103 are illustrated.

The voice synthesis unit 105 generates such voice synthesized data having voice component data of each sound source and distributes the data via the communication unit 106.

The information processing device (reception terminal) 200 on the side of the viewing user 30 reproduces synthesized sound having a voice component corresponding to each sound source illustrated in FIG. 21(*b*).

In this case, the voice of the distribution user and the application voice are output as a voice easier to be heard, as compared with a viewer user comment voice.

Note that, the processing examples described with reference to FIGS. 20 and 21, that is, an output adjustment example of each sound source voice of the second output voice adjustment unit 112 in the scene of the scene=the scene during the game execution is an example, and a configuration may be used in which adjustment is performed in a mode other than the adjustment examples described above, in the scene during the game execution.

Furthermore, regarding the output adjustment processing of the voice corresponding to each sound source by the first output voice adjustment unit 104, in the processing examples described with reference to FIGS. 20 and 21, an example has been described in which the adjustment is performed for setting the maximum value of the output level of each of the three sound sources to the same single adjustment target level (Lx). However, without limiting to this adjustment example, the first output voice adjustment unit 104 may have a configuration for executing the adjustment processing described above with reference to FIGS. 7 and 8 and other adjustment processing.

4-3. (Processing Example 3) Specific Example of Scene Determination Processing of Scene 3=Crash Occurrence Scene and Voice Output Adjustment Processing According to Determined Scene Next, as a processing example 3, a specific example of scene determination processing of a crash occurrence scene and voice output adjustment processing in accordance with the determined scene will be described.

Figure 22:
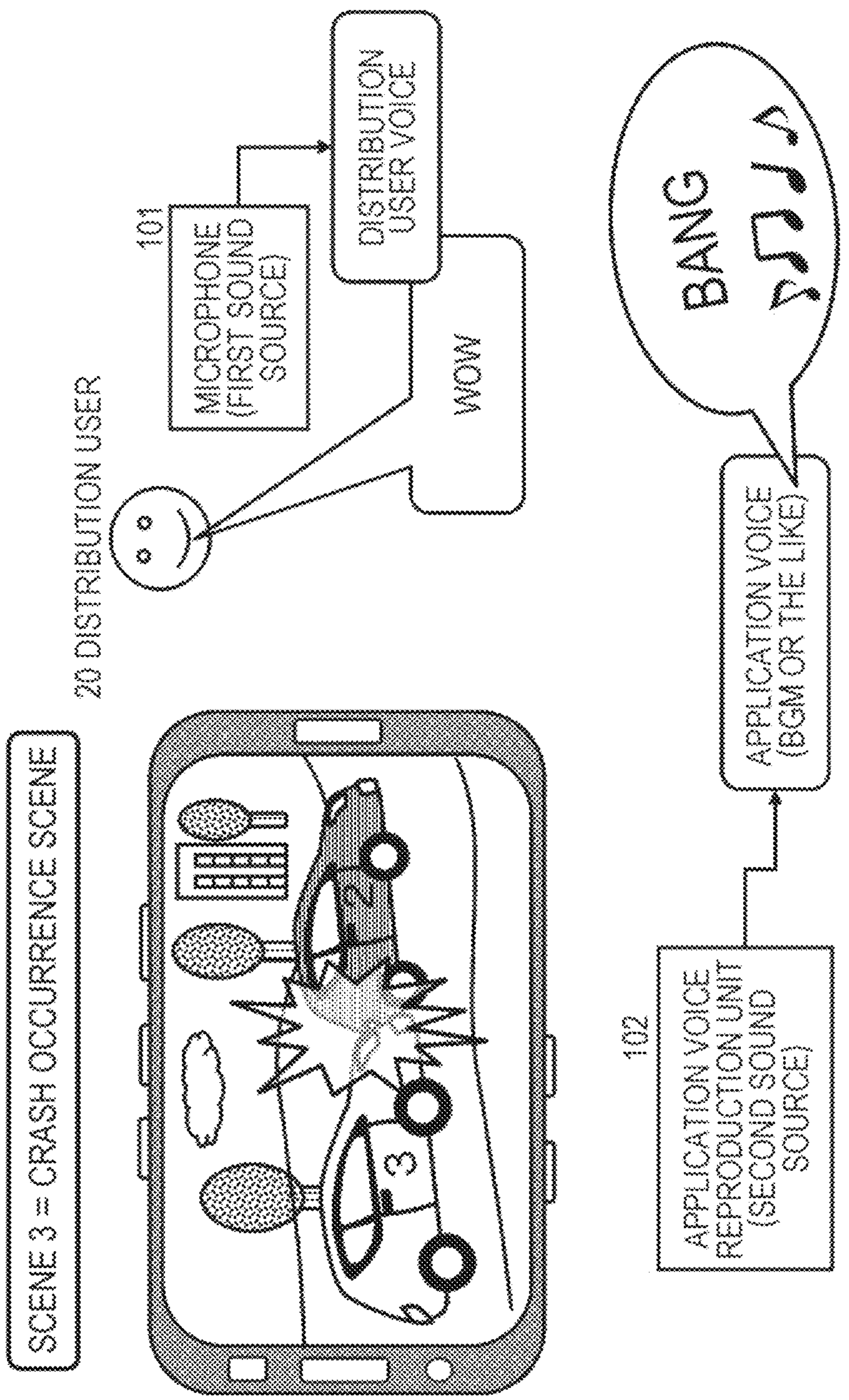
FIG. 22 is a diagram for explaining an example of the scene determination processing executed by the scene determination unit of the information processing device (transmission terminal).

FIG. 22 is a diagram for explaining a specific example of the scene determination processing on the crash occurrence scene.

In the example illustrated in FIG. 22, for example, the scene determination unit 121 analyzes the image displayed on the display unit of the information processing device (transmission terminal) 120. As illustrated in FIG. 22, on the display unit of the information processing device (transmission terminal) 120, an image in which an automobile has collided (crashed) is displayed.

The scene determination unit 121 determines that this is a scene in which a crash has occurred during execution of an automobile race game, for example, on the basis of that such an image is displayed.

Furthermore, it is possible to analyze the utterance of the distribution user 20 input via the microphone of the information processing device (transmission terminal) 120 and determine the scene.

In the example illustrated in FIG. 22, the distribution user 20 makes an utterance such as "Wow".

The scene determination unit 121 can analyze utterance content of the distribution user 20 and determine that this is a scene in which the automobile race game application is executed and an accident (crash) has occurred.

In this way, the scene determination unit 121 determines the scene of the application currently executed by the information processing device (transmission terminal) 120.

The scene determination unit 121 outputs the scene determination information that is a result of the scene determination processing to the second output voice adjustment unit 112.

The second output voice adjustment unit 112 further executes the output adjustment processing on an output voice from each sound source in accordance with the scene determination information input from the scene determination unit 121, specifically, an output voice adjusted by the first output voice adjustment unit 104, for each of adjusted voices of the three sound sources adjusted by the first output voice adjustment unit 104.

Hereinafter, with reference to FIGS. 23 and 24, a specific example of processing executed by the first output voice adjustment unit 104, the second output voice adjustment unit 112, and the voice synthesis unit 105 in a case where the scene determination unit 121 determines, as a result of the scene determination processing, that the scene=the crash occurrence scene will be described.

Figure 23:
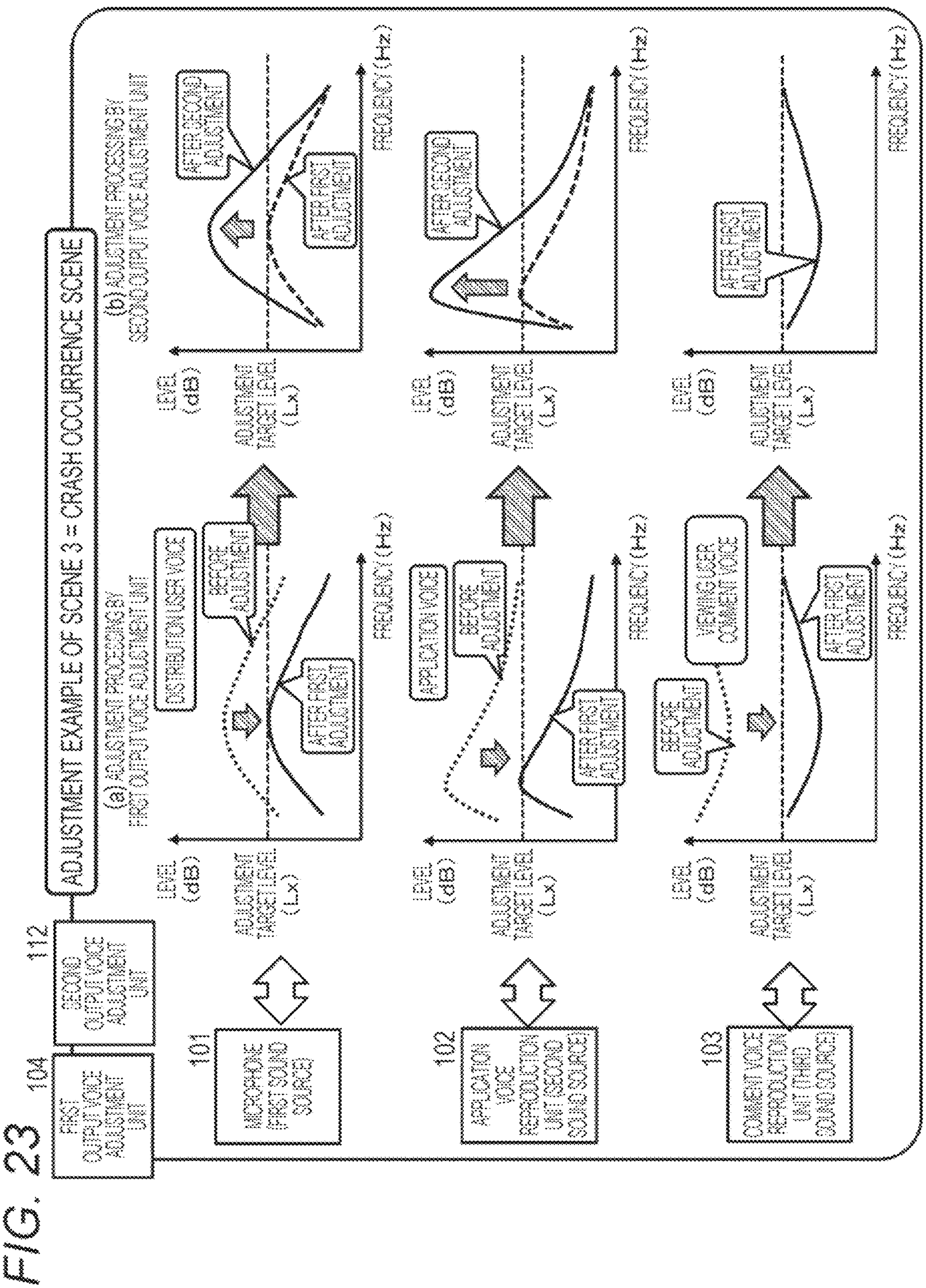
FIG. 23 is a diagram for explaining an example of the voice adjustment processing executed by the first output voice adjustment unit and the second output voice adjustment unit of the information processing device (transmission terminal).

In FIG. 23, a specific example of the output adjustment processing corresponding to each sound source executed by the first output voice adjustment unit 104 and the second output voice adjustment unit 112 in a case where the scene determination unit 121 determines, as the result of the scene determination processing, that the scene=the crash occurrence scene will be described.

In FIG. 23, from the top, (1) An adjustment processing example on the distribution user voice input from the microphone (first sound source) 101

(2) An adjustment processing example on the application voice input from the application voice reproduction unit (second sound source) 102

(3) An adjustment processing example on the viewing user comment voice input from the comment voice reproduction unit (third sound source) 103

In FIG. 23, a specific example of the output voice adjustment processing by the following two output adjustment units on each of the pieces of voice data of these three sound sources is illustrated.

(a) Adjustment processing by the first output voice adjustment unit 104

(b) Adjustment processing by the second output voice adjustment unit 112

Each of the graphs illustrated in FIGS. 23(*a*) and 23(*b*) illustrates voice characteristics data of output sound of each sound source. It is frequency-level corresponding data in which a frequency (Hz) is set on the horizontal axis, and an output level (dB) is set on the vertical axis.

The adjustment processing by the first output voice adjustment unit 104 illustrated in FIG. 23(*a*) is processing similar to the processing described above with reference to FIG. 5, and the adjustment processing for setting the maximum output of each voice to the predefined adjustment target level (Lx) is executed as the adjustment processing on the output voices of the three sound sources.

Dotted line data illustrated in each graph in FIG. 23(*a*) is voice characteristics data before being adjusted by the first output voice adjustment unit 104, that is, the voice characteristics data of the voice output from each sound source, and solid line data is voice characteristics data after the first adjustment by the first output voice adjustment unit 104.

The voice data after the first adjustment by the first output voice adjustment unit 104 is input into the second output voice adjustment unit 112. That is, first-adjusted data corresponding to the three sound sources having the voice characteristics indicated as the first-adjusted data (solid line data) in each graph in FIG. 23(*a*) is input into the second output voice adjustment unit 112, and the second adjustment processing in accordance with the scene is executed.

The example illustrated in FIG. 23 is an adjustment processing example in a case where the scene determination unit 121 determines, as the result of the scene determination processing, that the scene=the crash occurrence scene.

FIG. 23(*b*) is a specific example of adjustment processing on the output voices (distribution user voice, application voice, and viewing user comment voice) from the three sound sources executed by the second output voice adjustment unit 112 in a case where the scene=the crash occurrence scene.

As illustrated in FIG. 23(*b*), in a case where the scene=the crash occurrence scene, the second output voice adjustment unit 112 executes the following second adjustment processing on the output voices (distribution user voice, application voice, and viewing user comment voice) from the three sound sources.

(1) As the second adjustment processing on the distribution user voice input from the microphone (first sound source) 101, output adjustment for entirely increasing an output level and further emphasizing frequency characteristics (=curve shape of graph) is performed. That is, the adjustment processing for increasing a difference in the output level in accordance with the frequency is executed.

However, an increase degree of the output level of the second adjustment processing with respect to the distribution user voice in this scene 3=the crash occurrence scene is set be suppressed as compared with an increase degree in the scene 2=the scene during the game execution described above with reference to FIG. 20.

(2) As the second adjustment processing on the application voice input from the application voice reproduction unit (second sound source) 102, output adjustment for entirely increasing the output level and further emphasizing the frequency characteristics (=curve shape of graph) is performed. That is, the adjustment processing for increasing a difference in the output level in accordance with the frequency is executed.

An increase degree of the output level of the second adjustment processing with respect to the application voice in this scene 3=the crash occurrence scene is set to be substantially similar to the increase degree in the scene 2=the scene during the game execution described above with reference to FIG. 20.

This is adjustment processing for increasing collision sound at the time of crash.

(3) The second adjustment processing on the viewing user comment voice input from the comment voice reproduction unit (third sound source) 103 is not executed.

In this way, in a case where the scene=the crash occurrence scene, the second output voice adjustment unit 112 executes the second adjustment processing on the distribution user voice input from the microphone (first sound source) 101 and the second adjustment processing on the application voice input from the application voice reproduction unit (second sound source) 102, does not execute the second adjustment processing on the viewing user comment voice, and outputs the first-adjusted data as it is.

That is, in a case where the scene=the crash occurrence scene, the second output voice adjustment unit 112 executes the output level-up processing and the specific frequency component emphasis processing on the distribution user voice input from the microphone (first sound source) 101 and the application voice input from the application voice reproduction unit (second sound source) 102 and outputs the voice to the next voice synthesis unit 105.

Note that the voice output adjustment example corresponding to each sound source by the second output voice adjustment unit 112 illustrated in FIG. 23(*b*) is an example, and a configuration may be used in which adjustment is performed in another adjustment mode.

Next, a specific example of processing of the voice synthesis unit 105 will be described with reference to FIG. 24.

The voice synthesis unit 105 executes synthesis processing (mixing processing) on adjusted voice data obtained by adjusting the output voices (distribution user voice, application voice, and viewing user comment voice) of the three sound sources by the first output voice adjustment unit 104 and the second output voice adjustment unit 112.

Figure 24:
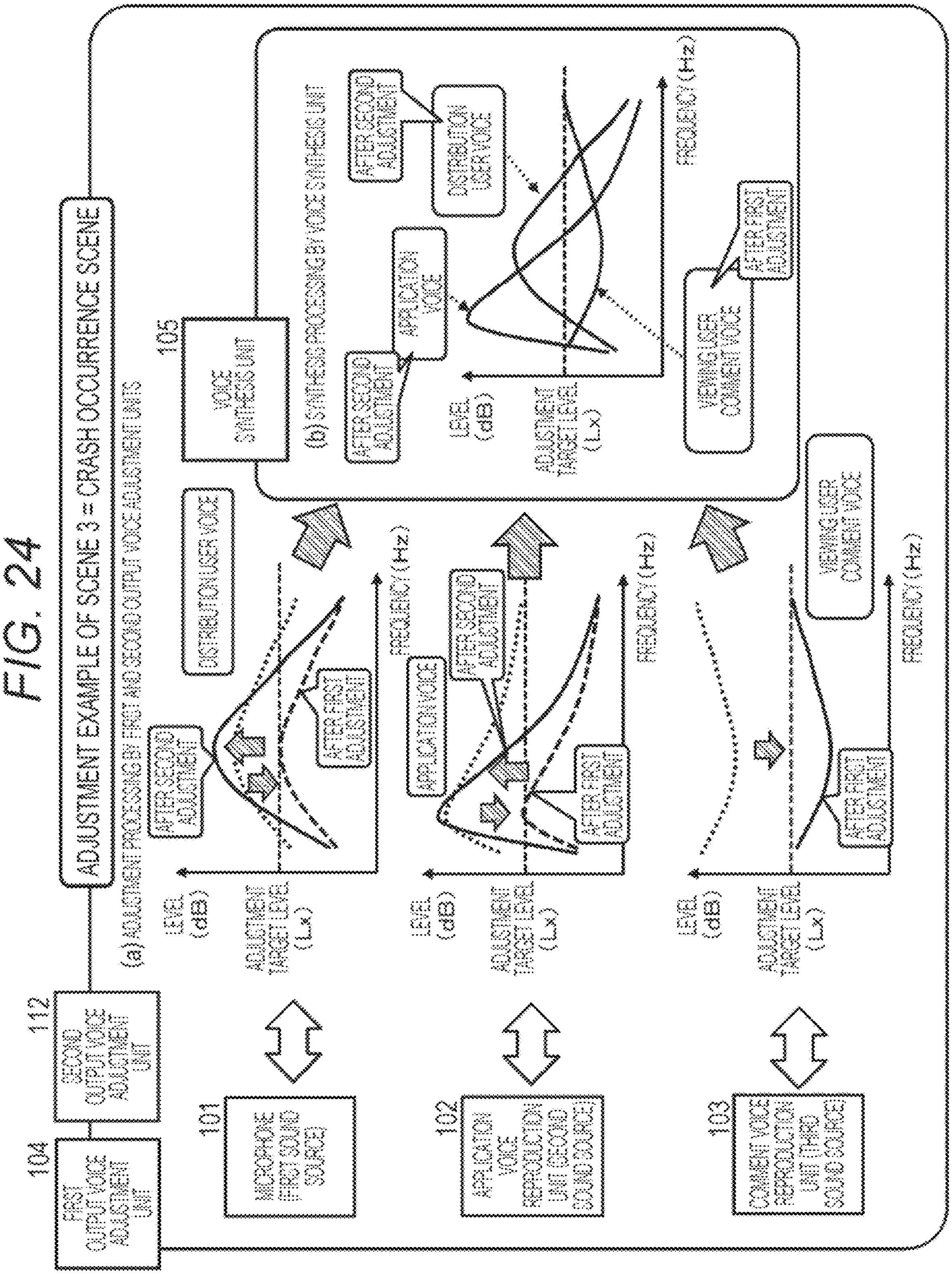
FIG. 24 is a diagram for explaining an example of the voice adjustment processing executed by the first output voice adjustment unit and the second output voice adjustment unit and an example of the voice synthesis processing executed by the voice synthesis unit, of the information processing device (transmission terminal).

In FIG. 24, each following processing example is illustrated.

(a) An adjustment processing example by the first output voice adjustment unit 104 and the second output voice adjustment unit 112

(b) A synthesis processing example of the voice synthesis unit

In FIG. 24(*a*), from the top, (1) An adjustment processing example by the first output voice adjustment unit 104 and the second output voice adjustment unit 112 on the distribution user voice input from the microphone (first sound source) 101

(2) An adjustment processing example by the first output voice adjustment unit 104 and the second output voice adjustment unit 112 on the application voice input from the application voice reproduction unit (second sound source) 102

(3) An adjustment processing example by the first output voice adjustment unit 104 and the second output voice adjustment unit 112 on the viewing user comment voice input from the comment voice reproduction unit (third sound source) 103 are illustrated.

Note that, as described above with reference to FIG. 23, in a case where the scene=the crash occurrence scene, the second output voice adjustment unit 112 executes the output level-up processing and the specific frequency component emphasis processing on the distribution user voice input from the microphone (first sound source) 101 and the application voice input from the application voice reproduction unit (second sound source) 102.

In the graph of the distribution user voice illustrated in the uppermost stage in FIG. 24(*a*), the following three pieces of voice characteristics (frequency-level characteristics) data are illustrated.

(p) Pre-adjustment data of the distribution user voice input from the microphone (first sound source) 101 (fine dotted line data)

(q) First-adjusted data by the first output voice adjustment unit 104 for the distribution user voice input from the microphone (first sound source) 101 (rough dotted line data)

(r) Second-adjusted data obtained by performing two adjustments by the first output voice adjustment unit 104 and the second output voice adjustment unit 112 on the distribution user voice input from the microphone (first sound source) 101 (solid line data)

The data of (r), that is, the voice data having the voice characteristics indicated by the solid line in the graph is input into the voice synthesis unit 105.

That is, the second-adjusted data (solid line data) obtained by executing the two types of adjustment processing by the first output voice adjustment unit 104 and the second output voice adjustment unit 112 on the distribution user voice input from the microphone (first sound source) 101 is input.

In the graph of the application voice illustrated in the middle stage in FIG. 24(*a*), the following three pieces of voice characteristics (frequency-level characteristics) data are illustrated.

(p) The pre-adjustment data of the application voice input from the application voice reproduction unit (second sound source) 102 (fine dotted line data)

(q) The first-adjusted data by the first output voice adjustment unit 104 for the application voice input from the application voice reproduction unit (second sound source) 102 (rough dotted line data)

(r) The second-adjusted data obtained by performing two adjustments by the first output voice adjustment unit 104 and the second output voice adjustment unit 112 on the application voice input from the application voice reproduction unit (second sound source) 102 (solid line data)

The data of (r), that is, the voice data having the voice characteristics indicated by the solid line in the graph is input into the voice synthesis unit 105.

That is, the second-adjusted data (solid line data) obtained by executing the two types of adjustment processing by the first output voice adjustment unit 104 and the second output voice adjustment unit 112 on the application voice input from the application voice reproduction unit (second sound source) 102 is input.

On the viewing user comment voice input from the comment voice reproduction unit (third sound source) 103 illustrated in the lower stage in FIG. 24(*a*), the adjustment processing is executed only by the first output voice adjustment unit 104, and the second output voice adjustment unit 112 does not execute the adjustment processing.

Therefore, the voice data having the voice characteristics indicated by the solid line as the first-adjusted data in each graph in the lower stage in FIG. 24(*a*) is input into the voice synthesis unit 105.

In FIG. 24(*b*), a specific example of the voice synthesis processing (mixing processing) executed by the voice synthesis unit 105 is illustrated.

In the graph illustrated in FIG. 24(*b*), the data characteristics component (frequency-level characteristics) of each piece of sound source data included in the single synthesized voice generated by the synthesis (mixing) processing on the adjusted voice data of the three sound sources by the voice synthesis unit 105 is illustrated.

Each of three curves overlapped and indicated in the graph illustrated in FIG. 24(*b*) corresponds to the adjusted voice characteristics indicated by the solid line in the graph in FIG. 24(*a*).

That is, (1) the second-adjusted data obtained by executing the two types of adjustment processing by the first output voice adjustment unit 104 and the second output voice adjustment unit 112 on the distribution user voice input from the microphone (first sound source) 101

(2) second-adjusted data obtained by executing the two types of adjustment processing by the first output voice adjustment unit 104 and the second output voice adjustment unit 112 on the application voice input from the application voice reproduction unit (second sound source) 102

(3) first-adjusted data obtained by executing the single adjustment by only the first output voice adjustment unit 104 on the viewing user comment voice input from the comment voice reproduction unit (third sound source) 103 are illustrated.

The voice synthesis unit 105 generates such voice synthesized data having voice component data of each sound source and distributes the data via the communication unit 106.

The information processing device (reception terminal) 200 on the side of the viewing user 30 reproduces synthesized sound having a voice component corresponding to each sound source illustrated in FIG. 24(*b*).

In this case, the voice of the distribution user and the application voice are output as a voice easier to be heard, as compared with a viewer user comment voice.

In this processing example, crash sound included in the application voice or a cry of the distribution user 20 is further emphasized, and this causes an effect for strongly telling a degree of urgency at the time of crash occurrence to the viewer.

Note that, the processing examples described with reference to FIGS. 23 and 24, that is, an output adjustment example of each sound source voice of the second output voice adjustment unit 112 in the scene of the scene=the crash occurrence scene is an example, and a configuration may be used in which adjustment is performed in a mode other than the adjustment examples described above, in the crash occurrence scene.

Furthermore, regarding the output adjustment processing of the voice corresponding to each sound source by the first output voice adjustment unit 104, in the processing examples described with reference to FIGS. 23 and 24, an example has been described in which the adjustment is performed for setting the maximum value of the output level of each of the three sound sources to the same single adjustment target level (Lx). However, without limiting to this adjustment example, the first output voice adjustment unit 104 may have a configuration for executing the adjustment processing described above with reference to FIGS. 7 and 8 and other adjustment processing.

4-4. (Processing Example 4) Specific Example of Scene Determination Processing of Scene 4=Game End Scene and Voice Output Adjustment Processing According to Determined Scene Next, as a processing example 4, a specific example of scene determination processing of the game end scene and voice output adjustment processing in accordance with the determined scene will be described.

Figure 25:
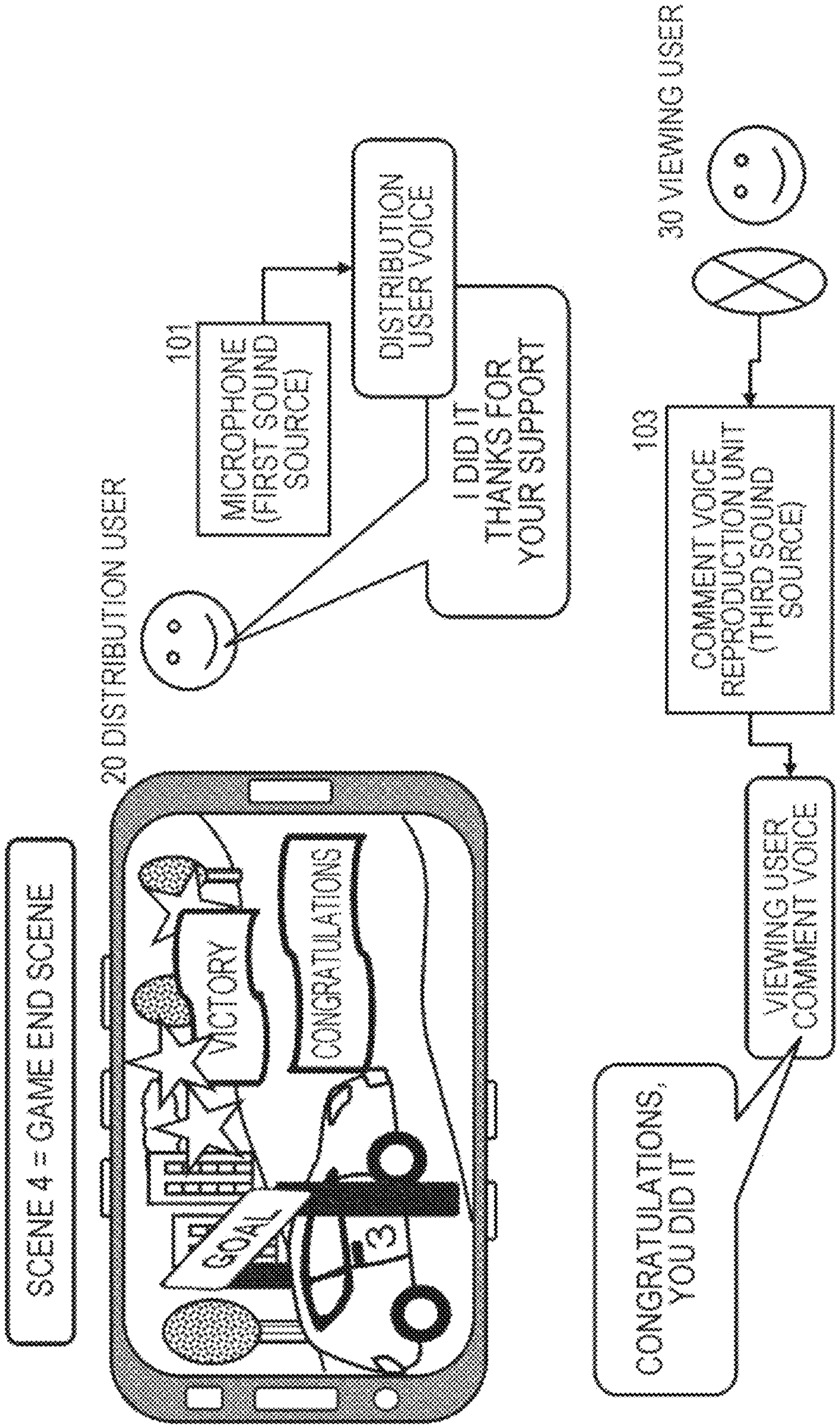
FIG. 25 is a diagram for explaining an example of the scene determination processing executed by the scene determination unit of the information processing device (transmission terminal).

FIG. 25 is a diagram for explaining a specific example of the scene determination processing of the game end scene.

In the example illustrated in FIG. 25, for example, the scene determination unit 121 analyzes the image displayed on the display unit of the information processing device (transmission terminal) 120. As illustrated in FIG. 25, on the display unit of the information processing device (transmission terminal) 120, an image in which an automobile passes through a goal (GOAL) line is displayed.

The scene determination unit 121 determines that this is a scene in which the game of the automobile race ends, for example, on the basis of the display of such an image.

Furthermore, it is possible to analyze the utterance of the distribution user 20 input via the microphone of the information processing device (transmission terminal) 120 and determine the scene.

In the example illustrated in FIG. 25, the distribution user 20 makes an utterance such as "I did it, thanks for your support".

The scene determination unit 121 can analyze utterance content of the distribution user 20 and determine that this is a scene in which the automobile race game application is executed and an accident (crash) has occurred.

Furthermore, it is possible to analyze a comment of the viewing user 30 input via the communication unit of the information processing device (transmission terminal) 120 and determine the scene.

In the example illustrated in FIG. 25, the viewing user 30 transmits a comment such as "Congratulations, you did it".

The scene determination unit 121 can analyze the comment of the viewing user 30 and determine that this is a scene in which the game of the automobile race ends.

In this way, the scene determination unit 121 reads the attribute information of the application executed by the information processing device (transmission terminal) 120 from the memory in the information processing device (transmission terminal) 120. Alternatively, the image displayed on the display unit of the information processing device (transmission terminal) 120 is analyzed, and the scene is determined on the basis of an analysis result of the image. Alternatively, the utterance content of the distribution user 20 input via the microphone of the information processing device (transmission terminal) 120 is analyzed, and the scene is determined. Alternatively, the comment of the viewing user 30 input via the communication unit of the information processing device (transmission terminal) 120 is analyzed, and the scene is determined.

At least any one of these types of processing is executed, and the scene of the application currently executed by the information processing device (transmission terminal) 120 is determined.

The scene determination unit 121 outputs the scene determination information that is a result of the scene determination processing to the second output voice adjustment unit 112. The second output voice adjustment unit 112 further executes the output adjustment processing on an output voice from each sound source in accordance with the scene determination information input from the scene determination unit 121, specifically, an output voice adjusted by the first output voice adjustment unit 104, for each of adjusted voices of the three sound sources adjusted by the first output voice adjustment unit 104.

Hereinafter, with reference to FIGS. 26 and 27, a specific example of processing executed by the first output voice adjustment unit 104, the second output voice adjustment unit 112, and the voice synthesis unit 105 in a case where the scene determination unit 121 determines, as the result of the scene determination processing, that the scene=the game end scene will be described.

Figure 26:
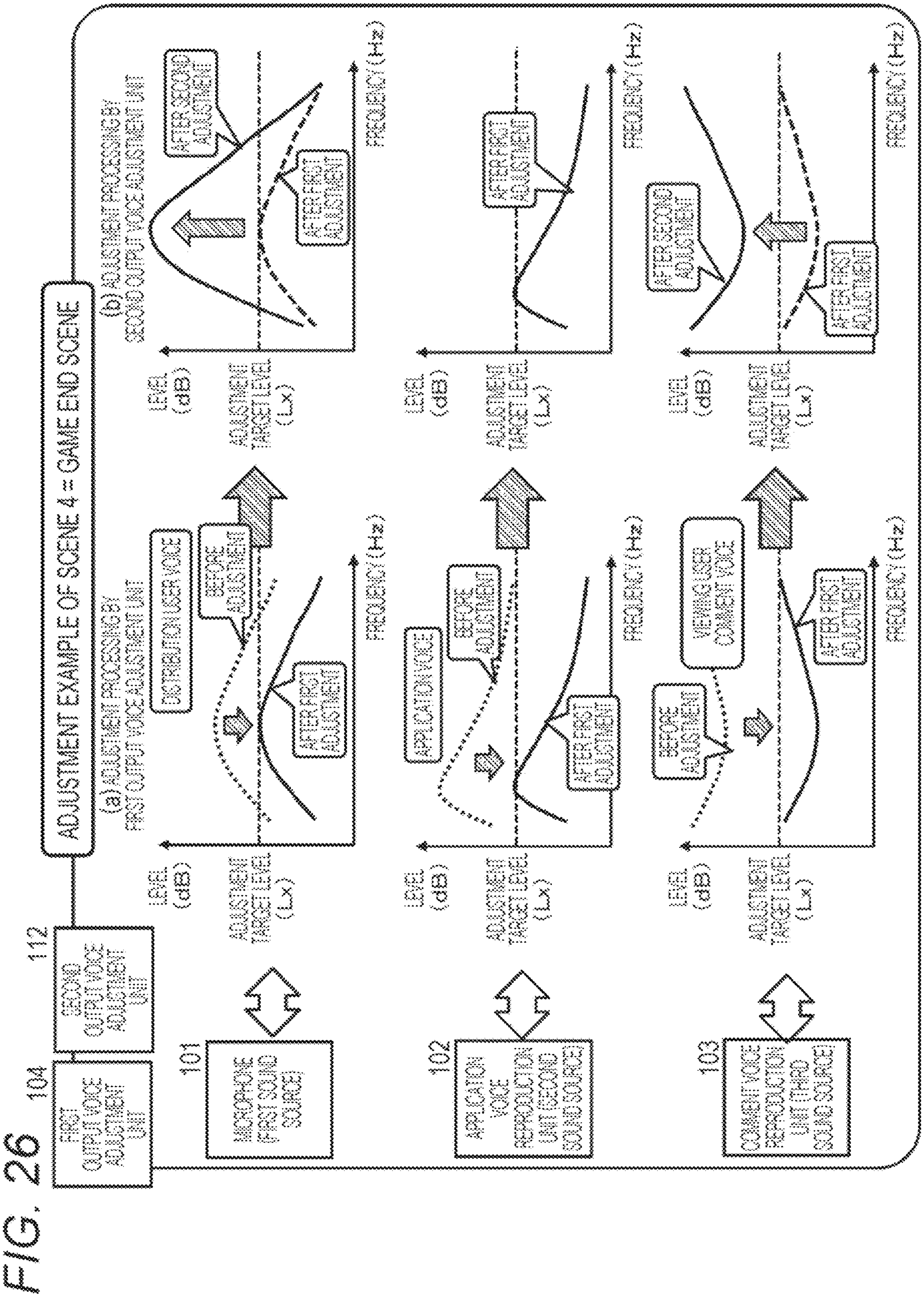
FIG. 26 is a diagram for explaining an example of the voice adjustment processing executed by the first output voice adjustment unit and the second output voice adjustment unit of the information processing device (transmission terminal).

In FIG. 26, a specific example of the output adjustment processing corresponding to each sound source executed by the first output voice adjustment unit 104 and the second output voice adjustment unit 112 in a case where the scene determination unit 121 determines, as the result of the scene determination processing, that the scene=the game end scene will be described.

In FIG. 26, from the top, (1) An adjustment processing example on the distribution user voice input from the microphone (first sound source) 101

(2) An adjustment processing example on the application voice input from the application voice reproduction unit (second sound source) 102

(3) An adjustment processing example on the viewing user comment voice input from the comment voice reproduction unit (third sound source) 103

In FIG. 26, a specific example of the output voice adjustment processing by the following two output adjustment units on each of the pieces of voice data of these three sound sources is illustrated.

(a) Adjustment processing by the first output voice adjustment unit 104

(b) Adjustment processing by the second output voice adjustment unit 112

Each of the graphs illustrated in FIGS. 26(*a*) and 26(*b*) illustrates voice characteristics data of output sound of each sound source. It is frequency-level corresponding data in which a frequency (Hz) is set on the horizontal axis, and an output level (dB) is set on the vertical axis.

The adjustment processing by the first output voice adjustment unit 104 illustrated in FIG. 26(*a*) is processing similar to the processing described above with reference to FIG. 5, and the adjustment processing for setting the maximum output of each voice to the predefined adjustment target level (Lx) is executed as the adjustment processing on the output voices of the three sound sources.

Dotted line data illustrated in each graph in FIG. 26(*a*) is voice characteristics data before being adjusted by the first output voice adjustment unit 104, that is, the voice characteristics data of the voice output from each sound source, and solid line data is voice characteristics data after the first adjustment by the first output voice adjustment unit 104.

The voice data after the first adjustment by the first output voice adjustment unit 104 is input into the second output voice adjustment unit 112. That is, first-adjusted data corresponding to the three sound sources having the voice characteristics indicated as the first-adjusted data (solid line data) in each graph in FIG. 26(*a*) is input into the second output voice adjustment unit 112, and the second adjustment processing in accordance with the scene is executed.

The example illustrated in FIG. 26 is an adjustment processing example in a case where the scene determination unit 121 determines, as the result of the scene determination processing, that the scene=the game end scene.

FIG. 26(*b*) is a specific example of adjustment processing on the output voices (distribution user voice, application voice, and viewing user comment voice) from the three sound sources executed by the second output voice adjustment unit 112 in a case where the scene=the game end scene.

As illustrated in FIG. 26(*b*), in a case where the scene=the game end scene, the second output voice adjustment unit 112 executes the following second adjustment processing on the output voices (distribution user voice, application voice, and viewing user comment voice) from the three sound sources.

(1) As the second adjustment processing on the distribution user voice input from the microphone (first sound source) 101, output adjustment for entirely increasing an output level and further emphasizing frequency characteristics (=curve shape of graph) is performed. That is, the adjustment processing for increasing a difference in the output level in accordance with the frequency is executed.

(2) The second adjustment processing on the application voice input from the application voice reproduction unit (second sound source) 102 is not executed.

(3) The second adjustment processing on the viewing user comment voice input from the comment voice reproduction unit (third sound source) 103 performs the output adjustment for entirely increasing the output level and further emphasizing the frequency characteristics (=curve shape of graph). That is, the adjustment processing for increasing a difference in the output level in accordance with the frequency is executed.

In this way, in a case where the scene=the game end scene, the second output voice adjustment unit 112 executes the second adjustment processing on the distribution user voice input from the microphone (first sound source) 101 and the second adjustment processing on the viewing user comment voice input from the comment voice reproduction unit (third sound source) 103, does not execute the second adjustment processing on the application voice input from the application voice reproduction unit (second sound source) 102, and outputs the first-adjusted data as it is.

That is, in a case where the scene=the game end scene, the second output voice adjustment unit 112 executes the output level-up processing and the specific frequency component emphasis processing on the distribution user voice input from the microphone (first sound source) 101 and the viewing user comment voice input from the comment voice reproduction unit (third sound source) 103, and outputs the voice to the next voice synthesis unit 105.

Note that the voice output adjustment example corresponding to each sound source by the second output voice adjustment unit 112 illustrated in FIG. 26(*b*) is an example, and a configuration may be used in which adjustment is performed in another adjustment mode.

Next, a specific example of processing of the voice synthesis unit 105 will be described with reference to FIG. 27.

The voice synthesis unit 105 executes synthesis processing (mixing processing) on adjusted voice data obtained by adjusting the output voices (distribution user voice, application voice, and viewing user comment voice) of the three sound sources by the first output voice adjustment unit 104 and the second output voice adjustment unit 112.

Figure 27:
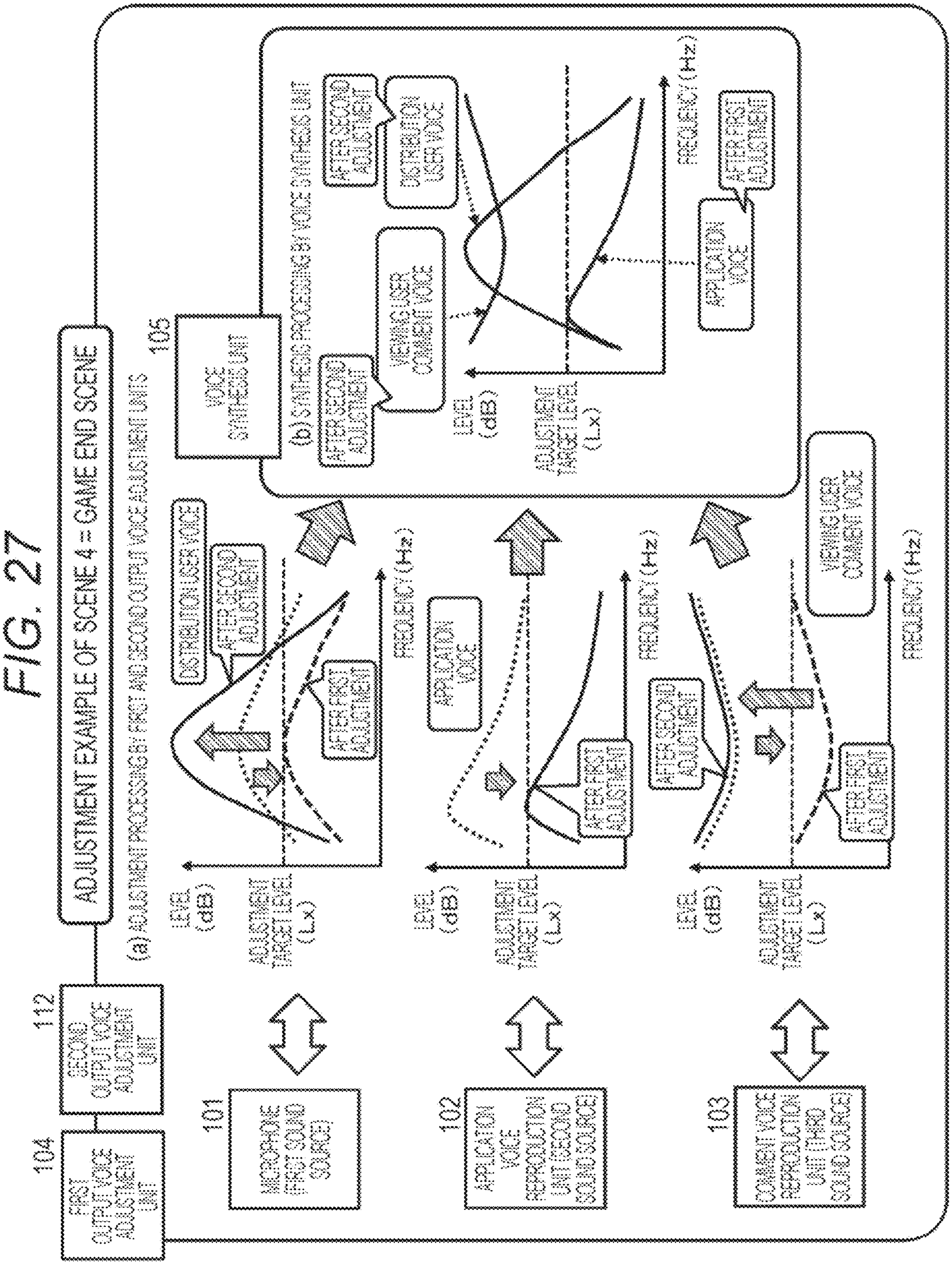
FIG. 27 is a diagram for explaining an example of the voice adjustment processing executed by the first output voice adjustment unit and the second output voice adjustment unit and an example of the voice synthesis processing executed by the voice synthesis unit, of the information processing device (transmission terminal).

In FIG. 27, each following processing example is illustrated.

(a) An adjustment processing example by the first output voice adjustment unit 104 and the second output voice adjustment unit 112

(b) A synthesis processing example of the voice synthesis unit

In FIG. 27(*a*), from the top, (1) An adjustment processing example by the first output voice adjustment unit 104 and the second output voice adjustment unit 112 on the distribution user voice input from the microphone (first sound source) 101

(2) An adjustment processing example by the first output voice adjustment unit 104 and the second output voice adjustment unit 112 on the application voice input from the application voice reproduction unit (second sound source) 102

(3) An adjustment processing example by the first output voice adjustment unit 104 and the second output voice adjustment unit 112 on the viewing user comment voice input from the comment voice reproduction unit (third sound source) 103 are illustrated.

Note that, as described above with reference to FIG. 26, in a case where the scene=the game end scene, the second output voice adjustment unit 112 executes the output level-up processing and the specific frequency component emphasis processing on the distribution user voice input from the microphone (first sound source) 101 and the viewing user comment voice input from the comment voice reproduction unit (third sound source) 103.

In the graph of the distribution user voice illustrated in the uppermost stage in FIG. 27(*a*), the following three pieces of voice characteristics (frequency-level characteristics) data are illustrated.

(p) Pre-adjustment data of the distribution user voice input from the microphone (first sound source) 101 (fine dotted line data)

(q) First-adjusted data by the first output voice adjustment unit 104 for the distribution user voice input from the microphone (first sound source) 101 (rough dotted line data)

(r) Second-adjusted data obtained by performing two adjustments by the first output voice adjustment unit 104 and the second output voice adjustment unit 112 on the distribution user voice input from the microphone (first sound source) 101 (solid line data)

The data of (r), that is, the voice data having the voice characteristics indicated by the solid line in the graph is input into the voice synthesis unit 105.

That is, the second-adjusted data (solid line data) obtained by executing the two types of adjustment processing by the first output voice adjustment unit 104 and the second output voice adjustment unit 112 on the distribution user voice input from the microphone (first sound source) 101 is input.

On the application voice input from the application voice reproduction unit (second sound source) 102 illustrated in the middle stage in FIG. 27(*a*), the adjustment processing is executed only by the first output voice adjustment unit 104, and the adjustment processing is not executed by the second output voice adjustment unit 112.

Therefore, the voice data having the voice characteristics indicated by the solid line as the first-adjusted data in each graph in the lower stage in FIG. 27(*a*) is input into the voice synthesis unit 105.

In the graph of the viewing user comment voice input from the comment voice reproduction unit (third sound source) 103 illustrated in the lower stage in FIG. 27(*a*), the following three pieces of voice characteristics (frequency-level characteristics) data are illustrated.

(p) The pre-adjustment data (fine dotted line data) of the viewing user comment voice input from the comment voice reproduction unit (third sound source) 103

(q) The first-adjusted data (rough dotted line data) by the first output voice adjustment unit 104 for the viewing user comment voice input from the comment voice reproduction unit (third sound source) 103

(r) The second-adjusted data (solid line data) obtained by performing the two adjustments by the first output voice adjustment unit 104 and the second output voice adjustment unit 112 on the viewing user comment voice input from the comment voice reproduction unit (third sound source) 103

The data of (r), that is, the voice data having the voice characteristics indicated by the solid line in the graph is input into the voice synthesis unit 105.

That is, the second-adjusted data (solid line data) obtained by executing the two types of adjustment processing by the first output voice adjustment unit 104 and the second output voice adjustment unit 112 on the viewing user comment voice input from the comment voice reproduction unit (third sound source) 103 is input.

In FIG. 27(*b*), a specific example of the voice synthesis processing (mixing processing) executed by the voice synthesis unit 105 is illustrated.

In the graph illustrated in FIG. 27(*b*), the data characteristics component (frequency-level characteristics) of each piece of sound source data included in the single synthesized voice generated by the synthesis (mixing) processing on the adjusted voice data of the three sound sources by the voice synthesis unit 105 is illustrated.

Each of three curves overlapped and indicated in the graph illustrated in FIG. 27(*b*) corresponds to the adjusted voice characteristics indicated by the solid line in the graph in FIG. 27(*a*).

That is, (1) The second-adjusted data obtained by executing the two types of adjustment processing by the first output voice adjustment unit 104 and the second output voice adjustment unit 112 on the distribution user voice input from the microphone (first sound source) 101

(2) The first-adjusted data obtained by executing the single adjustment processing only by the first output voice adjustment unit 104 on the application voice input from the application voice reproduction unit (second sound source) 102

(3) The second-adjusted data obtained by executing the two types of adjustment processing by the first output voice adjustment unit 104 and the second output voice adjustment unit 112 on the viewing user comment voice input from the comment voice reproduction unit (third sound source) 103

These are illustrated.

The voice synthesis unit 105 generates such voice synthesized data having voice component data of each sound source and distributes the data via the communication unit 106.

The information processing device (reception terminal) 200 on the side of the viewing user 30 reproduces synthesized sound having a voice component corresponding to each sound source illustrated in FIG. 27(*b*).

In this case, the voice of the distribution user and the comment voice of the viewing user are output as a voice easier to be heard, as compared with the application voice.

This processing example is an adjustment processing example in which an application voice is set to be small so as to smoothly perform conversation and interaction between the distribution user 20 and the viewing user 30 at the time when the game ends.

Note that, the processing examples described with reference to FIGS. 26 and 27, that is, an output adjustment example of each sound source voice of the second output voice adjustment unit 112 in the scene of the scene=the game end scene is an example, and a configuration may be used in which adjustment is performed in a mode other than the adjustment examples described above, in the game end scene.

Furthermore, regarding the output adjustment processing of the voice corresponding to each sound source by the first output voice adjustment unit 104, in the processing examples described with reference to FIGS. 26 and 27, an example has been described in which the adjustment is performed for setting the maximum value of the output level of each of the three sound sources to the same single adjustment target level (Lx). However, without limiting to this adjustment example, the first output voice adjustment unit 104 may have a configuration for executing the adjustment processing described above with reference to FIGS. 7 and 8 and other adjustment processing.

4-5. (Processing Example 5) Specific Example of Scene Determination Processing of Scene 5=Distribution End Scene and Voice Output Adjustment Processing According to Determined Scene Next, as a processing example 5, a specific example of scene determination processing of the distribution end scene and voice output adjustment processing in accordance with the determined scene will be described.

Figure 28:
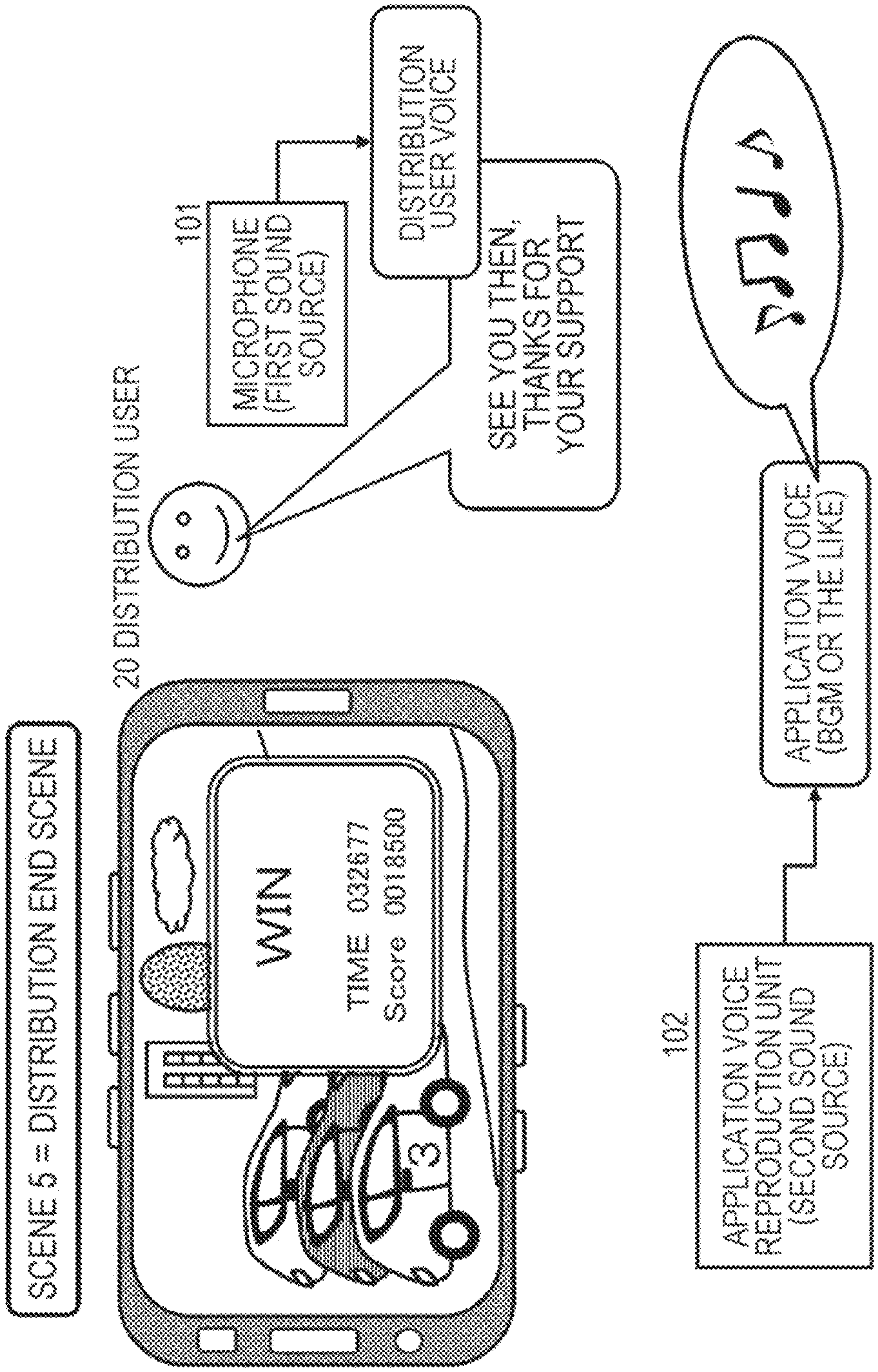
FIG. 28 is a diagram for explaining an example of the scene determination processing executed by the scene determination unit of the information processing device (transmission terminal).

FIG. 28 is a diagram for explaining a specific example of the scene determination processing of the distribution end scene.

In the example illustrated in FIG. 28, for example, the scene determination unit 121 analyzes the image displayed on the display unit of the information processing device (transmission terminal) 120. As illustrated in FIG. 28, result information of the game application is displayed on the display unit of the information processing device (transmission terminal) 120.

The scene determination unit 121 determines that this is a scene in which distribution of the automobile race game application ends, for example, on the basis of the display of such an image.

Furthermore, it is possible to analyze the utterance of the distribution user 20 input via the microphone of the information processing device (transmission terminal) 120 and determine the scene.

In the example illustrated in FIG. 28, the distribution user 20 makes an utterance such as "See you then, thanks for your support".

The scene determination unit 121 can analyze this utterance content of the distribution user 20 and determine that this is a scene in which the distribution of the automobile race game application ends.

In this way, the scene determination unit 121 determines the scene of the application currently executed by the information processing device (transmission terminal) 120.

The scene determination unit 121 outputs the scene determination information that is a result of the scene determination processing to the second output voice adjustment unit 112.

The second output voice adjustment unit 112 further executes the output adjustment processing on an output voice from each sound source in accordance with the scene determination information input from the scene determination unit 121, specifically, an output voice adjusted by the first output voice adjustment unit 104, for each of adjusted voices of the three sound sources adjusted by the first output voice adjustment unit 104.

Hereinafter, with reference to FIGS. 29 and 30, a specific example of processing executed by the first output voice adjustment unit 104, the second output voice adjustment unit 112, and the voice synthesis unit 105 in a case where the scene determination unit 121 determines, as the result of the scene determination processing, that the scene=the distribution end scene will be described.

Figure 29:
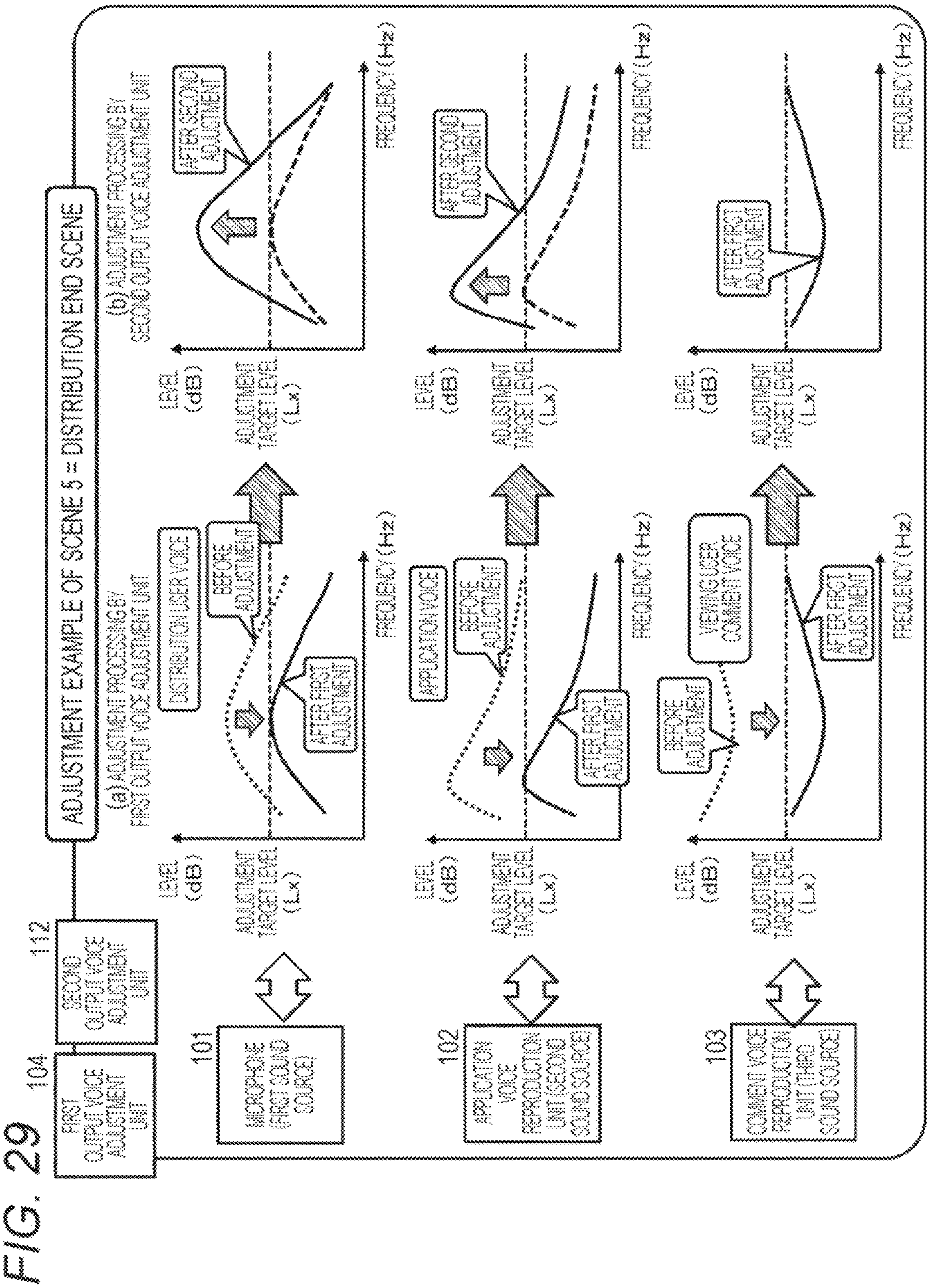
FIG. 29 is a diagram for explaining an example of the voice adjustment processing executed by the first output voice adjustment unit and the second output voice adjustment unit of the information processing device (transmission terminal).

In FIG. 29, a specific example of the output adjustment processing corresponding to each sound source executed by the first output voice adjustment unit 104 and the second output voice adjustment unit 112 in a case where the scene determination unit 121 determines, as the result of the scene determination processing, that the scene=the distribution end scene will be described.

In FIG. 29, from the top, (1) An adjustment processing example on the distribution user voice input from the microphone (first sound source) 101

(2) An adjustment processing example on the application voice input from the application voice reproduction unit (second sound source) 102

(3) An adjustment processing example on the viewing user comment voice input from the comment voice reproduction unit (third sound source) 103

In FIG. 29, a specific example of the output voice adjustment processing by the following two output adjustment units on each of the pieces of voice data of these three sound sources is illustrated.

(a) Adjustment processing by the first output voice adjustment unit 104

(b) Adjustment processing by the second output voice adjustment unit 112

Each of the graphs illustrated in FIGS. 29(*a*) and 29(*b*) illustrates voice characteristics data of output sound of each sound source. It is frequency-level corresponding data in which a frequency (Hz) is set on the horizontal axis, and an output level (dB) is set on the vertical axis.

The adjustment processing by the first output voice adjustment unit 104 illustrated in FIG. 29(*a*) is processing similar to the processing described above with reference to FIG. 5, and the adjustment processing for setting the maximum output of each voice to the predefined adjustment target level (Lx) is executed as the adjustment processing on the output voices of the three sound sources.

Dotted line data illustrated in each graph in FIG. 29(*a*) is voice characteristics data before being adjusted by the first output voice adjustment unit 104, that is, the voice characteristics data of the voice output from each sound source, and solid line data is voice characteristics data after the first adjustment by the first output voice adjustment unit 104.

The voice data after the first adjustment by the first output voice adjustment unit 104 is input into the second output voice adjustment unit 112. That is, first-adjusted data corresponding to the three sound sources having the voice characteristics indicated as the first-adjusted data (solid line data) in each graph in FIG. 29(*a*) is input into the second output voice adjustment unit 112, and the second adjustment processing in accordance with the scene is executed.

The example illustrated in FIG. 29 is an adjustment processing example in a case where the scene determination unit 121 determines, as the result of the scene determination processing, that the scene=the distribution end scene.

FIG. 29(*b*) is a specific example of adjustment processing on the output voices (distribution user voice, application voice, and viewing user comment voice) from the three sound sources executed by the second output voice adjustment unit 112 in a case where the scene=the distribution end scene.

As illustrated in FIG. 29(*b*), in a case where the scene=the distribution end scene, the second output voice adjustment unit 112 executes the following second adjustment processing on the output voices (distribution user voice, application voice, and viewing user comment voice) from the three sound sources.

(1) As the second adjustment processing on the distribution user voice input from the microphone (first sound source) 101, output adjustment for entirely increasing an output level and further emphasizing frequency characteristics (=curve shape of graph) is performed. That is, the adjustment processing for increasing a difference in the output level in accordance with the frequency is executed.

(2) As the second adjustment processing on the application voice input from the application voice reproduction unit (second sound source) 102, output adjustment for entirely increasing the output level is performed.

(3) The second adjustment processing on the viewing user comment voice input from the comment voice reproduction unit (third sound source) 103 is not executed.

In this way, in a case where the scene=the distribution end scene, the second output voice adjustment unit 112 executes the second adjustment processing on the distribution user voice input from the microphone (first sound source) 101 and the second adjustment processing on the application voice input from the application voice reproduction unit (second sound source) 102, does not execute the second adjustment processing on the viewing user comment voice, and outputs first-adjusted data as it is.

That is, in a case where the scene=the distribution end scene, the second output voice adjustment unit 112 executes the output level-up processing and the specific frequency component emphasis processing on the distribution user voice input from the microphone (first sound source) 101 and the application voice input from the application voice reproduction unit (second sound source) 102 and outputs the voice to the next voice synthesis unit 105.

Note that the voice output adjustment example corresponding to each sound source by the second output voice adjustment unit 112 illustrated in FIG. 29(*b*) is an example, and a configuration may be used in which adjustment is performed in another adjustment mode.

Next, a specific example of processing of the voice synthesis unit 105 will be described with reference to FIG. 30.

The voice synthesis unit 105 executes synthesis processing (mixing processing) on adjusted voice data obtained by adjusting the output voices (distribution user voice, application voice, and viewing user comment voice) of the three sound sources by the first output voice adjustment unit 104 and the second output voice adjustment unit 112.

Figure 30:
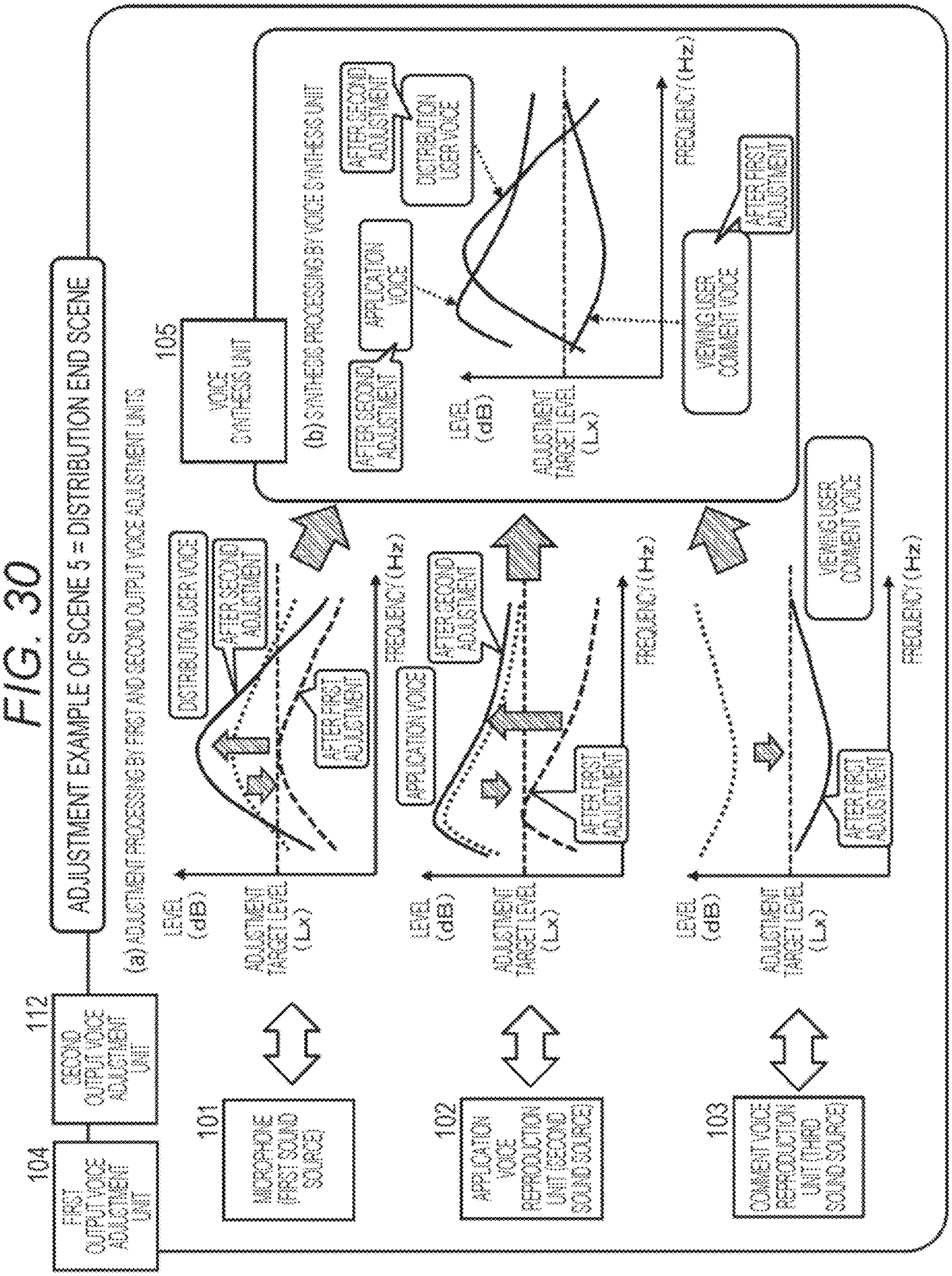
FIG. 30 is a diagram for explaining an example of the voice adjustment processing executed by the first output voice adjustment unit and the second output voice adjustment unit and an example of the voice synthesis processing executed by the voice synthesis unit, of the information processing device (transmission terminal).

In FIG. 30, each following processing example is illustrated.

(a) An adjustment processing example by the first output voice adjustment unit 104 and the second output voice adjustment unit 112

(b) A synthesis processing example of the voice synthesis unit

In FIG. 30(*a*), from the top, (1) An adjustment processing example by the first output voice adjustment unit 104 and the second output voice adjustment unit 112 on the distribution user voice input from the microphone (first sound source) 101

(2) An adjustment processing example by the first output voice adjustment unit 104 and the second output voice adjustment unit 112 on the application voice input from the application voice reproduction unit (second sound source) 102

(3) An adjustment processing example by the first output voice adjustment unit 104 and the second output voice adjustment unit 112 on the viewing user comment voice input from the comment voice reproduction unit (third sound source) 103 are illustrated.

Note that, as described above with reference to FIG. 29, in a case where the scene=the distribution end scene, the second output voice adjustment unit 112 executes the output level-up processing and the specific frequency component emphasis processing on the distribution user voice input from the microphone (first sound source) 101 and the application voice input from the application voice reproduction unit (second sound source) 102.

In the graph of the distribution user voice illustrated in the uppermost stage in FIG. 30(*a*), the following three pieces of voice characteristics (frequency-level characteristics) data are illustrated.

(p) Pre-adjustment data of the distribution user voice input from the microphone (first sound source) 101 (fine dotted line data)

(q) First-adjusted data by the first output voice adjustment unit 104 for the distribution user voice input from the microphone (first sound source) 101 (rough dotted line data)

(r) Second-adjusted data obtained by performing two adjustments by the first output voice adjustment unit 104 and the second output voice adjustment unit 112 on the distribution user voice input from the microphone (first sound source) 101 (solid line data)

The data of (r), that is, the voice data having the voice characteristics indicated by the solid line in the graph is input into the voice synthesis unit 105.

That is, the second-adjusted data (solid line data) obtained by executing the two types of adjustment processing by the first output voice adjustment unit 104 and the second output voice adjustment unit 112 on the distribution user voice input from the microphone (first sound source) 101 is input.

In the graph of the application voice illustrated in the middle stage in FIG. 30(*a*), the following three pieces of voice characteristics (frequency-level characteristics) data are illustrated.

(p) The pre-adjustment data of the application voice input from the application voice reproduction unit (second sound source) 102 (fine dotted line data)

(q) The first-adjusted data by the first output voice adjustment unit 104 for the application voice input from the application voice reproduction unit (second sound source) 102 (rough dotted line data)

(r) The second-adjusted data obtained by performing two adjustments by the first output voice adjustment unit 104 and the second output voice adjustment unit 112 on the application voice input from the application voice reproduction unit (second sound source) 102 (solid line data)

The data of (r), that is, the voice data having the voice characteristics indicated by the solid line in the graph is input into the voice synthesis unit 105.

That is, the second-adjusted data (solid line data) obtained by executing the two types of adjustment processing by the first output voice adjustment unit 104 and the second output voice adjustment unit 112 on the application voice input from the application voice reproduction unit (second sound source) 102 is input.

On the viewing user comment voice input from the comment voice reproduction unit (third sound source) 103 illustrated in the lower stage in FIG. 30(*a*), the adjustment processing is executed only by the first output voice adjustment unit 104, and the second output voice adjustment unit 112 does not execute the adjustment processing.

Therefore, the voice data having the voice characteristics indicated by the solid line as the first-adjusted data in each graph in the lower stage in FIG. 30(*a*) is input into the voice synthesis unit 105.

In FIG. 30(*b*), a specific example of the voice synthesis processing (mixing processing) executed by the voice synthesis unit 105 is illustrated.

In the graph illustrated in FIG. 30(*b*), the data characteristics component (frequency-level characteristics) of each piece of sound source data included in the single synthesized voice generated by the synthesis (mixing) processing on the adjusted voice data of the three sound sources by the voice synthesis unit 105 is illustrated.

Each of three curves overlapped and indicated in the graph illustrated in FIG. 30(*b*) corresponds to the adjusted voice characteristics indicated by the solid line in the graph in FIG. 30(*a*).

That is, (1) the second-adjusted data obtained by executing the two types of adjustment processing by the first output voice adjustment unit 104 and the second output voice adjustment unit 112 on the distribution user voice input from the microphone (first sound source) 101

(2) second-adjusted data obtained by executing the two types of adjustment processing by the first output voice adjustment unit 104 and the second output voice adjustment unit 112 on the application voice input from the application voice reproduction unit (second sound source) 102

(3) first-adjusted data obtained by executing the single adjustment by only the first output voice adjustment unit 104 on the viewing user comment voice input from the comment voice reproduction unit (third sound source) 103 are illustrated.

The voice synthesis unit 105 generates such voice synthesized data having voice component data of each sound source and distributes the data via the communication unit 106.

The information processing device (reception terminal) 200 on the side of the viewing user 30 reproduces synthesized sound having a voice component corresponding to each sound source illustrated in FIG. 30(*b*).

In this case, the voice of the distribution user and the application voice are output as a voice easier to be heard, as compared with a viewer user comment voice.

Note that, the processing examples described with reference to FIGS. 29 and 30, that is, an output adjustment example of each sound source voice of the second output voice adjustment unit 112 in the scene of the scene=the distribution end scene is an example, and a configuration may be used in which adjustment is performed in a mode other than the adjustment examples described above, in the distribution end scene.

Furthermore, regarding the output adjustment processing of the voice corresponding to each sound source by the first output voice adjustment unit 104, in the processing examples described with reference to FIGS. 29 and 30, an example has been described in which the adjustment is performed for setting the maximum value of the output level of each of the three sound sources to the same single adjustment target level (Lx). However, without limiting to this adjustment example, the first output voice adjustment unit 104 may have a configuration for executing the adjustment processing described above with reference to FIGS. 7 and 8 and other adjustment processing.

As described above, the information processing device (transmission terminal) according to the present disclosure performs the voice output adjustment in accordance with the distribution scene of the distribution content and realizes the processing for generating and distributing an optimum synthesized voice according to the scene.

5. (Fourth Embodiment) about Configuration and Processing of Information Processing Device (Transmission Terminal) Having Configuration that can Execute all Processing in First to Third Embodiments Next, a configuration and processing of an information processing device (transmission terminal) having a configuration that can execute all the processing in the first embodiment to the third embodiment described above will be described as a fourth embodiment of the present disclosure.

The first to the third embodiments described above are embodiments for executing the following processing.

(First Embodiment) As described with reference to FIG. 4, the first output voice adjustment unit 104 adjusts the output voice of each of the plurality of sound sources and synthesizes and distributes the adjusted sound source output voices.

(Second Embodiment) As described with reference to FIG. 9, the first output voice adjustment unit 104 adjusts the output voice of each of the plurality of sound sources, and the second output voice adjustment unit 104 performs the voice output adjustment in accordance with the type of the distribution content, and synthesizes and distributes the sound source output voices adjusted at these two stages.

(Third Embodiment) As described with reference to FIG. 15, the first output voice adjustment unit 104 adjusts the output voice of each of the plurality of sound sources, and the second output voice adjustment unit 104 performs the voice output adjustment in accordance with the distribution scene of the distribution content, and synthesizes and distributes the sound source output voices adjusted at these two stages.

The fourth embodiment to be described below is the information processing device (transmission terminal) that has the configuration that can execute all the processing in the first embodiment to the third embodiment described above.

Figure 31:
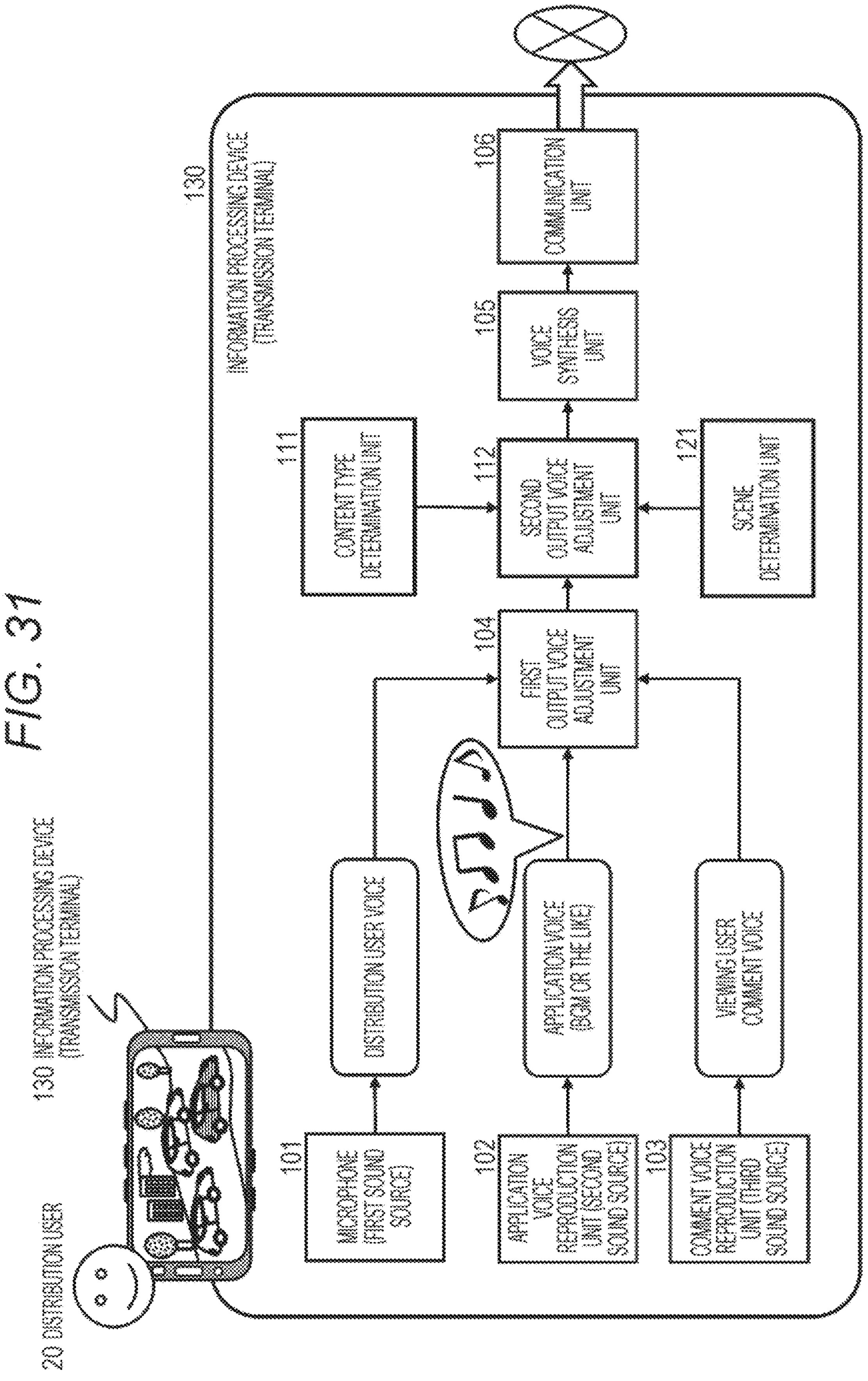
FIG. 31 is a diagram for explaining a configuration example (fourth embodiment) of the information processing device (transmission terminal).

FIG. 31 is a diagram illustrating a configuration example of an information processing device (transmission terminal) 130 according to the fourth embodiment of the present disclosure.

As illustrated in FIG. 31, the information processing device (transmission terminal) 130 includes a microphone (first sound source) 101, an application voice reproduction unit (second sound source) 102, a comment voice reproduction unit (third sound source) 103, a first output voice adjustment unit 104, a voice synthesis unit 105, a communication unit 106, and in addition, a content type determination unit 111, a second output voice adjustment unit 112, and a scene determination unit 121.

Each of these components has a configuration similar to that described above in the first to the third embodiments.

Note that the configuration illustrated in FIG. 31 is a partial configuration of the information processing device (transmission terminal) 130 and is a block diagram mainly illustrating a configuration to be applied to the voice output adjustment processing of the present disclosure. In addition to the components illustrated in the drawing, the information processing device (transmission terminal) 130 includes, for example, components similar to those of a general smartphone (smartphone), such as a display unit, an input unit, a control unit, or a storage unit.

The configuration of the information processing device (transmission terminal) 130 according to the fourth embodiment is an information processing device that includes all the components of the devices in the respective embodiments, including the information processing device (transmission terminal) 100 according to the first embodiment described above with reference to FIG. 4, the information processing device (transmission terminal) 110 according to the second embodiment described with reference to FIG. 9, and the information processing device (transmission terminal) 120 according to the third embodiment described with reference to FIG. 15.

The information processing device (transmission terminal) 130 according to the fourth embodiment has a configuration that can execute each following processing.

(a) The adjustment processing on the output voice of each sound source by the first output voice adjustment unit 104 described in the first embodiment, (b) the adjustment processing on the output voice of each sound source in accordance with the type of the distribution content by the second output voice adjustment unit 112 described in the second embodiment, and (c) the adjustment processing on the output voice of each sound source in accordance with the distribution scene by the second output voice adjustment unit 112 described in the third embodiment, The information processing device (transmission terminal) 130 according to the fourth embodiment illustrated in FIG. 31 has a configuration that can execute these processing together or selectively execute these processing.

That is, the first output voice adjustment unit 104 inputs the following three pieces of voice data.

(1) The distribution user voice from the microphone (first sound source) 101, (2) The application voice from the application voice reproduction unit (second sound source) 102, and (3) The viewing user comment voice from the comment voice reproduction unit (third sound source) 103, The first output voice adjustment unit 104 inputs three pieces of voice data from these three sound sources, and for example, as described above with reference to FIG. 5, executes the adjustment processing for setting the maximum output of the output voices of the three sound sources to the predefined adjustment target level (Lx). Alternatively, the adjustment processing described with reference to FIGS. 7 and 8 or the like is executed.

This processing is processing corresponding to the processing in the first embodiment described above with reference to FIGS. 4 to 8.

The second output voice adjustment unit 112 inputs type information of content executed and distributed in the information processing device (transmission terminal) 110 by the distribution user 20 from the content type determination unit 111 and executes output voice adjustment processing in accordance with the content type on each of the adjusted voices of the three sound sources adjusted by the first output voice adjustment unit 104.

This processing is processing corresponding to the processing in the second embodiment described above with reference to FIGS. 9 to 14.

Moreover, the second output voice adjustment unit 112 inputs scene information of an application executed and distributed in the information processing device (transmission terminal) 110 by the distribution user 20 from the scene determination unit 121, and executes the output voice adjustment processing in accordance with the scene, on each of the adjusted voices of the three sound sources adjusted by the first output voice adjustment unit 104.

This processing is processing corresponding to the processing in the third embodiment described above with reference to FIGS. 15 to 30.

In this way, the information processing device (transmission terminal) 130 illustrated in FIG. 31 has the configuration that can execute the processing in the first to the third embodiments described above together or selectively execute the processing.

6. (Fifth Embodiment) about Configuration and Processing of Information Processing Device (Reception Terminal) in Fifth Embodiment of the Present Disclosure Next, a configuration and processing of an information processing device (reception terminal) 200 on a side of receiving distribution content will be described, as a fifth embodiment of the present disclosure.

Figure 32:
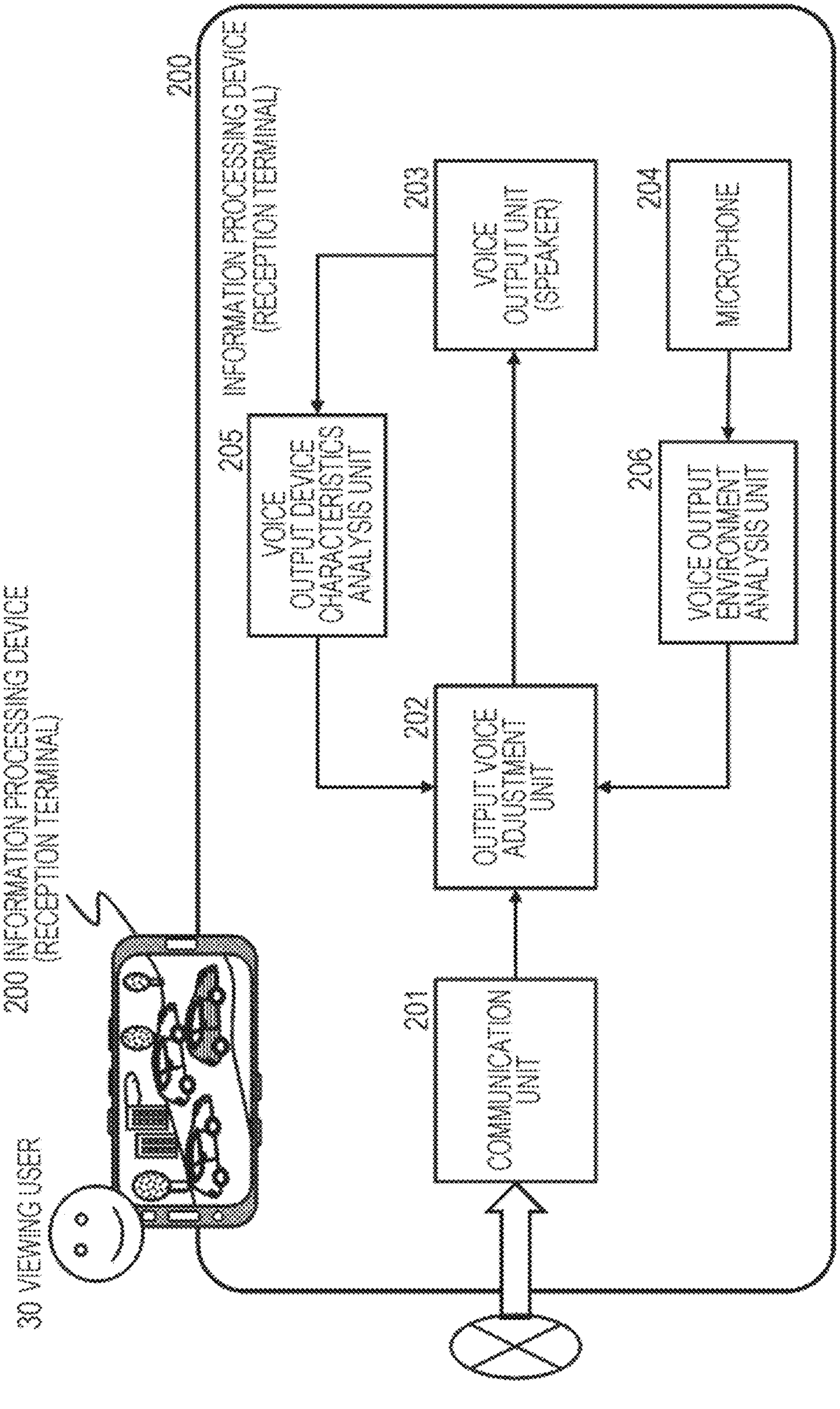
FIG. 32 is a diagram for explaining a configuration example (fifth embodiment) of an information processing device (reception terminal).

FIG. 32 is a diagram illustrating a configuration example of the information processing device (reception terminal) 200 according to the fifth embodiment of the present disclosure.

As illustrated in FIG. 32, the information processing device (reception terminal) 200 includes a communication unit 201, an output voice adjustment unit 202, a voice output unit 203, a microphone 204, a voice output device characteristics analysis unit 205, and a voice output environment analysis unit 206.

Note that the configuration illustrated in FIG. 32 is a partial configuration of the information processing device (reception terminal) 200 and is a block diagram mainly illustrating a configuration to be applied to the voice output adjustment processing of the present disclosure. In addition to the components illustrated in the drawing, the information processing device (reception terminal) 200 includes, for example, components similar to those of a general smartphone (smartphone), such as a display unit, an input unit, a control unit, or a storage unit.

The communication unit 201 receives transmission data of an information processing device (transmission terminal) that performs content distribution.

Furthermore, processing for transmitting a comment input by a viewing user 30 on the side of the information processing device (reception terminal) 200 or the like is executed.

The output voice adjustment unit 202 executes output adjustment processing on voice data included in the transmission data of the information processing device (transmission terminal).

Details of the voice output adjustment processing will be described later.

The voice output unit 203 is a voice output unit including a speaker or the like and executes output processing of a voice adjusted by the output voice adjustment unit 202.

The microphone 204 acquires a voice of the viewing user 30 or environment sound such as surrounding noise and inputs the sound into the voice output environment analysis unit 206.

The voice output device characteristics analysis unit 205 analyzes device characteristics of a voice output device such as the speaker included in the voice output unit 203. For example, frequency characteristics of speaker output sound or the like is analyzed. The analysis information is input into the output voice adjustment unit 202.

The voice output environment analysis unit 206 inputs the voice of the viewing user 30 and the environment sound such as the surrounding noise from the microphone 204, and analyzes environment information such as a noise sound state in a viewing and listening environment of content distributed from the information processing device (transmission terminal), for example, whether the viewing and listening environment is a noisy environment or a quiet environment. The analysis information is input into the output voice adjustment unit 202.

Next, a specific example of the output voice adjustment processing executed by the output voice adjustment unit 202 will be described with reference to FIG. 33 and the subsequent drawings.

The output voice adjustment unit 202 inputs each piece of the following information.

(1) Voice output device characteristics corresponding to the voice output device such as the speaker included in the voice output unit 203, from the voice output device characteristics analysis unit 205

(2) Voice output environment information based on input sound of the microphone 204, from the voice output environment analysis unit 206

The voice output device characteristics corresponding to the voice output device such as the speaker input from the voice output device characteristics analysis unit 205 are, for example, characteristics such as frequency characteristics of speaker output sound.

Furthermore, the voice output environment information input from the voice output environment analysis unit 206 is information analyzed based on the environment sound such as the voice of the viewing user 30 or the surrounding noise and the environment information such as the noise sound state in the content viewing environment, for example, whether the environment is a noisy environment or a quiet environment.

The output voice adjustment unit 202 executes the output adjustment processing on a voice input via the communication unit 201, that is, a voice included in the distribution content transmitted by the information processing device (transmission terminal), on the basis of these pieces of input information.

Figure 33:
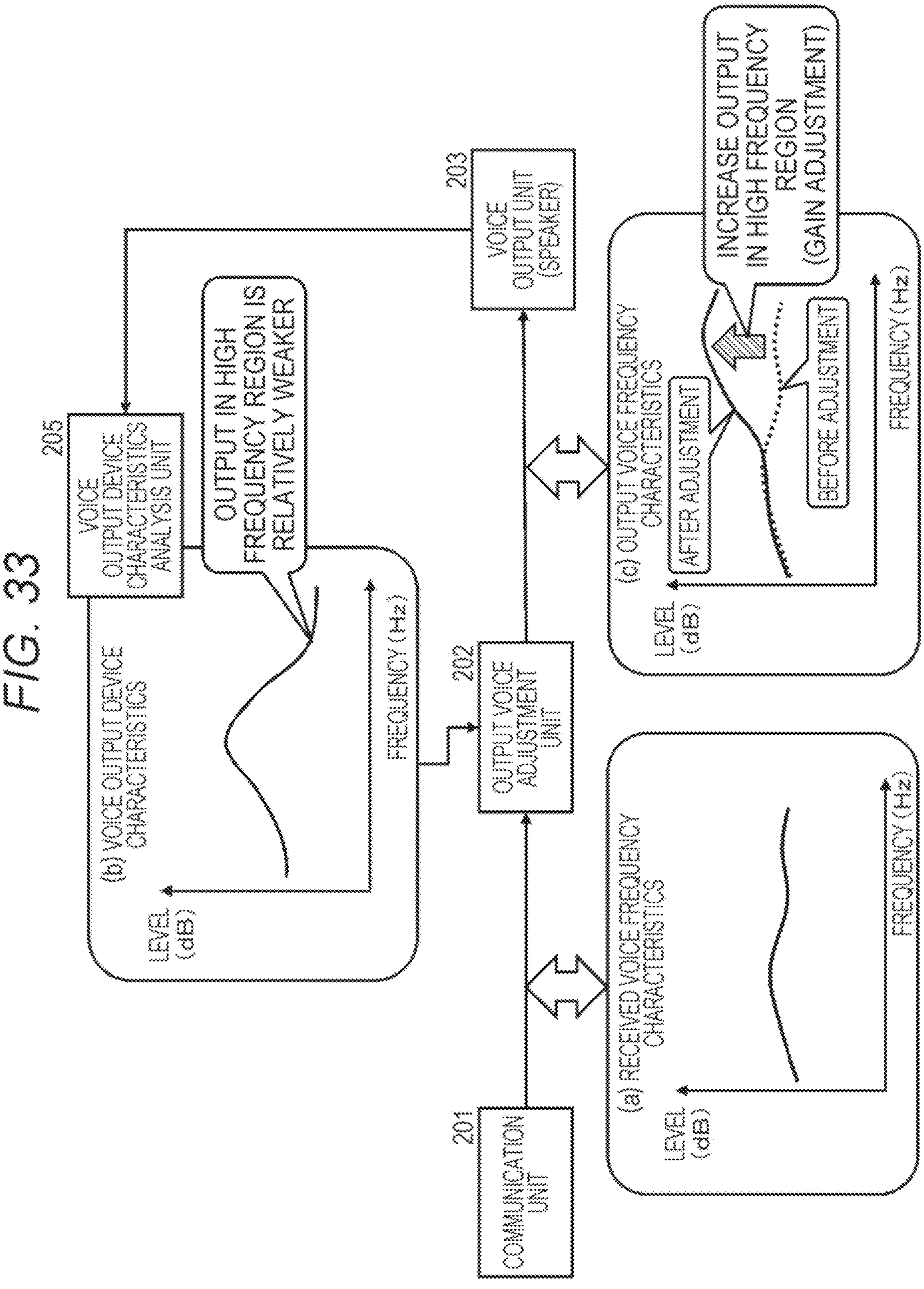
FIG. 33 is a diagram for explaining an example of voice adjustment processing executed by an output voice adjustment unit of the information processing device (reception terminal).

FIG. 33 is a diagram for explaining a specific example of the output voice adjustment processing executed, by the output voice adjustment unit 202, by inputting the voice output device characteristics corresponding to the voice output device such as the speaker included in the voice output unit 203, from the voice output device characteristics analysis unit 205.

The "(a) Received voice frequency characteristics" in the lower left in FIG. 33 is a graph illustrating characteristics of voice data received by the communication unit 201. That is, (a) indicates characteristics of voice data of the content distributed by the information processing device (transmission terminal) 100 on the side of the distribution user 20.

A horizontal axis indicates a frequency (Hz), and a vertical axis indicates frequency-level corresponding data in which an output level (dB) is set.

Note that, the voice data received by the communication unit 201 of the information processing device (reception terminal) 200 is synthesized voice data of voices (distribution user voice, application voice, and viewing user comment voice) corresponding to a plurality of sound sources of the information processing device (transmission terminal) 100 on the side of the distribution user 20 and is voice data adjusted by the processing in any one of the first to the fourth embodiments described above.

As illustrated in FIG. 33, the output voice adjustment unit 202 inputs voice data having characteristics indicated by "(a) received voice frequency characteristics" in the lower left in FIG. 33 via the communication unit 201.

Moreover, the output voice adjustment unit 202 inputs the voice output device characteristics corresponding to the voice output device such as the speaker included in the voice output unit 203, from the voice output device characteristics analysis unit 205.

The voice output device characteristics analysis unit 205 analyzes characteristics of the voice output unit 203.

An example of the characteristics of the voice output unit 203 analyzed by the voice output device characteristics analysis unit 205 is "(b) voice output device characteristics" illustrated in the upper stage in FIG. 33.

The "(b) voice output device characteristics illustrated in the upper stage in FIG. 33 has a feature that an output in a high frequency region is relatively weaker than that in other frequency regions.

The output voice adjustment unit 202 performs output adjustment on the voice data received from the transmission terminal via the communication unit 201, on the basis of the characteristics "(b) voice output device characteristics" of the voice output unit 203 analyzed by the voice output device characteristics analysis unit 205.

For example, adjustment processing for adjusting "(a) received voice frequency characteristics" that are the characteristics of the voice data received from the transmission terminal via the communication unit 201 and setting the data as voice data having "(c) output voice frequency characteristics" in the lower right in FIG. 33 is executed.

The "(c) output voice frequency characteristics" in the lower right in FIG. 33 indicate pre-adjustment data (dotted line) and adjusted data (solid line).

The adjusted data (solid line) is data having voice characteristics in which an output level in a high frequency region of the pre-adjustment data (dotted line) is increased, indicates that the output voice adjustment unit 202 has executed the voice adjustment processing for increasing (gain up) the output level in the high frequency region of the voice data received from the transmission terminal.

By such output voice adjustment processing by the output voice adjustment unit 202, a voice output via the voice output unit (speaker) 203 is output as voice data of which a high frequency region is easy to be heard as compared with the original received data ((a) received voice frequency characteristics).

Next, with reference to FIG. 34, a specific example of the output voice adjustment processing executed, by the output voice adjustment unit 202, by inputting the voice output environment information based on the input sound of the microphone 204, from the voice output environment analysis unit 206 will be described.

The output voice adjustment unit 202 inputs the voice output environment information that is the analysis information such as the voice of the viewing user 30 or the environment sound such as the surrounding noise, from the voice output environment analysis unit 206. For example, the information is the environment information such as the noise sound state in the content viewing environment, for example, whether the environment is a noisy environment or a quiet environment.

The output voice adjustment unit 202 executes the output adjustment processing on a voice input via the communication unit 201, that is, a voice included in the distribution content transmitted by the information processing device (transmission terminal), on the basis of this input information.

Figure 34:
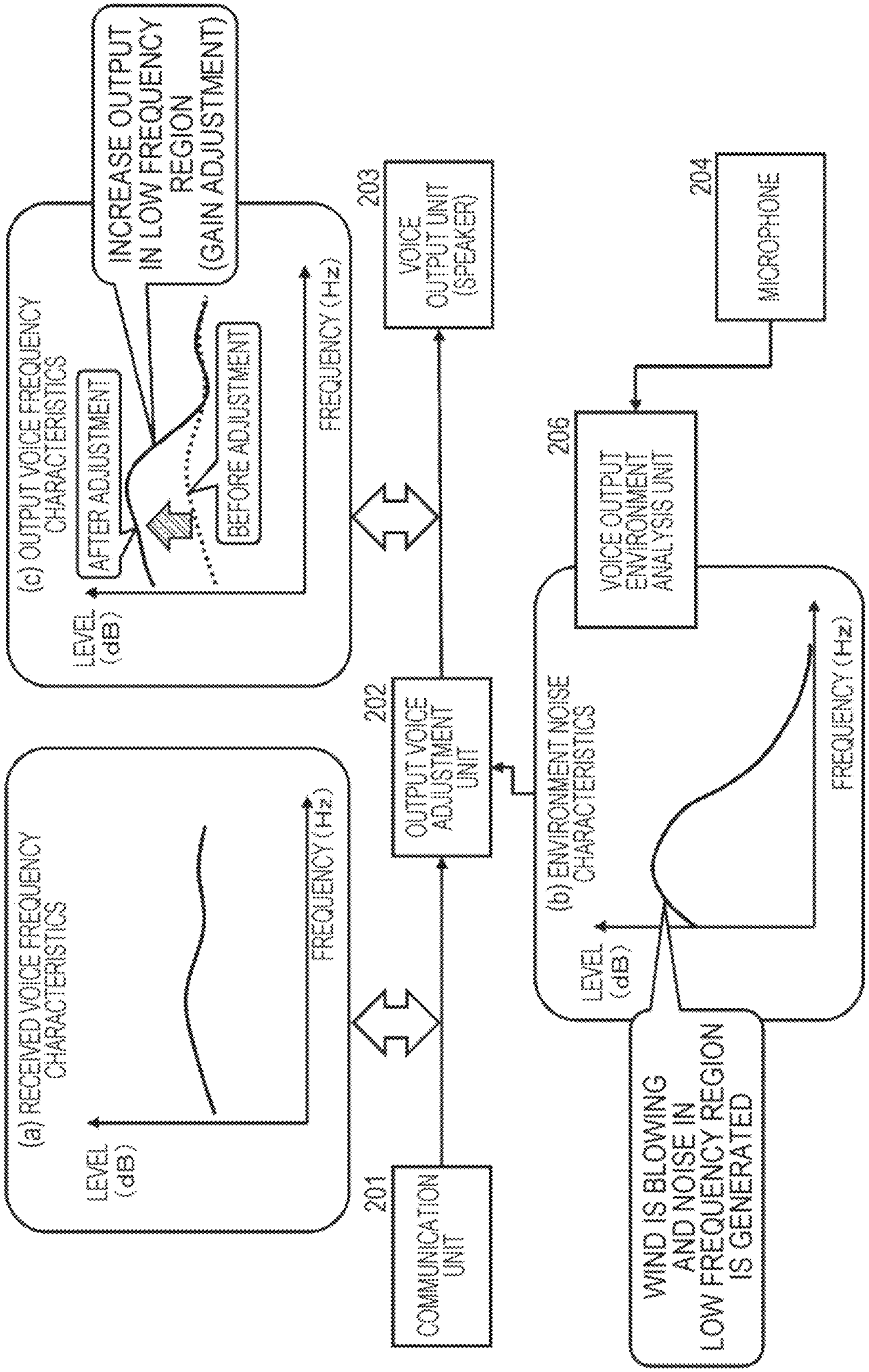
FIG. 34 is a diagram for explaining an example of the voice adjustment processing executed by the output voice adjustment unit of the information processing device (reception terminal).

The "(a) Received voice frequency characteristics" in the upper left in FIG. 34 is a graph illustrating characteristics of voice data received by the communication unit 201. That is, (a) indicates characteristics of voice data of the content distributed by the information processing device (transmission terminal) 100 on the side of the distribution user 20.

A horizontal axis indicates a frequency (Hz), and a vertical axis indicates frequency-level corresponding data in which an output level (dB) is set.

Note that, the voice data received by the communication unit 201 of the information processing device (reception terminal) 200 is the synthesized voice data of the voices (distribution user voice, application voice, and viewing user comment voice) corresponding to the plurality of sound sources of the information processing device (transmission terminal) 100 on the side of the distribution user 20 and is voice data adjusted by the processing in any one of the first to the fourth embodiments described above.

As illustrated in FIG. 34, the output voice adjustment unit 202 inputs voice data having characteristics indicated by "(a) received voice frequency characteristics" in the upper left in FIG. 34 via the communication unit 201.

Moreover, the output voice adjustment unit 202 inputs the voice output environment information analyzed on the basis of the input sound of the microphone 204, from the voice output environment analysis unit 206.

The voice output environment analysis unit 206 executes processing for analyzing the environment sound such as the voice of the viewing user 30 or the environment sound such as the surrounding noise, on the basis of the input sound of the microphone 204. For example, the information is the environment information such as the noise sound state in the content viewing environment, for example, whether the environment is a noisy environment or a quiet environment.

An example of environment noise characteristics analyzed by the voice output environment analysis unit 206 is "(b) environment noise characteristics" illustrated in the lower stage in FIG. 34.

The "(b) environment noise characteristics" illustrated in the lower stage in FIG. 34 has a feature that a noise in a low frequency region is relatively stronger than that in the other frequency regions.

For example, this occurs due to a state where wind is blowing or the like.

The output voice adjustment unit 202 executes output adjustment on the voice data received from the transmission terminal via the communication unit 201, on the basis of "(b) environment noise characteristics" analyzed by the voice output environment analysis unit 206.

For example, adjustment processing for adjusting "(a) received voice frequency characteristics" that are the characteristics of the voice data received from the transmission terminal via the communication unit 201 and setting the data as the voice data having "(c) output voice frequency characteristics" in the upper right in FIG. 34 is executed.

The "(c) output voice frequency characteristics" in the upper right in FIG. 34 indicate pre-adjustment data (dotted line) and adjusted data (solid line).

The adjusted data (solid line) is data having voice characteristics in which an output level in the low frequency region of the pre-adjustment data (dotted line) is increased, indicates that the output voice adjustment unit 202 has executed the voice adjustment processing for increasing (gain up) the output level in the low frequency region of the voice data received from the transmission terminal.

By this output voice adjustment processing by the output voice adjustment unit 202, the voice output via the voice output unit (speaker) 203 is output as voice data of which the low frequency region is easy to be heard even in a wind blowing environment.

Note that, in FIGS. 33 and 34, as an output voice adjustment processing example by the output voice adjustment unit 202, the following two types of output voice adjustment processing are individually described.

(1) The output voice adjustment processing based on the voice output device characteristics corresponding to the voice output device such as the speaker included in the voice output unit 203, input from the voice output device characteristics analysis unit 205

(2) The output voice adjustment processing on the basis of the voice output environment information based on the input sound of the microphone 204, input from the voice output environment analysis unit 206

The output voice adjustment unit 202 can execute these two types of processing together.

Figure 35:
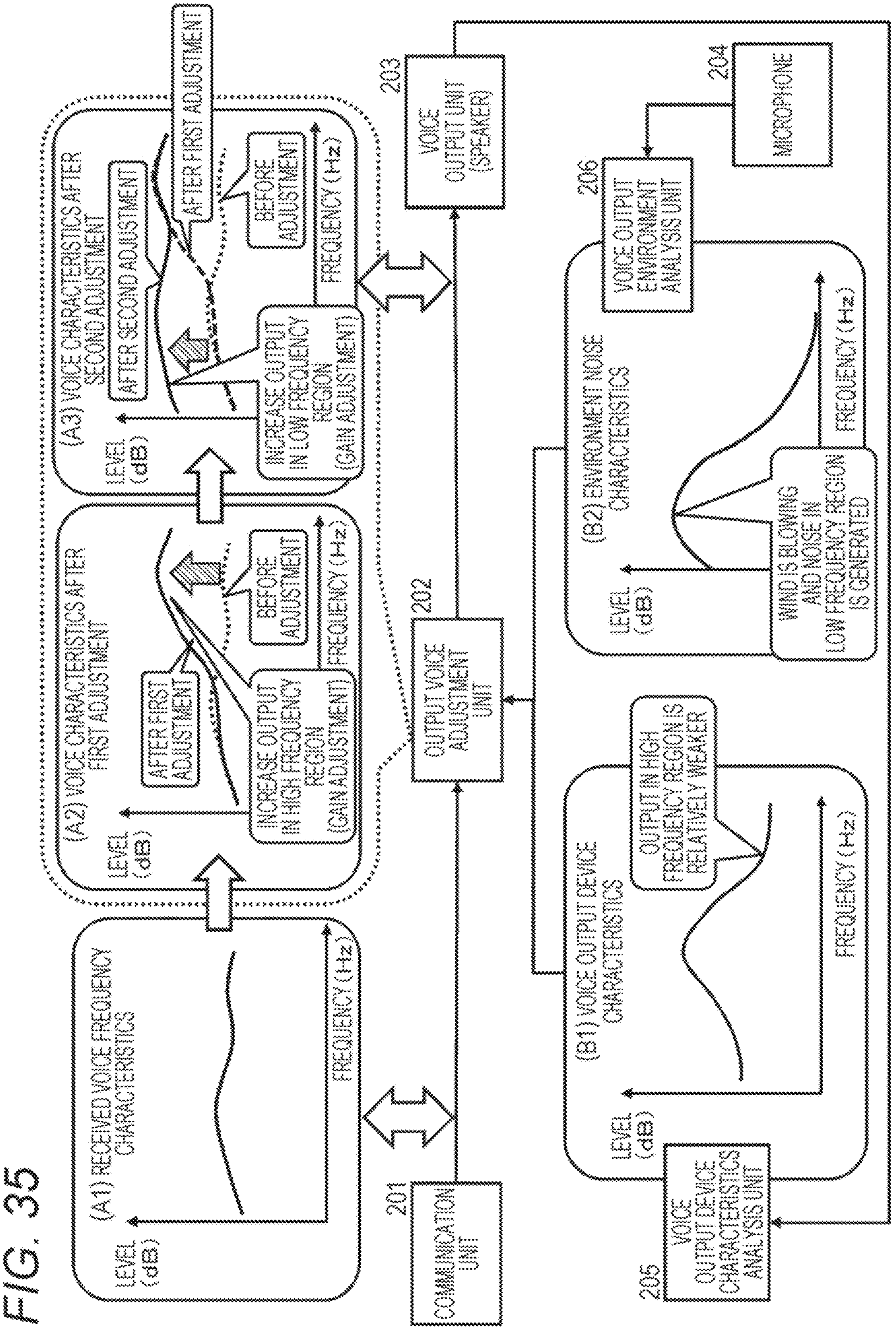
FIG. 35 is a diagram for explaining an example of the voice adjustment processing executed by the output voice adjustment unit of the information processing device (reception terminal).

FIG. 35 is a diagram for explaining a processing example for executing the two types of processing described with reference to FIGS. 33 and 34 together.

In the upper stage in FIG. 35, each of the following voice characteristics diagrams is illustrated.

(A1) Received voice frequency characteristics (A2) Voice characteristics after first adjustment (=characteristics of voice data after output voice adjustment processing based on voice output device characteristics input from voice output device characteristics analysis unit 205)

(A3) Voice characteristics after second adjustment (=characteristics of voice data after output voice adjustment processing based on environment noise characteristics input from voice output environment analysis unit 206)

Furthermore, in the lower stage in FIG. 35, the following two characteristic diagrams are illustrated.

(B1) The voice output device characteristics input from the voice output device characteristics analysis unit 205

(B2) The environment noise characteristics input from the voice output environment analysis unit 206

The output voice adjustment unit 202 executes adjustment processing on "(A1) the received voice frequency characteristics" and generates "(A2) the voice characteristics after the first adjustment (=characteristics of voice data after output voice adjustment processing based on voice output device characteristics input from voice output device characteristics analysis unit 205)

on the basis of "(B1) the voice output device characteristics input from the voice output device characteristics analysis unit 205".

Moreover, the output voice adjustment unit 202 further adjusts "(A2) the voice characteristics after the first adjustment (=characteristics of voice data after output voice adjustment processing based on voice output device characteristics input from voice output device characteristics analysis unit 205) and generates "(A3) the voice characteristics after the second adjustment (=characteristics of voice data after output voice adjustment processing based on environment noise characteristics input from voice output environment analysis unit 206)

on the basis of "(B2) the environment noise characteristics input from the voice output environment analysis unit 206".

The data after the two-stage adjustment, that is, voice data having "(A3) the voice characteristics after the second adjustment (=characteristics of voice data after output voice adjustment processing based on environment noise characteristics input from voice output environment analysis unit 206) is output via the voice output unit (speaker) 203.

The voice data output via the voice output unit (speaker) 203 is output as voice data of which the high frequency region is easier to hear as compared with the original received data ((A1) received voice frequency characteristics) and voice data of which the low frequency region is easy to be heard even in the environment where wind is blowing.

In this way, the information processing device (reception terminal) 200 on the side where the distribution content is received that is the fifth embodiment of the present disclosure executes the output voice adjustment processing based on the device characteristics of the voice output device such as the speaker and the environment noise characteristics and outputs the adjusted voice via the voice output device such as the speaker.

Through this processing, the output of the voice data having the voice characteristics (frequency characteristics) easy to be heard is realized.

7. About Hardware Configuration Example of Information Processing Device

Next, a hardware configuration example of the information processing device according to the present disclosure, that is, the information processing device used as the transmission terminal or the reception terminal will be described with reference to FIG. 36.

Figure 36:
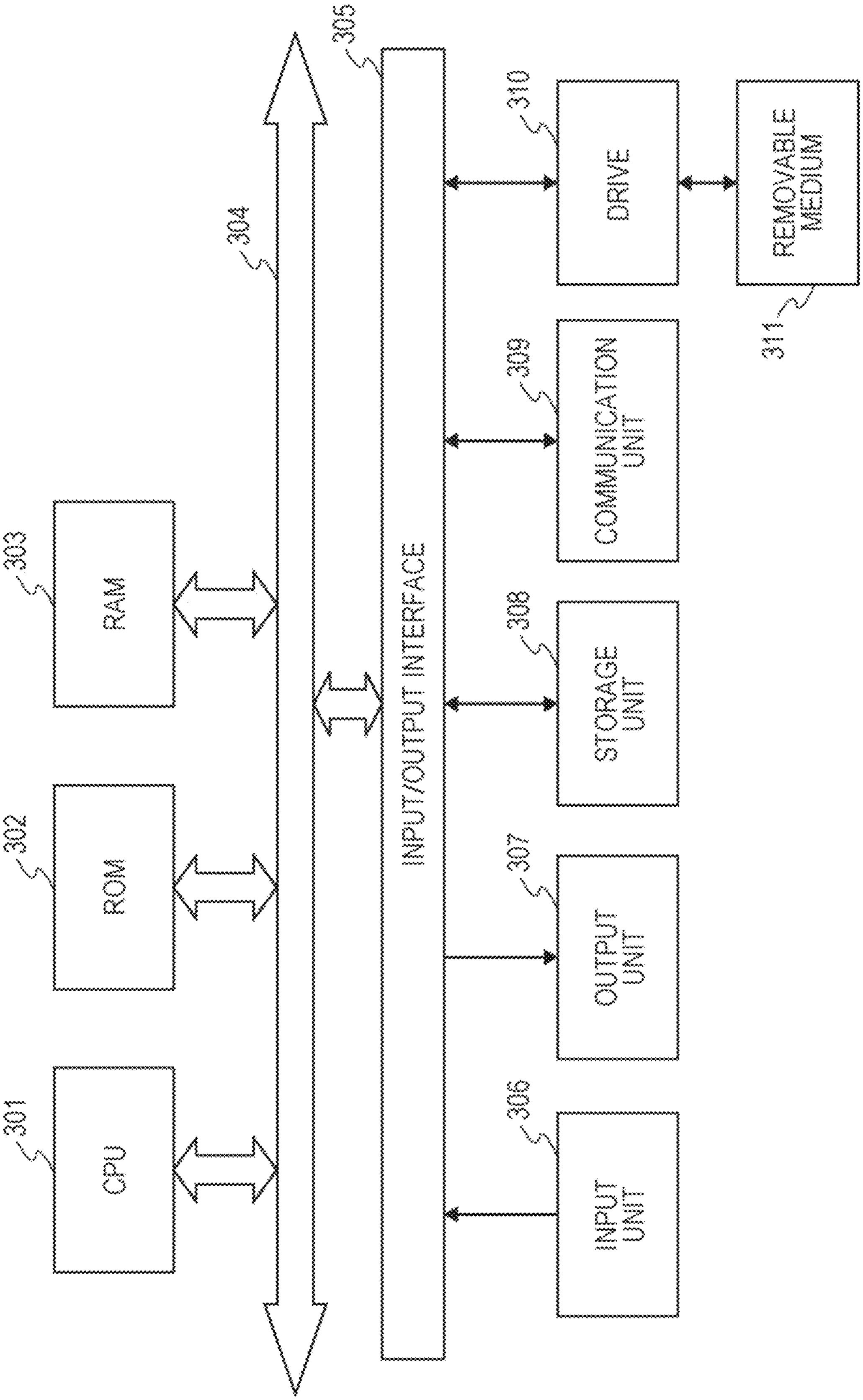
FIG. 36 is a diagram illustrating a hardware configuration example of the information processing device.

FIG. 36 is a diagram illustrating an example of a hardware configuration of the information processing device according to the present disclosure, that is, the information processing device used as the transmission terminal or the reception terminal.

Components of hardware illustrated in FIG. 36 will be described.

A central processing unit (CPU) 301 functions as a control unit and a data processing unit that execute various types of processing according to a program stored in a read only memory (ROM) 302 or a storage unit 308. For example, processing according to the sequences described in the above-described embodiments is executed. A random access memory (RAM) 303 stores programs, data, and the like to be performed by the CPU 301. The CPU 301, the ROM 302, and the RAM 303 are connected to each other by a bus 304.

The CPU 301 is connected to an input/output interface 305 via the bus 304, and the input/output interface 305 is connected to an input unit 306 including various switches, a keyboard, a mouse, a microphone, or the like and an output unit 307 that performs data output to a display unit, a speaker, or the like. The CPU 301 executes various types of processing corresponding to a command input from the input unit 306, and outputs a processing result to the output unit 307, for example.

The storage unit 308 connected to the input/output interface 305 includes, for example, a flash memory, a hard disk, or the like, and stores a program executed by the CPU 301 or various types of data. The communication unit 309 functions as a transmission-reception unit for Wi-Fi communication, Bluetooth (registered trademark) (BT) communication, and other data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and records or reads data.

8. Summary of Configuration of the Present Disclosure

Hereinabove, the embodiments according to the present disclosure have been described in detail with reference to the specific embodiments. However, it is obvious that those skilled in the art can modify or substitute the embodiments without departing from the gist of the present disclosure. That is, the present invention has been disclosed in the form of exemplification, and should not be interpreted in a limited manner. In order to determine the gist of the present disclosure, the claims should be considered.

Note that the technology disclosed herein can have the following configurations.

(1) An information processing device including:

a first output voice adjustment unit that inputs an output voice of each of a plurality of sound sources and executes adjustment processing on the output voice of each sound source;

a voice synthesis unit that synthesizes the output voice corresponding to the sound source adjusted by the first output voice adjustment unit and generates synthesized voice data; and a communication unit that outputs content including the synthesized voice data generated by the voice synthesis unit, in which the first output voice adjustment unit analyzes a volume level corresponding to a frequency, regarding the output voice of each sound source and executes output voice adjustment processing for matching a maximum value of the volume level corresponding to the frequency of the output voice of each sound source to a target level.

(2) The information processing device according to (1), in which the first output voice adjustment unit executes output voice adjustment processing for matching the maximum value of the volume level corresponding to the frequency of the output voice of each sound source to a single target level common to the plurality of sound sources.

(3) The information processing device according to (1) or (2), in which the first output voice adjustment unit executes output voice adjustment processing for matching the maximum value of the volume level corresponding to the frequency of the output voice of each sound source to a target level specific for each sound source.

(4) The information processing device according to any one of (1) to (3), in which the first output voice adjustment unit executes output voice adjustment processing for reducing a difference in the volume level corresponding to the frequency of the output voice of each sound source.

(5) The information processing device according to any one of (1) to (4), in which the output voices of the plurality of sound sources include at least two or more voices of (a) to (c) below (a) an application voice generated by an application that is an execution program of content output via the communication unit, (b) a user voice input via a microphone of the information processing device, and (c) a viewing user comment voice generated on the basis of a comment from a reception terminal on a side of a viewing user who receives and views output content via the communication unit.

(6) The information processing device according to any one of (1) to (5), further including:

a second output voice adjustment unit that executes output voice adjustment processing on the output voice of each sound source in accordance with a type of the content or a scene of the content output via the communication unit.

(7) The information processing device according to (6), in which the second output voice adjustment unit selects a sound source that is an execution target of the output voice adjustment processing in accordance with the type of the content output via the communication unit and executes the output voice adjustment processing only on an output voice of the selected sound source.

(8) The information processing device according to (6) or (7), in which the second output voice adjustment unit, in a case where the type of the content output via the communication unit is game content and the output voices of the plurality of sound sources include the user voice input via the microphone of the information processing device, executes output voice adjustment processing for emphasizing the user voice.

(9) The information processing device according to any one of (6) to (8), in which the second output voice adjustment unit, in a case where the type of the content output via the communication unit is music content, executes output voice adjustment processing for emphasizing music reproduced sound of the music content.

(10) The information processing device according to any one of (6) to (9), in which the second output voice adjustment unit selects a sound source that is an execution target of the output voice adjustment processing in accordance with the scene of the content output via the communication unit and executes the output voice adjustment processing only on an output voice of the selected sound source.

(11) The information processing device according to any one of (6) to (10), in which the second output voice adjustment unit selects at least one or more voices from among (a) to (c) below (a) the application voice generated by the application that is the execution program of the content output via the communication unit, (b) the user voice input via the microphone of the information processing device, and (c) the viewing user comment voice generated on the basis of the comment from the reception terminal on the side of the viewing user who receives and views the output content via the communication unit, as an execution target of the output voice adjustment processing in accordance with the scene of the content output via the communication unit, and executes output voice adjustment processing on the selected voice.

(12) The information processing device according to any one of (6) to (11), further including:

a scene determination unit that determines the scene of the content output via the communication unit, in which the scene determination unit analyzes attribute information of an application being executed by the information processing device, display information of a display unit, utterance content of a user input via the microphone, or comment of the viewing user of the content and determines a scene, and the second output voice adjustment unit executes output voice adjustment processing in accordance with a determined scene by the scene determination unit.

(13) An information processing device including:

a communication unit that receives content; and an output voice adjustment unit that inputs voice data of the received content by the communication unit and executes output voice adjustment processing, in which the output voice adjustment unit executes output voice adjustment processing based on at least any one of voice output device characteristics information included in a voice output unit or voice output environment information.

(14) The information processing device according to (13), in which the output voice adjustment unit generates analysis information of an output level corresponding to a frequency of a voice output device included in the voice output unit, as the voice output device characteristics information and executes output voice adjustment processing for increasing a voice output level of the received content, for a frequency region in which an output level of the voice output device is relatively low.

(15) The information processing device according to (13) or (14), in which the output voice adjustment unit generates frequency analysis information of a noise input via a microphone as the voice output environment information and executes the output voice adjustment processing for increasing the voice output level of the received content, for a region of a frequency often included in a noise.

(16) An information processing method executed by an information processing device, including:

a first output voice adjustment step for inputting an output voice of each of a plurality of sound sources and executing adjustment processing on the output voice of each sound source, by a first output voice adjustment unit;

a voice synthesis step for synthesizing the output voice corresponding to the sound source adjusted by the first output voice adjustment unit and generating synthesized voice data, by a voice synthesis unit; and a communication step for outputting content including the synthesized voice data generated by the voice synthesis unit, by a communication unit, in which in the first output voice adjustment step, a volume level corresponding to a frequency for the output voice of each sound source is analyzed, and output voice adjustment processing for matching a maximum value of the volume level corresponding to the frequency of the output voice of each sound source to a target level is executed.

(17) An information processing method executed by an information processing device, including:

a communication step for receiving content via a network, by a communication unit; and an output voice adjustment step for inputting voice data of the received content by the communication unit and executing output voice adjustment processing, by an output voice adjustment unit, in which in the output voice adjustment step, the output voice adjustment processing based on at least one of voice output device characteristics information included in a voice output unit or voice output environment information is executed.

(18) A program for causing an information processing device to execute information processing including:

a first output voice adjustment step for causing a first output voice adjustment unit to input an output voice of each of a plurality of sound sources and execute adjustment processing on the output voice of each sound source;

a voice synthesis step for causing a voice synthesis unit to synthesize the output voice corresponding to the sound source adjusted by the first output voice adjustment unit and generate synthesized voice data; and a communication step for causing a communication unit to output content including the synthesized voice data generated by the voice synthesis unit, in which in the first output voice adjustment step, a volume level corresponding to a frequency for the output voice of each sound source is analyzed, and output voice adjustment processing for matching a maximum value of the volume level corresponding to the frequency of the output voice of each sound source to a target level is executed.

(19) A program for causing an information processing device to execute information processing including:

a communication step for causing a communication unit to receive content via a network; and an output voice adjustment step for causing an output voice adjustment unit to input voice data of the received content by the communication unit and execute output voice adjustment processing, in which in the output voice adjustment step, the output voice adjustment processing based on at least one of voice output device characteristics information included in a voice output unit or voice output environment information is executed.

A series of processing described herein may be executed by hardware, software, or a composite configuration of both. In a case where processing is executed by software, it is possible to install a program in which a processing sequence is recorded, on a memory in a computer incorporated in dedicated hardware and execute the program, or it is possible to install and execute the program on a general-purpose personal computer that is capable of executing various types of processing. For example, the program can be recorded in advance in a recording medium. In addition to being installed on a computer from the recording medium, a program can be received via a network such as a local area network (LAN) or the Internet and installed on a recording medium such as an internal hard disk or the like.

Note that the various types of processing herein may be executed not only in a chronological order in accordance with the description, but may also be executed in parallel or individually depending on processing capability of an apparatus that executes the processing or as necessary. Furthermore, a system described in the description is a logical set configuration of a plurality of devices, and is not limited to a system in which devices of respective configurations are in the same housing.

INDUSTRIAL APPLICABILITY

As described above, according to the configuration according to the embodiment of the present disclosure, a device and a method are realized that adjust voices of a plurality of sound sources included in distribution content from an information processing device and making it easier to hear the voice of each sound source by a reception terminal that receives and reproduces the distribution content.

Specifically, for example, a first output voice adjustment unit executes adjustment processing on the output voice of each of the plurality of sound sources, and content including synthesized voice data obtained by synthesizing the output voices corresponding to the sound sources adjusted by the first output voice adjustment unit is output. The first output voice adjustment unit executes output voice adjustment processing for matching a maximum value of a volume level corresponding to a frequency of the output voice of each sound source to a target level. Moreover, a second output voice adjustment unit executes the output voice adjustment processing in accordance with a type or a scene of the content.

With these types of processing, the device and the method are realized that adjust the voices of the plurality of sound sources included in the distribution content from the information processing device and make it easier to hear sound of each sound source by the reception terminal that receives and reproduces the distribution content.

REFERENCE SIGNS LIST

10 Information processing system
20 Distribution user
30 Viewing user
100, 110, 120, 130 Information processing device (transmission terminal)
101 Microphone (first sound source)
102 Application voice reproduction unit (second sound source)
103 Comment voice reproduction unit (third sound source)
104 First output voice adjustment unit
105 Voice synthesis unit
106 Communication unit
111 Content type determination unit
112 Second output voice adjustment unit
121 Scene determination unit
200 Information processing device (reception terminal)
201 Communication unit
202 Output voice adjustment unit
203 Voice output unit
204 Microphone

205 Voice output device characteristics analysis unit
206 Voice output environment analysis unit
301 CPU
302 ROM
303 RAM
304 Bus
305 Input/output interface
306 Input unit
307 Output unit
308 Storage unit
309 Communication unit
310 Drive
311 Removable medium

The invention claimed is:

1. An information processing device comprising:
circuitry configured to
input an output voice of each of a plurality of sound sources and execute adjustment processing on the output voice of each of a first sound source, a second sound source, and a third sound source of the plurality of sound sources, wherein
the output voice associated with the first sound source corresponds to a distribution user voice input via a microphone,
the output voice associated with the second sound source corresponds to operation of an application, and
the output voice associated with the third sound source corresponds to a viewing user comment input via a network;
synthesis synthesize the output voice corresponding to each of the plurality of sound sources having been adjusted to generate synthesized voice data; and
output content including the synthesized voice data, wherein
the adjustment processing includes:
analyzing a volume level corresponding to a frequency regarding the output voice of each of the first, second, and third sound sources of the plurality of sound sources, and
setting a maximum value of the volume level corresponding to the frequency of the output voice of each of the first, second, and third sound sources to a target level for the output of the content that includes the synthesized voice data,
wherein output volume corresponding to the synthesized voice data is limited to no greater than the target level for each of the first, second, and third sound sources of the plurality of sound sources.

2. The information processing device according to claim 1, wherein
the output voice adjustment processing is executed to match the maximum value of the volume level corresponding to the frequency of the output voice of each of the first, second, and third sound sources to a single target level common to the first, second, and third sound sources of the plurality of sound sources.

3. The information processing device according to claim 1, wherein
the output voice adjustment processing is executed for matching the maximum value of the volume level corresponding to the frequency of the output voice of each of the first, second, and third sound sources to a target level specific for each of the first, second, and third sound sources.

4. The information processing device according to claim 1, wherein the output voice adjustment processing is executed to reduce a difference in the volume level corresponding to the frequency of the output voice of each of the first, second, and third sound sources.

5. The information processing device according to claim 1, wherein the circuitry is configured to:
execute the output voice adjustment processing on the output voice of each of the first, second, and third sound sources in accordance with a type of the content or a scene of the content output via the circuitry.

6. The information processing device according to claim 5, wherein the circuitry is configured to
select one of the first, second, or third sound sources that is an execution target of the output voice adjustment processing in accordance with the type of the content output via the circuitry, and
execute the output voice adjustment processing only on the output voice of the selected one sound source from among the first, second, and third sound sources.

7. The information processing device according to claim 5, wherein the circuitry is configured to
in a case where the type of the content output via the circuitry is game content execute output voice adjustment processing to emphasize the distribution user voice.

8. The information processing device according to claim 5, wherein the circuitry is configured to
in a case where the type of the content output via the circuitry is music content, execute output voice adjustment processing to emphasize music reproduced sound of the music content.

9. The information processing device according to claim 5, wherein the circuitry is configured to
select one of the first, second, or third sound sources that is an execution target of the output voice adjustment processing in accordance with the scene of the content output via the circuitry, and
execute the output voice adjustment processing only on the output voice of the selected one sound source from among the first, second, and third sound sources.

10. The information processing device according to claim 5, wherein the circuitry is configured to
determine the scene of the content output via the circuitry,
analyze attribute information of the application being executed by the information processing device,
display information of a display,
execute the voice adjustment processing in accordance with the determined scene determined by the circuitry.

11. The information processing device according to claim 1, wherein the output voice associated with the third sound source corresponding to the viewing user comment is based on a text input via the network.

12. The information processing device according to claim 1, wherein the application is one of a gaming application or a musical content hosting application.

13. An information processing method comprising:
inputting an output voice of each of a plurality of sound sources and execute adjustment processing on the output voice of each of a first sound source, a second sound source, and a third sound source of the plurality of sound sources, wherein
the output voice associated with the first sound source corresponds to a distribution user voice input via a microphone,
the output voice associated with the second sound source corresponds to operation of an application, and the output voice associated with the third sound source corresponds to a viewing user comment input via a network;

synthesizing the output voice corresponding to each of the plurality of sound sources having been adjusted to generate synthesized voice data; and outputting content including the synthesized voice data, wherein said adjustment processing includes:

analyzing a volume level corresponding to a frequency regarding the output voice of each of the first, second, and third sound sources of the plurality of sound sources, and setting a maximum value of the volume level corresponding to the frequency of the output voice of each of the first, second, and third sound sources to a target level for the output of the content that includes the synthesized voice data, wherein output volume corresponding to the synthesized voice data is limited to no greater than the target level for each of the first, second, and third sound sources of the plurality of sound sources.

14. The information processing method according to claim 13, wherein said executing the output voice adjustment processing matches the maximum value of the volume level corresponding to the frequency of the output voice of each of the first, second, and third sound sources to a single target level common to the first, second, and third sound sources of the plurality of sound sources.

15. The information processing method according to claim 13, wherein said executing the output voice adjustment matches the maximum value of the volume level corresponding to the frequency of the output voice of each of the first, second, and third sound sources to a target level specific for each of the first, second, and third sound sources.

16. The information processing method according to claim 13, wherein said executing the output voice adjustment reduces a difference in the volume level corresponding to the frequency of the output voice of each of the first, second, and third sound sources.

17. The information processing method according to claim 13, wherein said executing the output voice adjustment in accordance with a type of the content or a scene of the content output for said outputting.

18. The information processing method according to claim 13, wherein the output voice associated with the third sound source corresponding to the viewing user comment is based on a text input via the network.

19. The information processing method according to claim 13, wherein the application is one of a gaming application or a musical content hosting application.

* * * * *